United States Patent
Joao et al.

(10) Patent No.: US 6,529,725 B1
(45) Date of Patent: *Mar. 4, 2003

(54) TRANSACTION SECURITY APPARATUS AND METHOD

(76) Inventors: Raymond Anthony Joao, 122 Bellevue Pl., Yonkers, NY (US) 10703; Robert Richard Bock, 27 Sumner Ave., Yonkers, NY (US) 10704

( * ) Notice: Subject to any disclaimer, the term of this patent is extended or adjusted under 35 U.S.C. 154(b) by 0 days.

This patent is subject to a terminal disclaimer.

(21) Appl. No.: 09/169,053

(22) Filed: Oct. 9, 1998

Related U.S. Application Data

(63) Continuation of application No. 08/873,945, filed on Jun. 12, 1997, which is a continuation of application No. 08/694,199, filed on Aug. 8, 1996, now abandoned.

(51) Int. Cl.⁷ .............................. H04Q 7/20; H04Q 7/32
(52) U.S. Cl. ...................... 455/406; 455/407; 455/408; 455/410; 455/411; 379/112.01; 379/91.01; 379/91.02; 340/5.4; 340/5.42; 340/5.5
(58) Field of Search .................... 455/403, 406, 455/407, 408, 410, 411, 426; 379/112, 91.01, 91.02; 340/825.33, 825.32, 825.44; 705/26, 35, 37, 75

(56) References Cited

U.S. PATENT DOCUMENTS

| | | | |
|---|---|---|---|
| 3,723,655 A | 3/1973 | Zucker et al. | 455/408 |
| 3,938,090 A | 2/1976 | Borison et al. | 455/406 |
| 4,485,300 A | 11/1984 | Peirce | 455/408 |
| 4,758,714 A | 7/1988 | Carlson et al. | 455/406 |
| 4,947,027 A | 8/1990 | Golightly | 455/407 |
| 5,038,284 A * | 8/1991 | Kramer | 340/825.33 |
| 5,173,594 A | 12/1992 | McClure | 455/406 |
| 5,177,342 A | 1/1993 | Adams | 455/403 |
| 5,243,645 A | 9/1993 | Bissell et al. | 455/408 |
| 5,335,278 A | 8/1994 | Matchett et al. | 455/406 |
| 5,345,595 A | 9/1994 | Johnson et al. | 455/403 |
| 5,357,563 A | 10/1994 | Hamilton et al. | 455/406 |
| 5,406,619 A | 4/1995 | Akhteruzzaman et al. | 455/406 |
| 5,444,616 A | 8/1995 | Nair et al. | 455/406 |
| 5,444,763 A | 8/1995 | Lazaridis et al. | 455/406 |
| 5,473,667 A | 12/1995 | Neustein | 455/407 |
| 5,479,510 A | 12/1995 | Olsen et al. | 455/407 |
| 5,485,510 A | 1/1996 | Colbert | 455/403 |
| 5,513,250 A | 4/1996 | McAllister | 455/407 |
| 5,526,407 A | 6/1996 | Russell et al. | 455/407 |
| 5,530,438 A | 6/1996 | Bickham et al. | 455/408 |
| 5,615,110 A * | 3/1997 | Wong | 340/7.21 |
| 5,631,947 A | 5/1997 | Wittstein et al. | 455/407 |
| 5,655,007 A | 8/1997 | McAllister | 455/403 |
| 5,661,285 A | 8/1997 | Elrick et al. | 455/408 |
| 5,668,876 A * | 9/1997 | Falk et al. | 340/7.21 |
| 5,699,528 A | 12/1997 | Hogan | 455/406 |
| 5,708,422 A * | 1/1998 | Blonder et al. | 340/7.21 |

\* cited by examiner

*Primary Examiner*—William Trost
*Assistant Examiner*—Keith Ferguson
(74) *Attorney, Agent, or Firm*—Raymond A. Joao, Esq.

(57) ABSTRACT

A transaction security apparatus and method including an input device for inputting transaction data, a processing device for processing the transaction data and for generating a first signal corresponding to the transaction, and a transmitter for transmitting the first signal over a communication network directly to a communication device associated with an individual account holder. The communication device provides notification to the individual account holder of the transaction.

340 Claims, 17 Drawing Sheets

TRANSACTION SECURITY APPARATUS AND METHOD

RELATED APPLICATIONS

This application is a continuation application of U.S. patent application Ser. No. 08/873,945, filed Jun. 12, 1997, which, in turn, is a continuation application of U.S. patent application Ser. No. 08/694,199, filed Aug. 8, 1996, abandoned.

FIELD OF THE INVENTION

The present invention pertains to a financial transaction and/or wireless communication device authorization, notification and/or security apparatus and method, and, in particular to a financial transaction and/or wireless communication device authorization, notification and/or security apparatus and method for use in providing authorization, notification and/or security in conjunction with credit card, charge card and/or debit card use, savings and/or checking account activity and/or cellular telephone use.

BACKGROUND OF THE PRESENT INVENTION

Millions of individuals enjoy the convenience of utilizing credit cards, charge cards, debit cards, and/or currency or "smart" cards as a convenient way in which to purchase goods and/or services. By utilizing credit cards, charge cards, debit cards, and/or currency or "smart" cards, an individual may enter into a transaction without having to have cash or currency in hand or otherwise. In the case of credit cards, charge cards and debit cards, the individual, in effect obtains an instant loan of the funds needed to make a purchase and/or enter into a transaction. In the case of currency or "smart" cards, the individual may "store" an amount of money on the card(s) and, thereafter, utilize the card(s), instead of cash or currency, in order to make purchases and/or enter into transactions.

Millions of individuals also enjoy the benefits of having savings accounts, checking accounts and/or automated teller machine accounts which allow then to enjoy the security of saving their money in accounts which are usually insured and which allow them to, in some instances, earn interest on their money. In the case of checking accounts, individuals enjoy the convenience of writing checks and/or other transaction instruments which allow them to draw against their money without having to undergo the inconvenience of going to the bank or financial institution to withdraw their money, in currency form, and traveling to, in some cases, a distant location to either make a purchase, payment and/or to otherwise settle an account. In this regard, the ability to write checks, drafts and/or other instruments against an account is a very convenient manner in which to conduct transactions of any kind.

In the case of automated teller machines, individuals may conveniently withdraw and/or deposit money into a bank of other financial account.

Many individuals also enjoy the convenience of owning and/or using wireless, mobile or cellular telephones or devices as a means by which to make telephone calls when a conventional line or permanent telephone is not within reach and/or when the individual is "on the go", such as in an automobile, on foot, and/or in any other type of environment, such as away from home, when a conventional line or permanently fixed telephone is not available.

Unfortunately, with the convenience of each of the above credit cards, charge cards, debit cards, and/or currency or "smart" cards, savings accounts, checking accounts, automated teller machine accounts, and cellular telephones or cellular communications devices, comes many disadvantages and the opportunity for theft and/or fraud. In the case of credit cards, charge cards and/or debit cards, hundreds of millions, if not billions, of dollars a year are lost as a result of the theft of, and/or the fraudulent use of, credit cards, charge cards and/or debit cards, or the account numbers which correspond thereto.

A lost or stolen card may be utilized by an unauthorized individual to spend upwards of thousands of dollars before the unauthorized use is detected and/or before the cardholder can ascertain, and/or be notified, either by the card issuer or servicing institution or when the cardholder detects the unauthorized transaction on his or her monthly account statement, that the card is lost or stolen. Similarly, even in the absence of the physical card, an unauthorized individual may utilize the account number which corresponds to the card in order to make certain transactions.

While card holders are usually protected by various coverages which shield them from the liabilities associated with the fraudulent use of a card or the corresponding account number,. the card issuers, credit, charge and/or debit card issuing companies and/or institutions, and/or their insurance companies, end up paying for the above described thefts and/or fraudulent and/or unauthorized uses. Ultimately, the consumer also shoulders the burden of the costs associated with these thefts and/or fraudulent and/or unauthorized uses in the form of increased prices.

While authorization terminals and/or devices are utilized at a point-of-sale and/or at the vendor's, the seller's, or the service provider's, location, these authorization terminals and/or devices typically are utilized to obtain an authorization from the card issuer or account servicing institution which, usually entails a screening of whether the card has been lost, stolen, cancelled, de-activated and/or whether the cardholder has exceeded and/or will exceed his or her credit limit. This current authorization practice fails to prevent the use of a lost or stolen card, or the unauthorized use of either the card or the account number corresponding thereof, if the card has not been reported, and/or discovered, to be lost, stolen or used without authorization and/or if the account credit limit has not yet been reached.

Current practices do not entail and/or do not include the provision for obtaining an authorization, and/or for providing notice to the cardholder before, during and/or shortly after a transaction, which cardholder authorization and/or notification procedure would be helpful and prove to be essential in preventing the fraudulent use and/or unauthorized use of a card and/or the account number corresponding thereto in a unauthorized transaction and/or shortly thereafter an unauthorized transaction has occurred, thereby minimizing the fraudulent and/or unauthorized use of the card and/or the account number corresponding thereto.

In the case of currency or "smart" cards, which typically may serve as bearer instruments, the monetary credit on these cards may be completely depleted before the card owner even discovers same to be lost or stolen.

In the case of savings accounts, checking accounts, and/or automated teller machine accounts, these accounts may be accessed, and funds be withdrawn, without the account owner's notification and/or knowledge. In the case of savings accounts and checking accounts, these accounts may be accessed, and/or funds may be withdrawn therefrom, when checks drawn on insufficient funds are returned, and/or when the account number is inadvertently and/or fraudulently utilized in an endorsement, or otherwise, by an individual attempting to cash or perform a transaction with a fraudulent instrument, a forged instrument and/or an otherwise "bad" check. In these instances, the accounts and/or funds involved are usually accessed, invaded, and/or withdrawn from the account involved without the account owner being notified and/or having a say in the matter.

The account owner is typically notified of the above-described activity involving his or her account days later when he or she either receives a mailed notice and/or when they receive and review their monthly or periodic statement, which notice may be received at a time when it may be too late for the account owner to stop or reverse the transaction and/or, in the case of a check or draft returned for insufficient funds, at a time which is too late for the account owner to attempt to collect the funds. In the case of automated teller machine accounts, these accounts may be accessed, such as with a lost, stolen, or counterfeit card and/or with a card account number(s) and/or associated personal identification number(s), by a thief or by any other unauthorized person who could then make an unauthorized withdrawal(s) therefrom.

Once again, the account owner would not receive notification and/or have knowledge of the unauthorized transaction until they are notified by the bank or financial institution either via a monthly and/or periodic statement, and/or when they attempt a transaction at the automated teller machine and, at that time, discover that funds are missing and/or have been withdrawn. In the case of savings accounts, checking accounts and/or automated teller machine accounts, there is no present apparatus or method by which to provide notification to an account owner at the time of the unauthorized transaction and/or account activity and/or shortly thereafter same.

In the case of cellular telephones, recent practices involving "cloning" cellular telephones, which entails intercepting telephone transmissions from a cellular telephone, which transmissions contain the phone number of the transmitting phone and/or the associated personal identification number (PIN), and utilizing the intercepted information to program a different cellular phone which by then be utilized in conjunction with the account of the "cloned" cellular telephone, has also resulted in widespread theft and fraudulent use of cellular telephones and/or cellular communications devices The "cloned" telephones are typically sold on the "black" market. In these instances, the cellular telephone owner has no way of knowing whether, or when, his or her cellular transmissions are being intercepted and/or if and when a "cloned" cellular phone is created and/or is utilized on, or over, his or her cellular telephone account.

Typically, the cellular telephone owner first becomes aware of the unauthorized usage of his or her cellular telephone account when he or she receives their telephone account statement. Once again, in the time between the "cloning" of the cellular telephone and the discovery of same, hundreds, if not thousands, of dollars worth of cellular telephone calls may have been made before the unauthorized use is detected. At present, there is no apparatus or method for providing notification to the cellular telephone owner as to when his or her cellular telephone and/or cellular telephone number is, or has been, utilized in an unauthorized manner.

SUMMARY OF THE INVENTION

The present invention provides an apparatus and a method for providing financial transaction authorization, notification and/or security, and, in particular, provides an apparatus and a method for providing financial transaction authorization, notification and/or security in conjunction with credit card, charge card, debit card, and/or currency or "smart" card use, savings and/or checking account activity and use and/or cellular telephone use, which overcomes the shortcomings of the prior art.

The apparatus and method of the present invention, which is utilized in conjunction with a credit card, a charge card, a debit card and/or a currency or "smart" card authorization process comprises a point-of-sale authorization terminal which terminals are found in various establishments and which are utilized in conjunction with the sale of goods and/or services and/or in other types of financial transactions. The point-of-sale terminal may be utilized at the location of the seller and/or service provider, such as at a retail store or office, and/or the point-of-sale terminal may be located at the site of the goods or service provider or vendor, such as in cases when the sale is a telephone order, mail order and/or other type of transaction, including transactions made on, or over, the INTERNET and/or other on-line services or communication networks or mediums.

The apparatus also comprises a central processing computer for processing the credit, charge, debit and/or currency or "smart" card and/or other transaction requests, and data and/or information pertaining thereto, and/or the authorization pertaining thereto. The central processing computer may service any predefined group of card holders and/or any pre-defined group(s) and/or type(s) of cards. The central processing computer may also process accounts for any of the various banks and/or financial institutions which issue and/or manage credit cards, charge cards, debit cards and/or currency or "smart" cards and/or process or manage these accounts.

The point-of-sale terminal is linked and/or connected to the central processing computer via a communications system, link and/or medium, such as, for example, a telephone network or line. The communications system which is utilized may be any communications system and may include telecommunication systems, satellite communications systems, radio communication systems, digital satellite communications systems, personal communications services communication systems as well as any other appropriate communications system.

The point-of-sale terminal transmits signals and/or data to the central processing computer as well as receives signals and/or data from the central processing computer.

The apparatus also comprises a cardholder communication device which may receive signals and/or data from either or both of the point-of-sale terminal and/or the central processing computer. The communication device may also be equipped with a transmitter for transmitting signals and/or data to the central processing computer. In this regard, the central processing computer transmits signals and/or data to the communication device as well as receives signals and/or data from the communication device. The communication device may also transmit signals and/or data directly to the point-of-sale terminal and receive signals and/or data directly from the point-of-sale terminal.

The point-of-sale terminal may transmit signals and/or data to the central processing computer and to the communication device and may receive signals and/or data from the central processing computer and from the communication device.

The communication device may be a wireless device. In this regard, the communication device may be a telephone signal receiving device which may be a beeper or pager or other device which may be carried by the cardholder and/or be kept on and/or close to the cardholder's person so that the central processing computer may transmit signals and/or data to the communication device so as to communication with the cardholder at any time and at any location.

The apparatus may also comprise a facsimile (fax) machine, a personal computer, a telephone, a telephone answering machine, an alternate telephone, an alternate telephone answering machine, a network computer and/or an alternate beeper or pager. The central processing computer may be linked with the above fax machine, personal computer, telephone, associated answering machine, alternate telephone and associated answering machine, network computer, and/or alternate beeper or pager via any suitable communication system. The telecommunications link or telephone line or link, which may or may not be a wireless link depending on the device and/or the circumstances, is utilized in order to link the central processing computer with each of the fax machine, the personal computer, the telephone, the associated answering machine, the alternate telephone, alternate telephone answering machine, the network computer and/or the alternate beeper or pager.

The apparatus and method of the present invention may be utilized in order to provide cardholder authorization, notification and/or security measures in financial transactions involving credit cards, charge cards, debit cards, and/or currency or "smart" cards and may be utilized in order to obtain cardholder authorization in a card-related transaction.

The apparatus and method of the present invention may commence operation when the card, which is to be utilized in a credit card, charge card, debit card, and/or currency or "smart" card, or number corresponding thereto, transaction, is offered at the point-of-sale or other appropriate location whereupon the attendant or point-of-sale terminal operator will activate the apparatus in any typical manner, such as by obtaining a phone line and entering card information into the point-of-sale terminal. Data entry may typically be performed by swiping the magnetic strip of the card through a card reader of the point-of-sale terminal. The information and/or data pertinent to the transaction and the card is then transmitted to the central processing computer.

The central processing computer will then process the information and/or data pertinent to the transaction and to the particular card account and may request, if needed, that the point-of-sale operator enter the transaction amount. The central processing computer will process the information and/or data pertinent to the transaction in conjunction with the card account information in order to determine if the card has been lost, stolen and/or cancelled and/or de-activated. Further, the central processing computer may perform a test in order to determine if the maximum credit, charge or debit account limit has been exceeded and/or if the card has been depleted of its currency value.

Once all of the information and/or data processing has been completed, the central processing computer will determine if the card has been lost, stolen, and/or cancelled and/or de-activated and/or if the credit, charge or debit account limit of the card has been reached and/or exceeded and/or if the currency value of the card has been depleted.

The central processing computer may also perform a test in order to determine if the predetermined maximum number of unauthorized transactions have occurred on the account. If any of the above listed conditions are found to exist (i.e. card is lost, stolen, cancelled and/or de-activated, or credit, charge or debit account limit has been reached or exceeded, currency value depleted, or unauthorized transaction limit reached or exceeded), the central processing computer may transmit a signal to the point-of-sale terminal indicating that the transaction is not approved and/or is not authorized. The point-of-sale terminal operator may then cancel the transaction. The point-of-sale terminal operator may then confiscate the card and/or alert the authorities.

If, however, the central processing computer should determine that the card is not lost, stolen, cancelled or de-activated, or that the credit, charge or debit account limit of the card has not been reached or exceeded, or that the of unauthorized transactions count has not reached a predefined limit, the central processing computer may transmit a signal and/or data to the communication device which is located with the cardholder. The central processing computer may then also transmit respective signals and/or data to any one or more of the cardholder's designated fax machine, personal computer, telephone, telephone answering machine, alternate telephone, alternate telephone answering machine, network computer, and/or alternate beeper or pager, either sequentially and/or simultaneously.

The information and/or data transmitted to the communication device includes information and/or data identifying the transaction and may include the name of the store or the service provider and the amount of the transaction. The information and/or data may also provide the time of the transaction, the location (i.e. city, town, village, state, country, etc.) of the transaction. The information and/or data may also include the phone number of the central processing office and/or computer servicing the account so that the cardholder may telephone same in order to authorize or cancel the transaction. The information and/or data may also be supplemented to include the type of goods and/or services involved in the transaction, if such information can be entered at the point-of-sale terminal.

The information and/or data which is transmitted from the central processing computer, and received at the communication device, may be displayed to the cardholder on a display device of the communication device. The information displayed on the display device may include the name of the store or the service provider, the amount of the transaction, the time of the transaction and the location of the transaction. The information and/or data may also be supplemented to include the type of goods and/or services involved in the transaction, if such information can be entered at the point-of-sale terminal.

The apparatus, or the central processing computer, may then wait for the cardholder to respond to the transmission. During this time, the cardholder may either utilize the reply or two-way pager feature on the communication device in order to either approve, or authorize, the transaction or to disapprove, or void the transaction. The apparatus may then determine if the cardholder has made a reply or response within a pre-defined time limit. The cardholder may also transmit a signal via an appropriate key or button suspending use of the card such as when he or she may first be apprised of the fact that the card has been lost or stolen. If the cardholder has replied or responded to the notice, the response may then be transmitted to, and received by, the central processing computer. The cardholder may also simply telephone the central processing office or processing center, servicing the card, so as to personally notify the office or center of his or her response to the central processing computer transmission regarding the transaction.

If the cardholder does not reply to the central processing computer within a pre-specified time, the central processing computer may transmit a signal and/or data to the point-of-sale terminal indicating that, with the exception of receiving the authorization of the cardholder, the transaction is otherwise approved. The central processing computer may also simply transmit a signal indicating that the transaction is not authorized and, therefore, should be cancelled of voided. The point-of-sale terminal operator may then either proceed to complete the transaction, try to obtain additional information from the purchaser, or cancel the transaction.

The action taken by the point-of-sale terminal operator may be dictated by the specific agreement in effect between the sales or service establishment and the bank or financial institution administering the card accounts. Thereafter, the operation of the apparatus will cease. If the cardholder should reply or respond to the transaction notice at a later period, this information may then be utilized in order to approve, or to disapprove, and/or to dispute the transaction.

The central processing computer, after receiving the reply or response from the cardholder, may then identify the cardholder response. The apparatus, or the central processing computer, may then determine if the cardholder has replied or responded so as to authorize the transaction. If the cardholder's response is to cancel, to disapprove or not authorize, the transaction, the central processing computer may transmit a signal and/or data to the point-of-sale terminal which will notify and/or instruct the point-of-sale terminal operator that the transaction is not authorized and, therefore, should be cancelled or voided. The point-of-sale terminal operator may then cancel the transaction. The point-of-sale terminal operator may then confiscate the card and/or alert the authorities. Thereafter, the apparatus will cease operation.

If, however, the central processing computer identifies the cardholder reply or response as being one to authorize the transaction, the central processing computer may then transmit a signal and/or data to the point-of-sale terminal which may notify and/or instruct the point-of-sale terminal operator that the transaction is authorized and/or approved. The point-of-sale terminal operator may then complete the transaction. Thereafter, operation of the apparatus will cease.

In cases when the cardholder is the party to the transaction, he or she, having the communication device with, or on, his or her person, may authorize the transaction at the point-of-sale location or from his or her remote location. The cardholder may also program and/or set the communication device to automatically authorize or disapprove or disallow transactions.

In this regard, the communication device may be programmable so as to receive and/or to analyze the transaction information and/or data and reply or respond to same automatically and/or with preset or programmed replies and/or responses. The communication device may also be programmable so as to limit and/or restrict the amounts and/or types of transactions, and/or the goods and/or services which may be purchased with the card, the stores or service providers which may be authorized to accept the card, limits on the dollar amounts of transactions pertaining to each authorized vendor, seller and/or service provider, daily spending limits, and/or the geographical area or location to which authorized use may be limited, and/or authorized times for card usage (i.e. specific days, dates, time of day, time of month, year, etc.), and/or any other limitation and/or restriction regarding amount of the transaction, the parties involved, the geographical area limitations, and/or the times of allowed usage. In this regard, the cardholder may provide for temporary transaction and/or purchasing amounts.

The communication device may also be provided with a memory device for storing any number of transactions so that the cardholder may review his account activity and/or transactions which have occurred involving his or her card. In this manner, the cardholder may "scroll" through and/or in other ways review account activity at any time and for any time period and/or interval. The communication device may also be equipped to service more than one card. For example, a plurality of cards may be serviced with or by a single communication device.

The apparatus and method of the present invention provides for the real-time authorization, notification and/or security of financial transactions involving credit cards, charge cards, debit cards, and/or currency or "smart" cards, which enables a cardholder to monitor, in real-time, all activity involving his or her card(s) and the corresponding account numbers. The apparatus and method of the present invention also provides a means and a mechanism by which to inform a cardholder that his or her card(s) are lost, stolen and/or are or have been fraudulently used, and/or when his or her card number(s) are or have been fraudulently used, and provides an indication to the cardholder of where his or her card(s) are being or have been utilized in transactions. The cardholder may then report the card lost or stolen and/or cancel and/or de-activate the card.

The present invention also provides a means and a mechanism by which to monitor the number of transactions which are unauthorized by the cardholder and determine whether or not to authorize transactions and/or to cancel or to de-activate the card(s). In the above manner, the present invention provides an apparatus and a method to prevent and/or to drastically limit fraudulent and/or unauthorized use of credit cards, charge cards, debit cards, and/or currency or "smart" cards, and/or the account numbers corresponding thereto.

The present invention, in an alternate embodiment, may be utilized so as to provide authorization, notification and/or security in banking and related financial transactions involving checking accounts, savings accounts and/or automated teller machine (ATM) transactions and/or other transactions wherein an account holder can be notified of a transaction and/or attempted transaction. In such an alternate embodiment, the apparatus comprises a banking transaction terminal, which terminals are found in banks and financial institutions, and which may be a teller terminal, a processing computer terminal and/or an ATM terminal. The apparatus also comprises a central processing computer and a communication device. The banking transaction terminal transmits an authorization request which may include the data pertaining to the particular account which is accessed and/or involved in the transaction and the type and the amount of the transaction, over a communications medium, to the central processing computer for processing the transaction request and/or the authorization pertaining thereto.

The central processing computer may transmit signals and/or data pertaining to the transaction to the communication device. The apparatus may then operate and/or be utilized in a manner similar to, or analogous to, the apparatus utilized in conjunction with credit cards, charge cards, debit cards, and/or currency or "smart" cards, and/or the account numbers corresponding thereto, as described above.

In this manner, the apparatus and method of the present invention may provide for the real-time notification of banking and/or financial transactions involving various bank and/or financial accounts and enable an account owner to monitor, in real-time, all activity involving his or her bank and/or financial accounts. The apparatus and method of the present invention also provides a means and a mechanism by which to inform an account owner that his or her account is overdrawn, has been charged against and/or that his or her ATM card(s) are lost, stolen, cancelled or de-activated and/or provides an indication to the account owner of when and/or where his or her accounts are being accessed in transactions and/or are being otherwise compromised. The account owner may then report the unauthorized activity, or the discovery of a lost or stolen ATM card, and/or cancel and/or de-activate the respective account(s) and/or ATM card(s).

In another alternate embodiment, the apparatus and method of the present invention may also be utilized so as to provide authorization, notification and/or security for, and in conjunction with, cellular and/or mobile telephones and/or communication systems wherein a cellular or mobile telephone owner and/or account holder can be notified of a transmission and/or an attempted transmission and/or telephone call made with his or her cellular or mobile telephone and/or with the telephone number and/or account information, which information may include, but not be limited to, transmission codes and/or associated signatures and/or data which corresponds to his or her cellular or mobile telephone.

The apparatus utilized in conjunction with a cellular telephone comprises a cellular telephone which serves as the transaction terminal, a central processing computer and a communication device. The cellular telephone transmits signals and/or data which are received by the central processing computer. The central processing computer may then transmit signals and/or data which are received by the communication device. The apparatus may then operate and/or be utilized in a manner similar to, or analogous to, the apparatus utilized in conjunction with credit cards, charge cards, debit cards, and/or currency or "smart" cards, savings accounts, checking accounts and/or automated teller machine accounts, and/or the account numbers corresponding thereto, as described above.

The apparatus and method of the present invention provides for the real-time notification of cellular or mobile telephone usage which enables a cellular telephone owner and/or account holder to monitor, in real-time, all activity involving his or her cellular telephone. The apparatus and method of the present invention also provides a means and a mechanism by which to inform a cellular telephone owner and/or account holder that his or her cellular telephone is lost, stolen and/or is being fraudulently used, and/or that the telephone number is being used in an unauthorized manner, and provides an indication to the cellular telephone owner and/or account holder of how, when and where his or her cellular telephone, or the account number which corresponds thereto, is being utilized in cellular communication transactions. The cellular telephone owner and/or account holder may then report the cellular telephone lost or stolen and/or cancel and/or de-activate the cellular telephone and/or the corresponding account and/or the account number.

The present invention also provides an apparatus and a method by which to monitor the number of cellular or mobile telephone transactions which are unauthorized by the cellular or mobile telephone owner and to determine whether or not a central processing computer should cancel or de-activate the cellular telephone and/or the account. In the above manner, the present invention provides an apparatus and a method for preventing and/or for drastically limiting fraudulent use and/or unauthorized use of cellular or mobile telephones and/or cellular or mobile telephone numbers. The present invention also provides an apparatus and a method for combating cellular telephone "cloning."

The apparatus and method of the present invention may also be utilized in connection with an on-line service and/or on, or over, the Internet and/or the World Wide Web, so as to provide for a means by which the authorized user or operator may utilize the apparatus in conjunction with a home and/or a personal computer and/or a commercial or industrial computer system (i.e., an internet server computer) and/or any other appropriate device, including a personal communication and/or computing device, in a network environment, and which may be utilized over any suitable and/or appropriate communications network or medium.

The communications system utilized in conjunction with the present invention may operate anywhere in the electromagnetic and/or the radio spectrum. Personal communication service (PCS) systems and devices, including stationary, portable and/or handheld devices, and digital signal communications devices and systems, may also be utilized. The communication system or medium should provide for the transmission and for the reception of a multitude of remote electrical, electronic, electromagnetic, and/or other suitable signals, over long distances and/or in a mobile and/or a wireless communications environment.

The apparatus and method of the present invention may be utilized in conjunction any appropriate communications device which may be utilized with any appropriate communications system and/or medium.

The present invention may also be equipped with, and be utilized with, hardware and software necessary for providing self-monitoring functions, automatic control and/or responses to occurrences, automatic notice of an occurrence and/or a situation, to an owner, user and/or authorized individual. In this regard, any and all of the embodiments described above may comprise a monitoring device, a triggering device and/or any other suitable device for detecting an occurrence and/or identifying a situation which may warrant providing notice to a card holder, account owner, cellular telephone owner and/or an authorized individual.

In this regard, the apparatus and method may provide a transmission of any appropriate signal from a transmitter and, if desired, from a voice synthesizer to the card holder, account owner and/or cellular, telephone owner. The, signal utilized could be in the form of a communication transmission, depending upon the communication medium utilized, a telephone call, a voice message, a beeper and/or a pager message, an electronic mail message, a fax transmission, and/or any other mode of communication which may be utilized with any of the apparatuses, devices and/or components described herein.

In this regard, the apparatus may be designed or programmed to telephone the cardholder, account owner and/or cellular telephone owner, and/or other authorized individual, at a primary phone number, at an alternate or forwarding phone number, and/or at a business phone number, send a beeper or pager message to the individual, and/or send a fax message, an electronic mail (e-mail) message, a voice mail message and/or an answering service message to, or for, the card holder, account owner and/or cellular telephone owner or authorized individual. In this manner, the apparatus may communicate with the desired individual by utilizing multiple notification and/or reporting avenues and/or devices so as to provide and to ensure that best efforts are to be made to communicate with the desired individual as soon as possible.

The apparatus and method of the present invention may also be programmable for programmed and/or automatic activation, self-activation, programmed and/or automatic operation and/or self-operation. The apparatus and method of the present invention may provide for an immediate, as well as for a deferred, authorization, notification and/or security in any of the above-described financial transactions and/or wireless communication transactions.

The present invention may also be utilized in such a manner that a communication device may receive and/or transmit signals, data and/or information which pertains to multiple accounts and/or multiple types of accounts in order to provide authorization, notification and/or security for a plurality of any of the accounts described herein.

The present invention, in any of the embodiments described herein, may also be designed to be user-friendly. In this regard, the present invention may be menu-driven, and/or its operation may be menu-selected, from audio menus, visual menus, or both audio and visual menus.

Accordingly, it is an object of the present invention to provide an apparatus and a method for providing authorization, notification and/or security in financial transactions involving credit cards, charge cards, debit cards, and/or currency or "smart cards, savings accounts, checking accounts and/or automated teller machine accounts and for providing authorization, notification and/or security in wireless communications transactions involving cellular telephones and/or other cellular communications devices.

It is another object of the present invention to provide an apparatus and a method for providing authorization, notification and/or security in financial transactions involving credit cards, charge cards, debit cards, wherein the cardholder may authorize or disapprove of a transaction, in real time.

It is another object of the present invention to provide an apparatus and a method for providing authorization, notification and/or security in financial transactions involving savings account, checking accounts and/or automated teller machine accounts, wherein the account owner may authorize or disapprove of a transaction, in real time.

It is another object of the present invention to provide an apparatus and a method for providing authorization, notification and/or security in wireless communications transactions involving cellular telephones and/or other cellular communications devices, wherein the cellular telephone or cellular communication device owner may authorize or disapprove of a transaction, in real time.

It is another object of the present invention to provide an apparatus and a method for providing authorization, notification and/or security in financial transactions and/or in wireless communication transactions, which may be utilized on, over, or in conjunction with, an on-line service and/or the Internet, the World Wide Web, and/or any other suitable communication network or medium.

It is still another object of the present invention to provide an apparatus and a method for providing authorization, notification and/or security in financial transactions and/or in wireless communications transactions, which is programmable and/or which may provide for pre-programmed and/or pre-specified transaction authorization and/or transaction disapproval.

It is still another object of the present invention to provide an apparatus and a method for providing authorization, notification and/or security in financial transactions and/or in wireless communications transactions, which may be utilized over any suitable communications network or medium.

It is still another object of the present invention to provide an apparatus and a method for providing authorization, notification and/or security in financial transactions and/or in wireless communication transactions, wherein the respective cardholder, account owner or cellular telephone owner may increase or decrease the respective account credit limits, account activity, funds available, calling areas and/or usage limits at any time and/or from any location.

It is still another object of the present invention to provide an apparatus and a method for providing authorization, notification and/or security in financial transactions and/or in wireless communications transactions, which is programmable with respect to authorized times of usage (i.e. specific days, dates, time of day, time of month, year, etc.), and/or any other limitations regarding amount of transaction limitations, parties involved, and/or geographical area and/or location of allowed usage.

It is yet another object of the present invention to provide an apparatus and a method for providing authorization, notification and/or security in financial transactions, and/or in wireless communication transactions, for a plurality of accounts and types of accounts.

Other objects and advantages of the present invention will be apparent to those skilled in the art upon a review of the Description of the Preferred Embodiment taken in conjunction with the Drawings which follow.

DESCRIPTION OF THE PREFERRED EMBODIMENT

Figure 1:
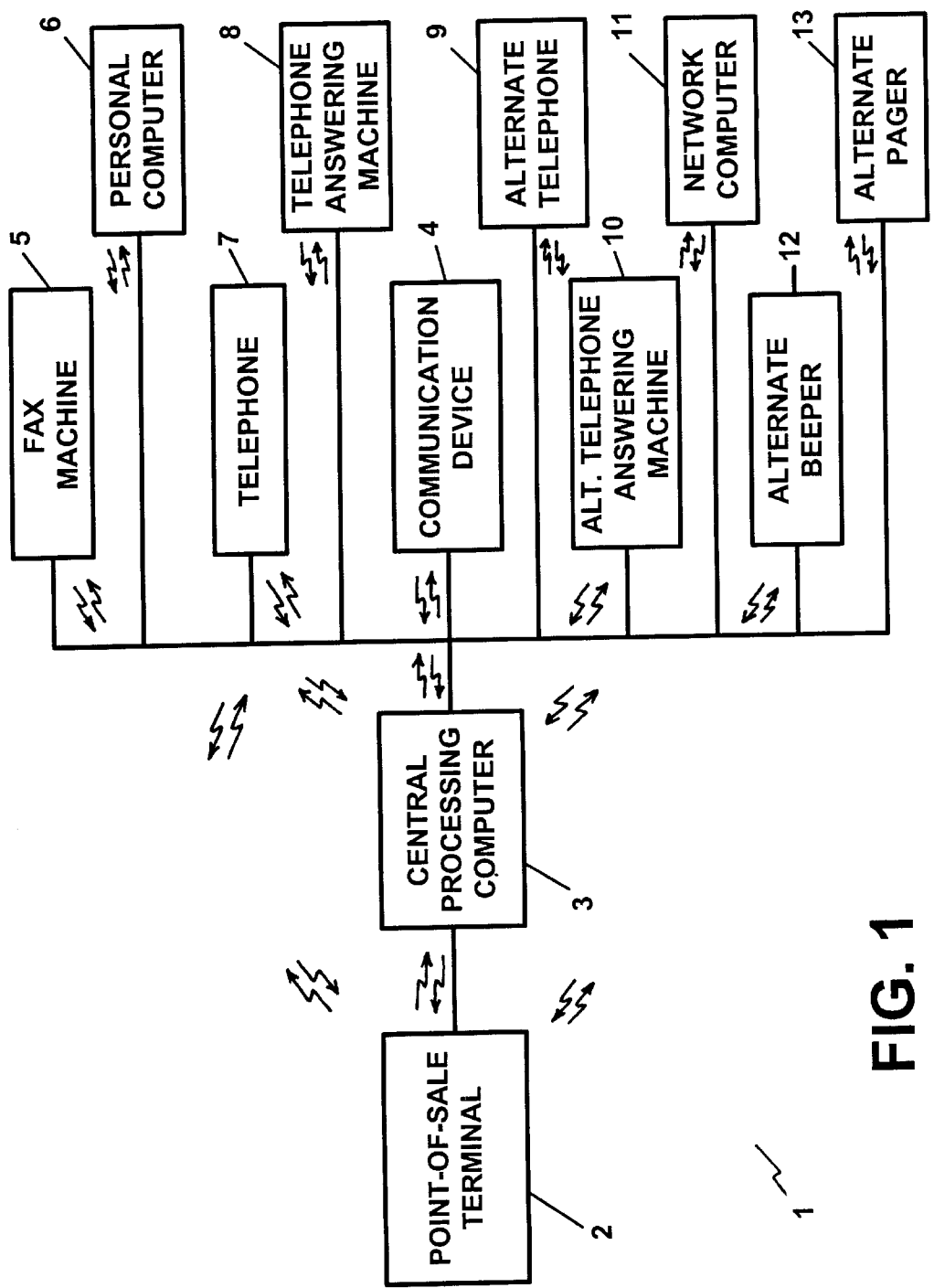
FIG. 1 illustrates a block diagram of the apparatus of the present invention which is utilized in conjunction with a credit card, a charge card, a debit card, and/or a currency or "smart" card authorization process.

FIG. 1 illustrates a block diagram of a preferred embodiment of the apparatus of the present invention, which is utilized in conjunction with a credit card, a charge card and/or a debit card authorization process. The apparatus of FIG. 1 is denoted generally by the reference numeral 1. With reference to FIG. 1, the apparatus consists of a point-of-sale authorization terminal 2 which terminals are found in various establishments and utilized in conjunction with the sale of goods and/or services and in other financial transactions.

The point-of-sale authorization terminal 2 (hereinafter referred to as "point-of-sale terminal") may be any of the widely used and well known terminals or devices for providing point-of-sale authorization for transactions involving credit cards, charge cards, debit cards and/or other currency or "smart" cards. The point-of-sale terminal 2 may be utilized at the location of the goods and/or service provider, such as the retail store or office, and/or the point-of-sale terminal 2 may be located at the site of the goods or service provider or vendor, such as in cases when the sale is a telephone order, mail order and/or other type of transaction, including transactions made over the INTERNET and/or other on-line mediums.

Typically, the terminals and devices for providing point-of-sale authorization comprise and utilize a magnetic card reader and/or magnetic strip card reader, for reading data from the magnetic strip located on credit cards, charge cards, debit cards and/or the currency or "smart" cards. The point-of-sale terminal 2 transmits an authorization request which may include the data pertaining to the particular card utilized in the transaction and the amount of the transaction, over a communications medium, to a central processing computer for processing the credit, charge, debit and/or other transaction request and/or the authorization request pertaining thereto.

The point-of-sale terminal 2 also receives the authorization and/or authorization data and/or information from the central processing computer. A printed transaction receipt may also be provided at and/or obtained via the point-of-sale terminal 2, or peripheral device associated therewith, for printing a transaction receipt which is usually or typically signed by the card holder in completing the transaction. The point-of-sale terminal 2 may be designed to read other data besides and/or in addition to magnetic card data. The point-of-sale terminal 2 may also comprise, or have associated therewith, a keypad for the manual entry of transaction information and/or data, such as the amount of the transaction. The point-of-sale terminal 2 may also be an integral component of a cash register or other transaction terminal or device which may provide for the automatic entry of transaction information and/or data.

The apparatus 1 also comprises a central processing computer 3 which services any predefined group of cardholders. For example, the central processing computer 3 may handle all MASTERCARD transactions for a given financial and/or credit institution. The central processing computer 3, for example, may process credit cards, charge cards, debit cards, and/or currency or "smart" cards and/or combinations of same, such as, for example, VISA®, MASTERCARD®, and/or AMERICAN EXPRESS® cards and process and/or mange account information pertaining thereto. The central processing computer 3 may also process accounts for any of the various banks and/or financial institutions which issue and/or manage credit cards, charge cards, debit cards and/or currency or "smart" cards (hereinafter referred to as "card" or "cards") and/or process or manage these accounts.

The central processing computer 3 may be a mainframe computer, a mini-computer, a micro-computer, a server computer, such as those utilized in conjunction with on-line services and/or in a network environment, and/or any other suitable computer or computer system.

In the preferred embodiment, the point-of-sale terminal 2 is linked and/or connected to the central processing computer 3 via a telecommunications system, link and/or medium (hereinafter referred to as "communications system") such as, for example, a telephone network or line it is important to note that the communications system which is utilized may be any communications system and may include telecommunication systems, satellite communications systems, radio communication systems, digital communications systems, digital satellite communications systems, personal communications services communication systems as well as any other appropriate communications system. The point-of-sale terminal 2 transmits signals and/or data to the central processing computer 3 as well as receives signals and/or data from the central processing computer 3.

The apparatus 1 also comprises a cardholder communication device 4 which may receive signals and/or data from either or both of the point-of-sale terminal 2 and/or the central processing computer 3. In the preferred embodiment of FIG. 1, the communication device 4 receives signals and data from the central processing computer 3 with said signals being transmitted via a suitable communication system. In the preferred embodiment, the communications system utilized for transmitting signals and/or data to the communication device 4 is a wireless telephone line and the communication device 4 is a telephone signal receiving device such as a telephone beeper or pager. The communication device 4 or pager receive s the wireless telephone signals and/or data from the central processing computer 3 during the authorization procedure as will be described in more detail below.

In the preferred embodiment, the communication device 4 is also equipped with a transmitter for transmitting signals and/or data to the central processing computer 3. In this regard, the central processing computer 3 transmits signals and/or data to the communication device 4 as well as receives signals and/or data from the communication device 4. The communication device 4 may also transmit signals and/or data directly to the point-of-sale terminal 2 and receive signals and/or data directly from the point-of-sale terminal 2. In the preferred embodiment, the point-of-sale terminal 2 transmits signals and/or data to the central processing computer 3 and receives signals and/or data from the central processing computer 3. Further, in the preferred embodiment, the communication device 4 receives signals and/or data from the central processing computer 3 and transmits signals and/or data to the central processing computer 3.

As noted above, the communication device 4 is a wireless device. In this regard, the communication device 4 or pager may be carried by the cardholder and/or be kept on and/or close to the cardholder's person so that the central processing computer 3 may transmit signals and/or data to the communication device 4 so as to communicate with the cardholder at any time. The communication device 4 may also comprise any one or more of a facsimile (fax) machine, a personal computer, a telephone, a telephone answering machine, an alternate telephone, an alternate telephone answering machine, a network computer, and/or an alternate beeper or pager. The central processing computer 3 may be linked with each of the above devices via any suitable communication system.

In the preferred embodiment, the apparatus 1 also comprises a facsimile (fax) machine 5, a personal computer 6, a telephone 7, a telephone answering machine 8, an alternate telephone 9, an alternate telephone answering machine 10, a network computer 11, an alternate beeper 12 and an alternate pager 13. The central processing computer 3 may be linked with the above fax machine 5, personal computer 6, telephone 7, associated answering machine 8, alternate telephone 9, alternate telephone answering machine 10, network computer 11, and/or alternate beeper 12 or pager 13, via any suitable communication system. In the preferred embodiment, a telecommunications link or telephone network, line or link, which may or may not be a wireless link depending on the device and/or the circumstances, is utilized in order to link the central processing computer 3 with each of the fax machine 5, the personal computer 6, the telephone 7, the associated answering machine 8, the alternate telephone 9, alternate telephone answering machine 10, the network computer 11, and/or the alternate beeper 12 and the alternate pager 13.

Figure 2:
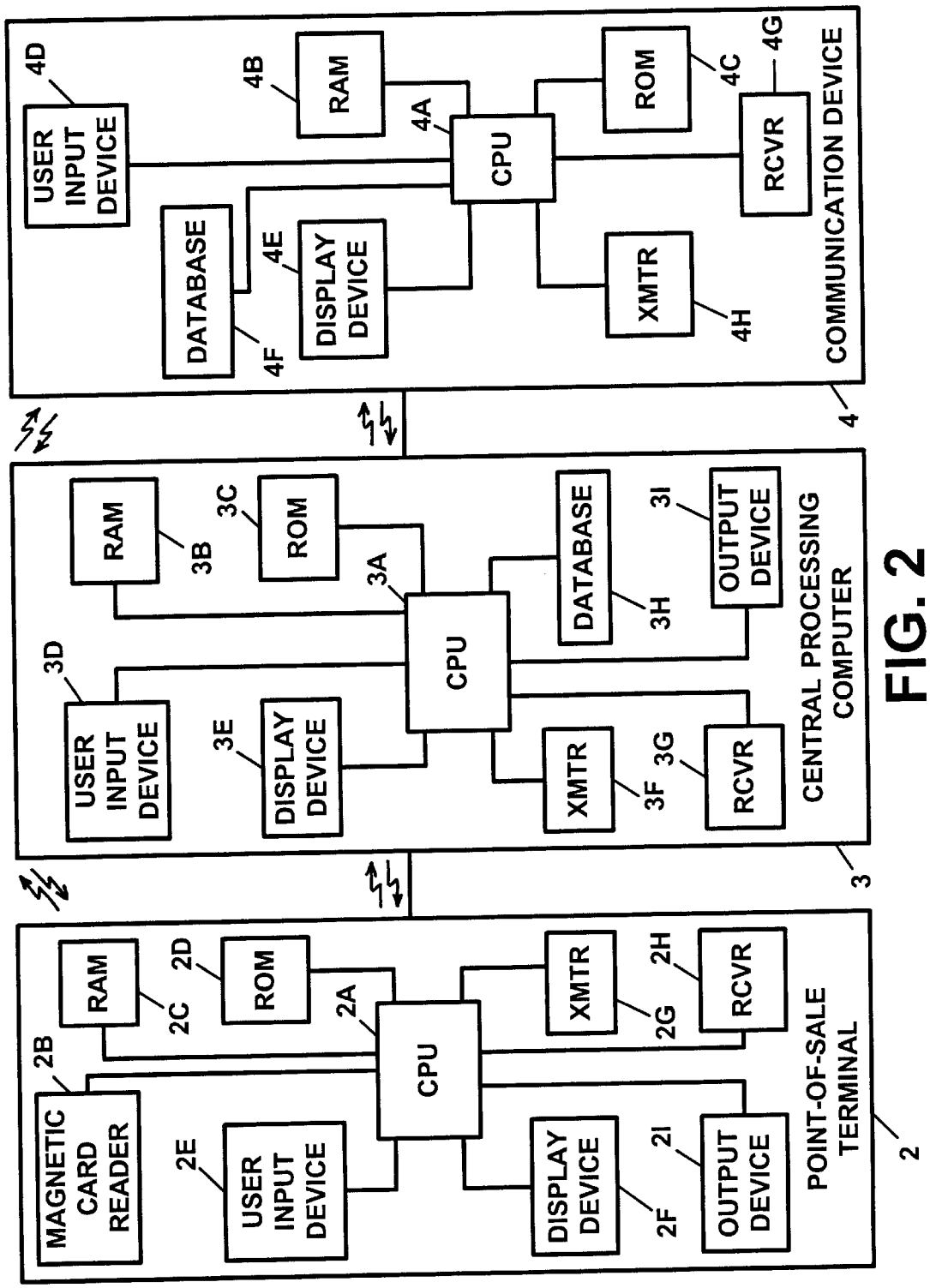
FIG. 2 illustrates the various components of the apparatus of FIG. 1.

FIG. 2 illustrates the various components of the apparatus 1 of FIG. 1. In FIG. 2, the point-of-sale terminal 2, in the preferred embodiment, comprises a central processing unit or CPU 2A, a magnetic card reader 2B, which is connected to the CPU 2A, associated random access memory 2C (RAM) and read only memory 2D (ROM) devices, which are also connected to the CPU 2A, a user input device 2E, which is typically a keypad or other suitable input device for inputting data into the terminal 2 and which is also connected to the CPU 2A, and a display device 2F for displaying information and/or data to a user.

The point-of-sale terminal 2 also comprises a transmitter 2G for transmitting signals and/or data to the central processing computer 3, and/or to the communication device 4 and/or to any other device associated with the cardholder and/or the apparatus, if desired. The transmitter 2G is also connected to the CPU 2A. The point-of-sale terminal 2 also comprises a receiver 2H for receiving signals and/or data from the central processing computer 3, and from the communication device 4 and/or any other associated device which may be utilized, if desired. The receiver 2H is also connected to the CPU 2A. The point-of-sale terminal 2 also comprises a printer 2I or other appropriate output device for outputting data to the user. The printer 2I is also connected to the CPU 2A. In the preferred embodiment, the printer 2I prints receipts corresponding to the transaction.

In FIG. 2, the central processing computer 3, in the preferred embodiment, comprises a central processing unit or CPU 3A, associated random access memory 3B (RAM) and read only memory 3C (ROM) devices, which are connected to the CPU 3A, a user input device 3D, which is a keypad and/or any other suitable input device for inputting data into the central processing computer 3 and which is also connected to the CPU 3A and a display device 3E for displaying information and/or data to a user or operator.

The central processing computer 3 also comprises a transmitter(s) 3F for transmitting signals and/or data to the point-of-sale terminal 2 and to the communication device 4 and/or to any one or more of the fax machine 5, personal computer 6, telephone 7, telephone answering machine 8, alternate telephone 9, alternate telephone answering machine 10, network computer 11 and/or alternate beeper 12 or alternate pager 13. The transmitter(s) 3F is also connected to the CPU 3A. The central processing computer 3 also comprises a receiver(s) 3G for receiving signals and/or data from the point-of-sale terminal 2 and from the communication device 4 and/or from any other suitable device which may be utilized in conjunction with the apparatus 1. The receiver(s) 3G is also connected to the CPU 3A. The central processing computer 3, in any and/or all of the embodiments described herein, may utilize a fax/modem and/or any other suitable computer communication device.

The central processing computer also comprises a database(s) 3H which contains account information and data pertaining to the cardholders and/or to the cardholder accounts. The database 3H contains information about the cardholder, the cardholders account number, credit and/or account limits, previous purchases, number of unauthorized purchases made to the account and other information and/or data necessary to manage and/or process an account transaction as described herein.

The database 3H may also comprise data and/or information regarding specific limitations and/or restrictions which may be placed on a particular account, which may be pre-selected and/or programmed by the cardholder and which may include limitations and/or restrictions on the usage of the card. The limitations and/or restrictions may include the types of transactions which are allowed and/or authorized, the goods and/or services which may be purchased with the card, the vendors, stores and/or service provider which may be authorized to accept the card, limits on the dollar amounts of transactions pertaining to each authorized vendor, seller and/or service provider, daily spending limits, and/or the geographical area or location wherein authorized card use may be limited, and/or authorized times for card usage (i.e. specific days, dates, time of day, time of month, year, etc.), and/or any other limitation and/or restriction regarding amount of transaction, parties involved, geographical area, and/or times of allowed usage. The database 3H is also connected to the CPU 3A. The central processing computer 3 also comprises a printer 3I or other appropriate output device for outputting information and/or data to a user or operator.

In FIG. 2, the communication device 4, in the preferred embodiment, comprises a central processing unit or CPU 4A, associated random access memory 4B (RAM) and read only memory 4C (ROM) devices, which are connected to the CPU 4A, a user input device 4D, which is a keypad or a plurality of keys and/or switches for inputting data into the communication device 4 and which is also connected to the CPU 4A, and a display device 4E, for displaying information and/or data to the cardholder, and a database 4F, which are also connected to the CPU 4A. The communication device 4 also comprises a receiver 4G for receiving signals and/or data from the central processing computer 3 and which is also connected to the CPU 4A, a transmitter 4H for transmitting signals and/or data to the central processing computer 3 and which is also connected to the CPU 4A.

In the preferred embodiment, the communication device 4 which is utilized is a pager with a reply feature and/or device. A two-way pager and/or pager systems may also be utilized for implementing the respective component system(s) in the communication device 4/central processing computer 3 combination and/or link.

The apparatus 1 of the present invention, in the preferred embodiment, may be utilized in order to facilitate cardholder authorization, notification and/or security measures in financial transactions involving credit cards, charge cards, debit cards, and/or currency or "smart" cards, in the manner described below and with reference to FIGS. 3A, 3B, and 3C. In this manner, the apparatus 1 of the present invention may be utilized to obtain cardholder authorization in a card-related transaction.

Figure 3A:
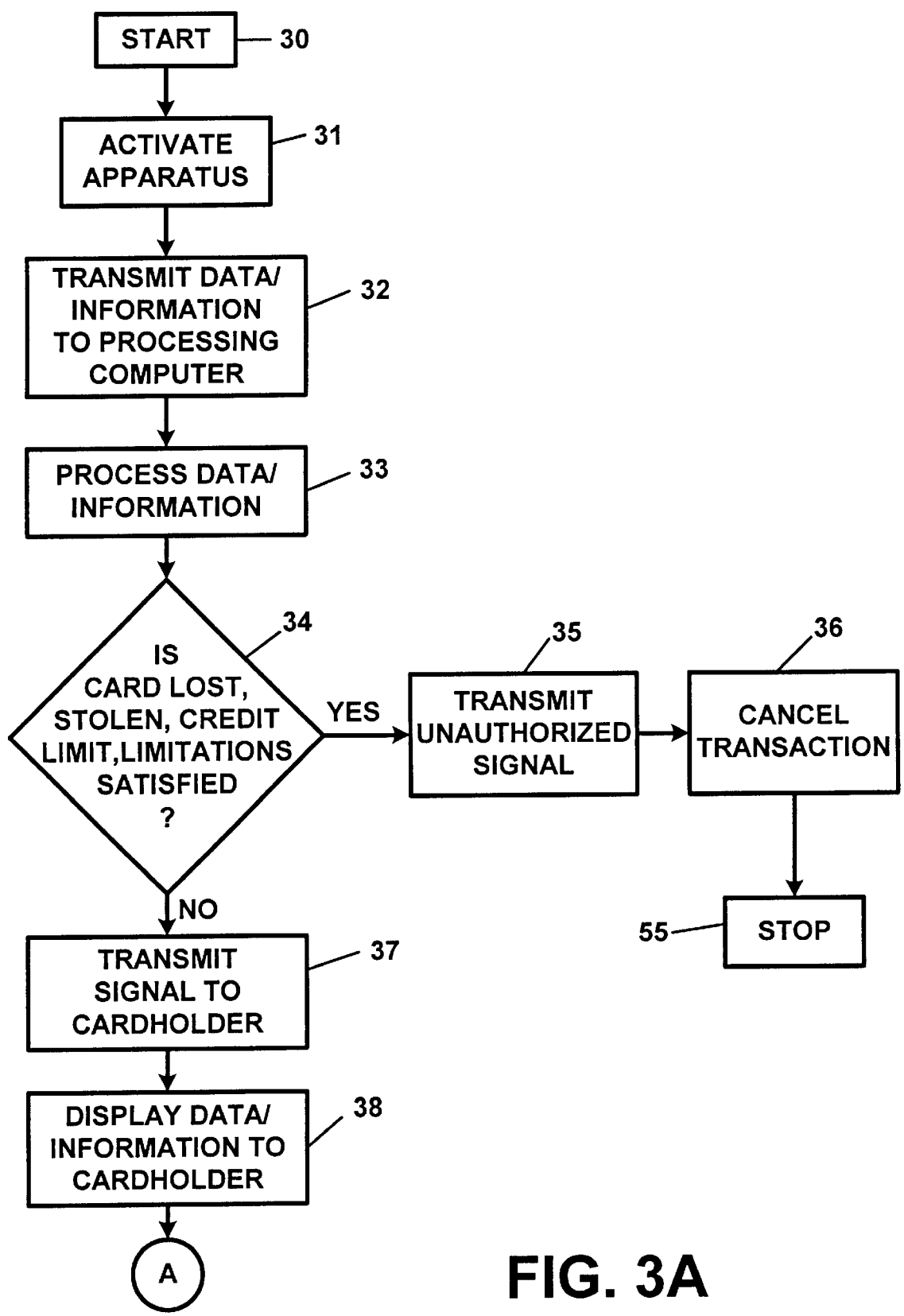
FIGS. 3A, 3B, and 3C illustrate the operation of the apparatus of FIG. 1 in flow diagram form.
Figure 3B:
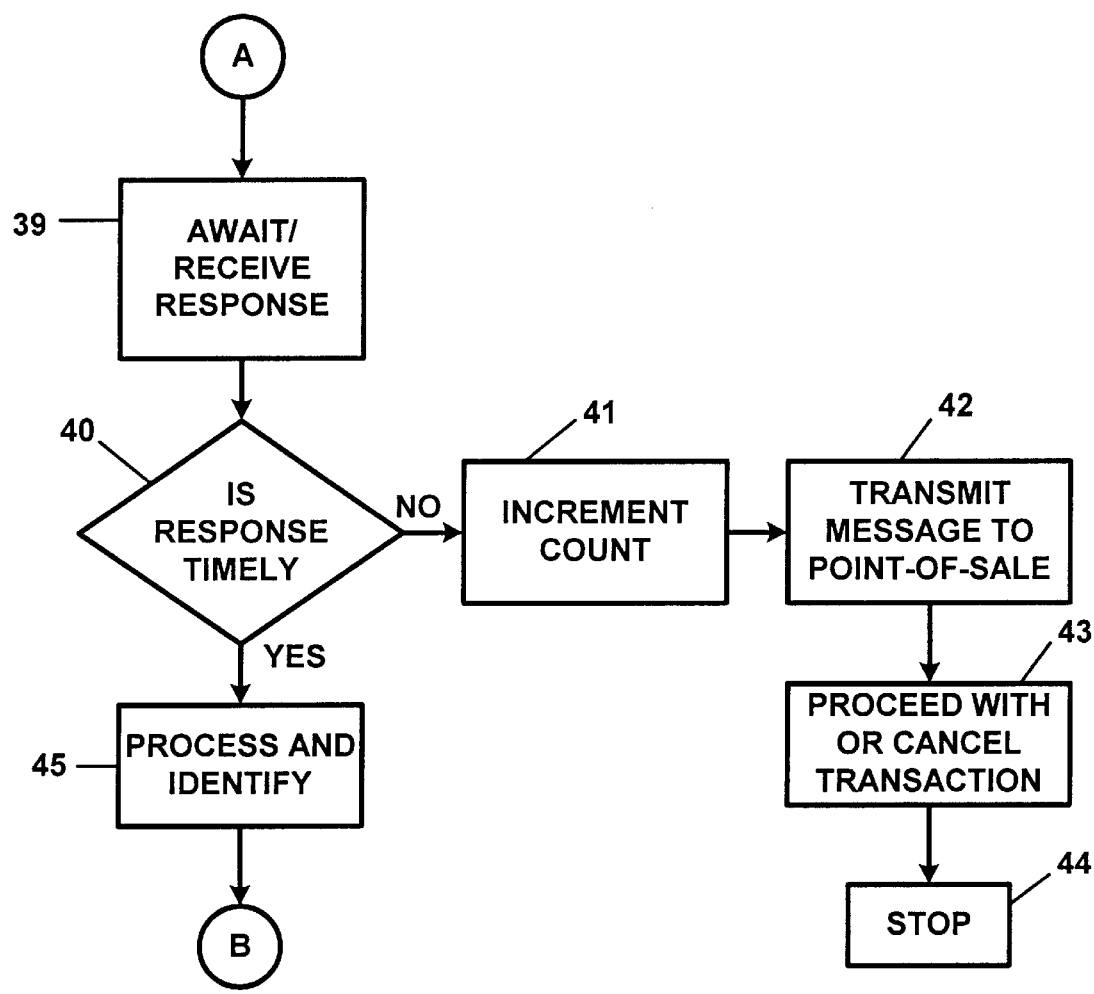
Figure 3C:
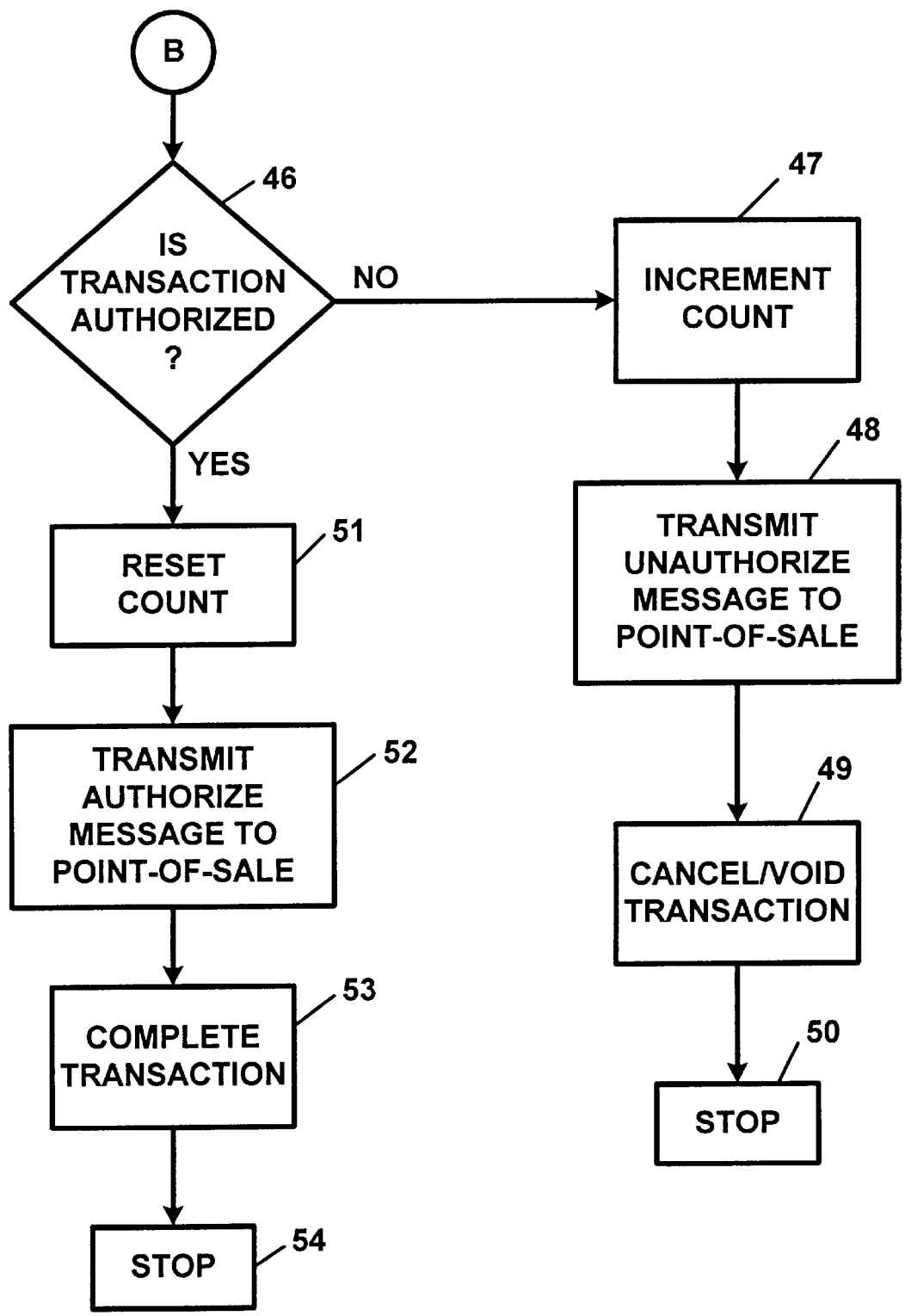

FIGS. 3A, 3B, and 3C illustrates the operation of the apparatus 1 in flow diagram form. With reference to FIGS.

3A, 3B, and 3C, the operation of the apparatus 1 commences at step 30 when the card, which is to be utilized in a credit card, charge card, debit card, and/or currency or "smart" card transaction, is presented in the transaction. At step 31, the sales or service attendant or point-of-sale terminal operator (hereinafter "point-of-sale terminal operator") will activate the apparatus 1 in any typical manner, such as by obtaining a phone line and entering card information into the point-of-sale terminal 2. This data entry is typically performed by swiping the magnetic strip of the card through the card reader 2B. The information and/or data pertinent to the transaction, and/or the card, is then transmitted, at step 32, to the central processing computer 3.

The central processing computer 3 will, at step 33, process the information and/or data pertinent to the transaction and/or to the particular card account and may request, if needed, that the point-of-sale operator enter the transaction amount. The central processing computer 3 will then process the information and/or data pertinent to the transaction in conjunction with the card account information in order to determine if the card has been lost, stolen and/or cancelled and/or de-activated. Further, the central processing computer 3 will perform a test to determine if the card has reached and/or exceeded the maximum credit, charge or debit limit and/or if the card has been depleted of its currency value.

The central processing computer 3 may utilize any of the widely known data processing and/or software routines, which are known to those skilled in that art, in order to process transaction requests and/or authorizations involving the use of the respective card(s). Once the information and/or data processing has been completed at step 33, the central processing computer 3, at step 34, will determine if the card has been lost, stolen, and/or cancelled and/or de-activated, or if the credit, charge or debit limit of the card has been reached and/or exceeded, or if the currency value of the card has been depleted.

The central processing computer 3 will, at step 34, also perform a test in order to determine if the predetermined maximum number of unauthorized transactions have occurred on the account. The unauthorized transactions count refers to transactions which are not authorized by the cardholder as will be described herein. The authorized transaction count (UNAUTHCT) is a variable which is pre-set to zero (0) at the time the card account is issued. Each time an unauthorized transaction occurs, the unauthorized transaction count is incremented by one (1). Once the unauthorized transaction count reaches a pre-defined limit of, for example, three (3), the central processing computer 3 will cancel the transaction and de-activate the card. The central processing computer 3 will then notify the cardholder. In this manner, the apparatus 1 will enable the central processing computer 3 of an issuing and/or card servicing institution to cancel and/or de-activate the card, either permanently and/or temporarily, in cases when the cardholder may have failed to respond or to reply to transaction notices, which may be the case when the cardholder is not aware that the card has been lost or stolen, or when the card or account number has been duplicated, "cloned", or in other ways utilized without the cardholder's authorization, and/or when the cardholder is unable to respond or reply to the transaction notices for some other reason(s). This feature of the present invention serves to put a usage limit on the use of the card(s). The central processing computer 3, at step 34, will also perform a test(s) to determine if any additional limitations and/or restrictions have been met and/or satisfied.

If any of the above listed conditions exist (i.e. card is lost, stolen, cancelled and/or de-activated, or credit, charge or debit limit is reached and/or exceeded, currency value depleted, unauthorized transaction limit reached or exceeded limitations and/or restrictions violated, etc.), the central processing computer 3 will, at step 35, transmit a signal to the point-of-sale terminal 2 indicating that the transaction is not approved and/or is not authorized. The point-of-sale terminal operator may then cancel the transaction, at step 36. The point-of-sale terminal operator may then confiscate the card and/or alert the authorities. Upon the completion of step 36, the apparatus will cease operation at step 55.

If, at step 34, the central processing computer 3 determines that the card is not lost, stolen, cancelled or de-activated, or that the credit, charge or debit limit of the card has not been reached or exceeded, or that the of unauthorized transactions count (UNAUTHCT) has not reached a pre-defined limit, or whether any other pre-defined, pre-selected and/or programmed limitation(s) and/or restriction(s) have been met, have been satisfied and/or have been reconciled, the central processing computer 3 will, at step 37, transmit a signal and/or data to the communication device 4 which is located at the cardholder.

At step 37, the central processing computer 3 will then also transmit respective signals and/or data to any one or more of the cardholder's designated fax machine 5, personal computer 6, telephone 7, telephone answering machine 8, alternate telephone 9, alternate telephone answering machine 10, network computer 11, and/or alternate beeper 12 or alternate pager 13.

The information and/or data which is transmitted to the communication device 4 includes information and/or data identifying the transaction and may include the name of the store or the service provider and the amount of the transaction. The information and/or data may also provide the time of the transaction, the location (i.e. city, town, village, state, country etc.) of the transaction. The information and/or data may also include the phone number of the central processing office and/or computer servicing the account so that the cardholder may telephone same in order to authorize or cancel the transaction. The information and/or data may also be supplemented to include the type of goods and/or services involved in the transaction, if such information can be entered at the point-of-sale terminal 2.

At step 38, the information and/or data which is transmitted from the central processing computer 3 and received at the communication device 4 is displayed to the cardholder on the display device 4E of the communication device 4. The information displayed on the display device 4E includes the name of the store or the service provider, the amount of the transaction, the time of the transaction and the location of the transaction. The information and/or data may also be supplemented to include the type of goods and/or services involved in the transaction, if such information can be entered at the point-of-sale terminal 2.

The apparatus 1 will then, at step 39, wait for the cardholder to respond to the transmission. During this time, the cardholder may either utilize the reply or two-way pager feature on the communication device 4 in order to either approve or authorize the transaction or disapprove of or void the transaction. At step 39, the central processing computer 3 will also receive the response if one is sent. At step 40, the apparatus 1 will determine if the cardholder has made a reply or response within the pre-defined time limit which is chosen, in the preferred embodiment, to be one (1) minute. The cardholder may also transmit a signal via an appropriate key or button suspending use of the card such as when he or she may first be apprised of the fact that the card has been lost or stolen. In instances when the communication device 4 does not have a reply or two-way pager feature, the cardholder may simply telephone the central processing office or a processing center for the card in order to personally appraise the center or office of his or her response to the central processing computer transmission regarding the transaction.

If the cardholder does not respond or reply to the central processing office within the pre-specified time, chosen, in the preferred embodiment, to be one (1) minute, the central office computer will, at step 41, increment the unauthorized transaction count (UNAUTHCT) by one (1) and will, at step 42, transmit a signal and/or data to the point-of-sale terminal 2 indicating that, with the exception of receiving the authorization of the cardholder, the transaction is otherwise approved. The point-of-sale terminal operator may then, at step 43, either proceed to consummate the transaction, try to obtain additional information from the purchaser, or cancel the transaction. The action taken by the point-of-sale terminal operator may be dictated by the specific agreement in effect between the sales and/or service provider establishment and the bank or financial institution administering the card account. Upon the completion of step 43, the operation of the apparatus 1 will cease at step 44. If the cardholder should reply or respond to the transaction notice at a later period, the response or reply information may then be utilized in order to approve of, or to disapprove and/or to dispute, the transaction.

If, at step 40, the response or reply is determined to be timely, the central processing computer 3 will, at step 45, process and identify the cardholder response. At step 46, the central processing computer 3 will determine if the cardholder has replied or responded so as to authorize the transaction. If the cardholder's response is to cancel, disapprove or, or not to authorize, the transaction, the central processing computer 3 will, at step 47, increment an unauthorized transaction count by 1. At this juncture, it is important to note that the unauthorized count (UNAUTHCT) is set to zero at the time of the issuance of the card. After the unauthorized transaction count has been incremented, the central processing computer 3 will, at step 48, transmit a signal and/or data to the point-of-sale terminal 2 which will notify and/or instruct the point-of-sale terminal operator that the transaction is not authorized and should, therefore, be cancelled or voided. The point-of-sale terminal operator may then cancel the transaction at step 49. The point-of-sale terminal operator may then confiscate the card and/or alert the authorities. Upon the completion of step 49, the apparatus will cease operation at step 50.

If, at step 46, the central processing computer 3 identifies the cardholder reply or response as being one to authorize the transaction, the central processing computer 3, at step 51, will reset the unauthorized transaction count (UNAUTHCT) to 0. An unauthorized transaction count (UNAUTHCT) of 0 will signify that any string of unauthorized transactions has now been broken by the cardholder, and further, that the present transaction is approved by the cardholder. The central processing computer 3 will then, at step 52, transmit a signal and/or data to the point-of-sale terminal 2 which will notify and/or instruct the point-of-sale terminal operator that the transaction is authorized and/or approved.

The point-of-sale terminal operator may then complete the transaction, at step 53. After the transaction has been completed at step 53, the operation of the apparatus 1 will cease at step 54.

In instances when the cardholder is a party to the transaction, he or she, having the communication device 4 on his or her person, may authorize the transaction at the point-of-sale location. If the transaction is a telephone and/or other remotely made transaction, the cardholder may authorize the transaction from his or her remote location. The cardholder may also program and/or set the communication device 4 to automatically authorize or disapprove or disallow transactions. In this regard, the communication device 4 may be programmable so as to receive and analyze the transaction information and/or data and reply and/or respond to same automatically and/or with preset and/or programmed relies and/or responses. The communication device 4 may also be programmable so as to limit the amounts of transactions. In this regard, the cardholder may provide for temporary transaction and/or purchasing amounts.

The communication device 4, in the preferred embodiment, is provided with a memory device for storing any number of transactions so that the cardholder may review his or her card and/or account activity and/or transactions which have occurred involving his or her card. In this manner, the cardholder may "scroll" through and/or in other ways review card and/or account activity. The communication device 4 may also be equipped to service more than one card. For example, a cardholder's MASTERCARD®, VISA®, and/or AMERICAN EXPRESS® card or cards and the accounts corresponding thereto may all be serviced with or by a single communication device 4.

The apparatus and method of the present invention provides for the real-time notification of financial transactions involving credit cards, charge cards, debit cards, and/or currency or "smart" cards, which enables a cardholder to monitor, in real-time, activity involving his or her card(s) and the corresponding accounts. The apparatus and method of the present invention also provides a means and a mechanism by which to inform a cardholder that his or her card(s) are lost or stolen, and/or that his or her card(s), and/or the account numbers corresponding thereto, are utilized without his or her authorization and also provides an indication to the cardholder of where his or her card(s) or corresponding account number(s) is being utilized in transactions. The cardholder may then report the card lost or stolen and/or cancel and/or de-activate the card and/or the account.

The present invention also provides a means and a mechanism by which to monitor the number of transactions which are unauthorized by the cardholder and to determine whether or not to authorize transactions and/or cancel or de-activate the card(s) and/or the account. In the above manner, the apparatus and method of the present invention provides an apparatus and a method for preventing and/or for drastically limiting fraudulent and/or unauthorized use of credit cards, charge cards, debit cards, and/or currency or "smart" cards and/or the account numbers corresponding thereto.

The present invention, in an alternate embodiment, may be utilized so as to provide authorization, notification and/or security in banking and related financial transactions involving checking accounts, savings accounts and/or automated teller machine (ATM) accounts and transactions and other transactions wherein an account owner may be notified of a transaction and/or an attempted transaction.

Figure 4:
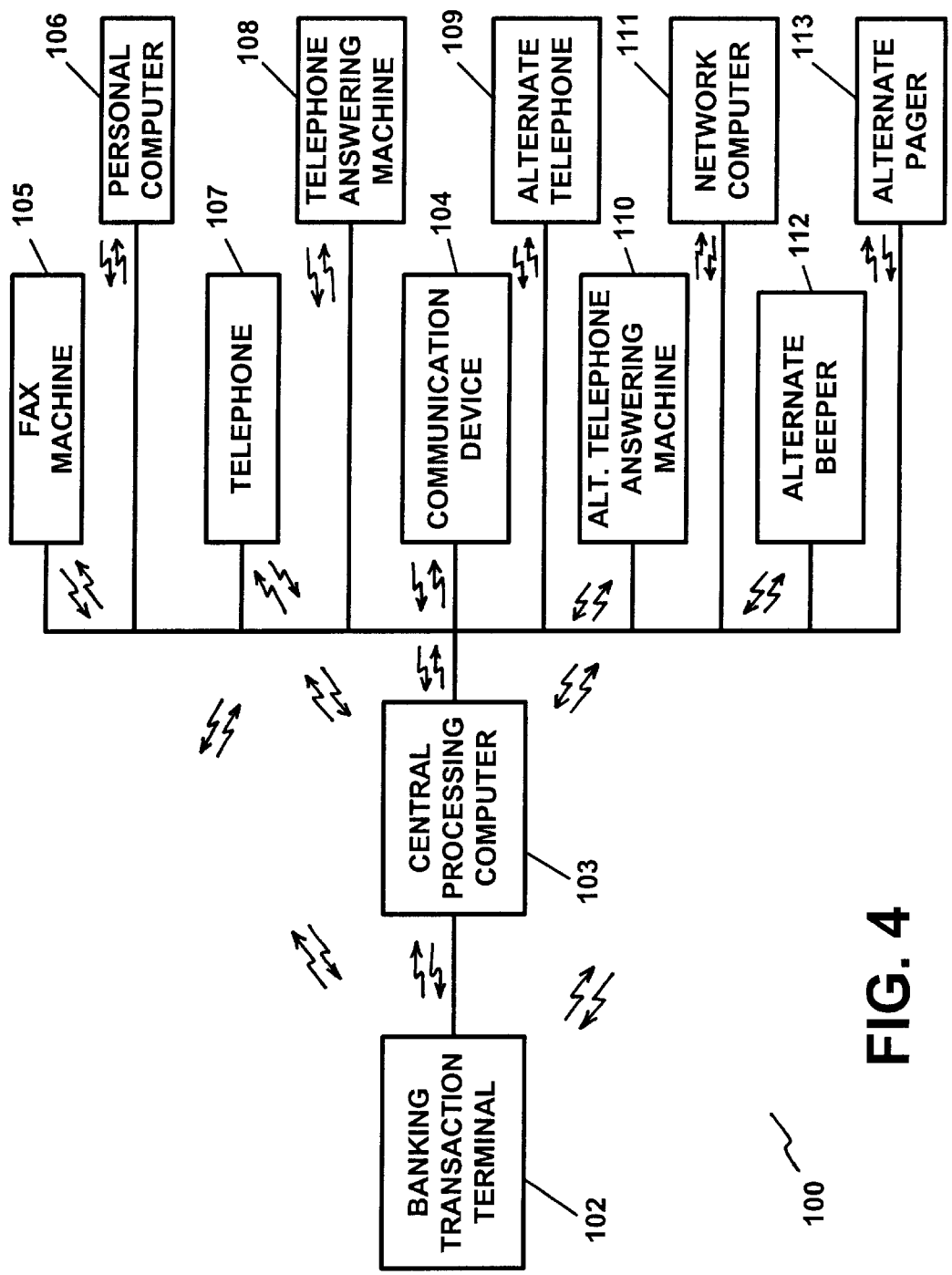
FIG. 4 illustrates a block diagram of an alternate embodiment of the apparatus of the present invention which is utilized in conjunction with a checking account, a savings account and/or an automated teller machine transaction.

FIG. 4 illustrates a block diagram of an alternate embodiment of the apparatus of the present invention which is utilized in conjunction with a checking account, savings account and/or ATM account and/or transaction (hereinafter referred to as a "banking transaction") and/or the authorization process involved therewith. The apparatus of FIG. 4 is denoted generally by the reference numeral 100. In FIG. 4, the apparatus 100 consists of a banking transaction terminal which terminals are found in banks and financial establishments. In the preferred embodiment, the banking transaction terminal 102 is a teller terminal, a processing computer terminal and/or an ATM terminal. Any other terminal or similar device may also be utilized as the banking transaction terminal 102 depending upon the application and/or the transaction.

The banking transaction terminal 102 (hereinafter referred to as "banking terminal") may be any of the widely used and well known terminals or devices for providing banking transactions over-the-counter, ATM transactions and/or in any other type of financial transactions, including clearing transactions, check clearing and/or account charging and/or charge-back transactions, which transactions banks and financial institutions perform and/or engage in.

Typically, the banking terminals and/or devices comprise a computer terminal having an input device such as a keyboard and/or various reader and/or scanning device for reading and/or scanning, respectively, information and/or data necessary in order to perform the transaction. The banking terminal transmits an authorization request which may include the data pertaining to the particular account which is accessed and/or involved in the transaction and the type and the amount of the transaction, over a communications medium, to a central processing computer for processing the transaction, the transaction request and/or the authorization request pertaining thereto. The banking terminal may transmit the transaction authorization request and/or notice to a central processing computer via a central bank computer (not shown) which may be a central computer at the particular bank or financial institution. The central processing computer may also be a central computer system which is not located at the bank or financial institution, but rather, services the particular bank or financial institution or a group of banks or financial institutions.

The banking terminal 102 also receives the transaction and/or authorization data and/or information from the central processing computer. If a central bank computer is utilized, the data transmitted from the central processing computer would be transmitted to the banking terminal 102 via the central bank computer. A printed transaction receipt may also be provided at and/or obtained via the banking terminal 102, or peripheral device associated therewith, for printing a transaction receipt which is usually provided to the account holder at the time and/or location of the transaction.

The banking terminal 102 may also comprise, and/or have associated therewith, a keypad for the manual entry of transaction information and/or data, such as the amount of the transaction, account number, etc. The banking terminal 102 may also be an integral component of a teller and/or cashier work station and/or other transaction terminals and/or devices, including those which may provide for the automatic entry of transaction information and/or data.

The apparatus 100 also comprises a central processing computer 103 which services any bank and/or financial institution and/or any pre-defined group of banks and/or financial institutions and/or any number of accounts associated therewith. For example, the central processing computer 103 may handle all checking accounts, savings accounts and/or other accounts for a given bank or banks. The central processing computer 103, for example, may process and maintain records of deposits, withdrawals, checks cashed, drafts, ATM deposits, ATM withdrawals, charges made against an account, credits made to an account, etc., and/or any combinations of same. The central processing computer 103 may process accounts for any of the various banks and/or financial institutions.

In the preferred embodiment, the banking terminal 102 is linked and/or connected to the central processing computer 103 via a telecommunications system, link and/or medium (hereinafter referred to as "communications system") such as, for example, a telephone network or line. As noted above, the banking terminal 102 may or may not be linked to the central processing computer 103 via a central bank computer. It is important to note that the communications system which is utilized may be any communications system and may include telecommunication systems, satellite communications systems, radio communication systems, digital communications systems, digital satellite communications systems, personal communications services communication systems as well as any other appropriate communications system. The banking terminal 102 transmits signals and/or data to the central processing computer 103 as well as receives signals and/or data from the central processing computer 103.

The central processing computer 103 may be a mainframe computer, a mini-computer, a micro-computer, a server computer, such as those utilized in conjunction with on-line services and/or in a network environment, and/or any other suitable computer or computer system.

The apparatus 100 also comprises an account owner communication device 104 which may receive signals and/or data from either or both of the banking transaction terminal 102 and/or the central processing computer 103. In the preferred embodiment of FIG. 4, the communication device 104 receives signals and/or data from the central processing computer 103 with said signals being transmitted via a suitable communication system. In the preferred embodiment, the communications system utilized for transmitting signals and/or data to the communication device 104 is a wireless telephone line and the communication device 104 is a wireless telephone signal receiving device such as a telephone beeper or pager. The communication device 104, which may be a pager, receives the wireless telephone signals and/or data from the central processing computer 103 during the authorization procedure as will be described in more detail below.

In the preferred embodiment, the communication device 104 is also equipped with a transmitter for transmitting signals and/or data to the central processing computer 103. In this regard, the central processing computer 103 transmits signals and/or data to the communication device 104 as well as receives signals and/or data from the communication device 104. The communication device 104 may also transmit signals and/or data directly to the banking terminal 102 and receive signals and/or data directly from the banking terminal 102. In the preferred embodiment, the banking terminal 102 transmits signals and/or data to the central processing computer 103 and receives signals and/or data from the central processing computer 103. Further, in the preferred embodiment, the communication device 104 receives signals and/or data from the central processing computer 3 and transmits signals and/or data to the central processing computer 103.

As noted above, the communication device 104 is a wireless device. In this regard, the communication device 104 or pager may be carried by the account owner and/or be kept on and/or close to the account owner's person so that the central processing computer 103 may transmit signals and/or data to the communication device 104 so as to communication with the account owner at any time.

In the preferred embodiment, the apparatus 100 also comprises a facsimile (fax) machine 105, a personal computer 106, a telephone 107, a telephone answering machine 108, an alternate telephone 109, an alternate telephone answering machine 110, a network computer 111, and/or an alternate beeper 112 or alternate pager 113. The central processing computer 103 may be linked with the above fax machine 105, personal computer 106, telephone 107, associated answering machine 108, alternate telephone 109, alternate telephone answering machine 110, network computer 111 alternate beeper 112 and alternate pager 113, via any suitable communication system. In the preferred embodiment, a telecommunications link or telephone line or link, which may or may not be a wireless link, depending on the device and/or the circumstances, is utilized in order to link the central processing computer 103 with each of the fax machine 105, the personal computer 106, the telephone 107, the associated answering machine 108, the alternate telephone 109, the alternate telephone answering machine 110, the network computer 111, the alternate beeper 112 and the alternate pager 113.

Figure 5:
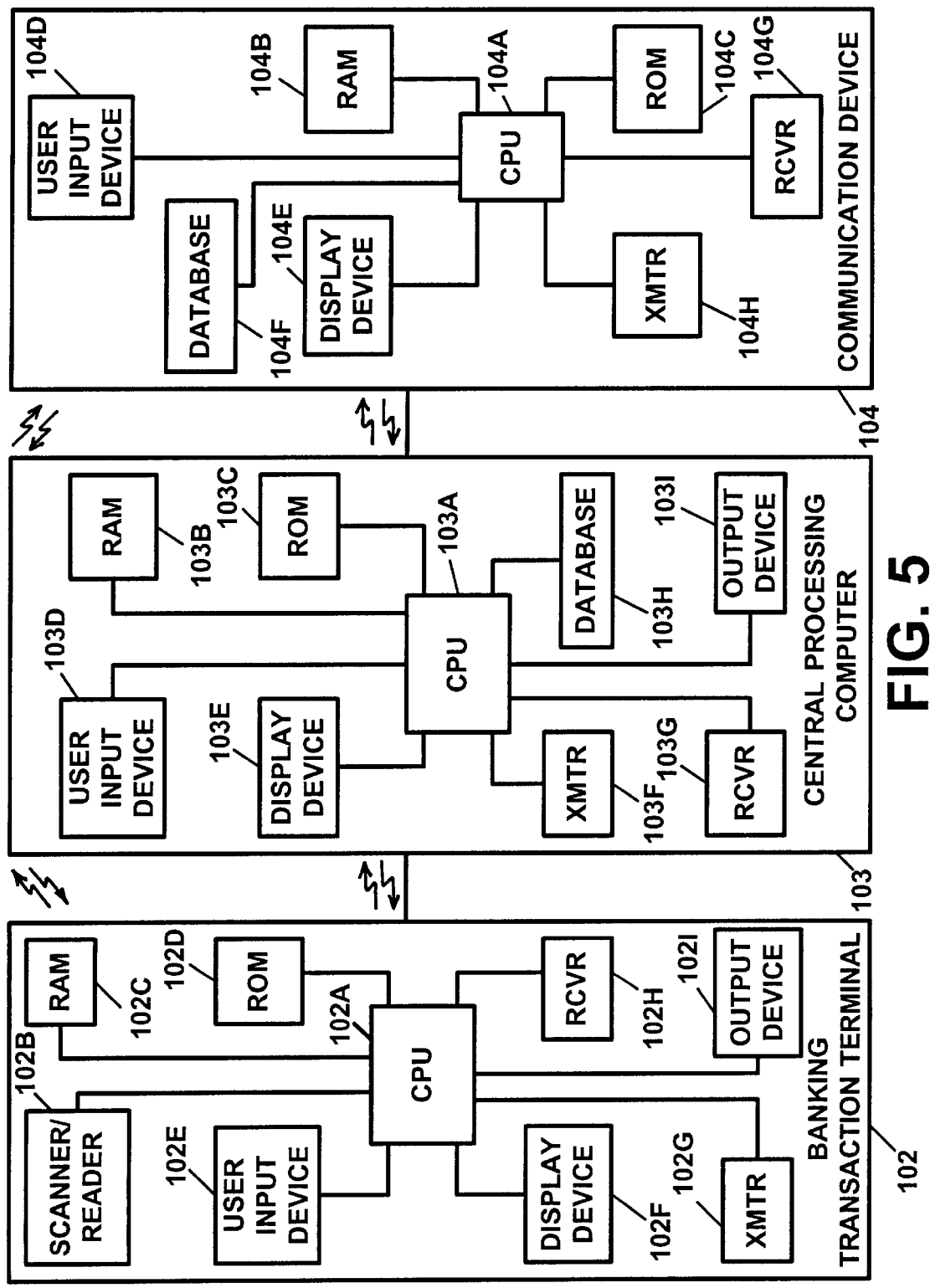
FIG. 5 illustrates the various components of the apparatus of FIG. 4.

FIG. 5 illustrates the various components of the apparatus 100 of FIG. 4. In FIG. 5, the banking terminal 102, in the preferred embodiment, comprises a central processing unit or CPU 102A, a scanner or reader 102B, which is connected to the CPU 102A, associated random access memory 102C (RAM) and read only memory 102D (ROM) devices, which are also connected to the CPU 102A, a user input device 102E, which is typically a keypad or other suitable input device for inputting data into the banking terminal 102 and which is also connected to the CPU 102A, and a display device 102F for displaying information and/or data to a user or operator, which display device 102F is also connected to the CPU 102A.

The banking terminal 102 also comprises a transmitter 102G for transmitting signals and/or data to the central processing computer 103, and/or to the communication device 104 and/or to any other device associated with the account owner and/or the apparatus, if desired. The transmitter 102G is also connected to the CPU 102A. The banking terminal 102 also comprises a receiver 102H for receiving signals and/or data from the central processing computer 103, and from the communication device 104 and/or from any other associated device which may be utilized, if desired. The receiver 102H is also connected to the CPU 102A. The banking terminal 102 also comprises a printer 102I or other appropriate output device for outputting data to the operator. The printer 102I is also connected to the CPU 102A. In the preferred embodiment, the printer 102I prints receipts corresponding to the transaction.

In FIG. 5, the central processing computer 103, in the preferred embodiment, comprises a central processing unit or CPU 103A, associated random access memory 103B (RAM) and read only memory 103C (ROM) devices, which are connected to the CPU 103A, a user input device 103D, which is a keypad or any other suitable input device, for inputting data into the central processing computer 103 and which is also connected to the CPU 103A, and a display device 103E for displaying information and/or data to a user or operator.

The central processing computer 103 also comprises a transmitter(s) 103F for transmitting signals and/or data to the banking terminal 102 and to the communication device 104 and/or to any one or more of the fax machine 105, the personal computer 106, the telephone 107, the telephone answering machine 108, the alternate telephone 109, the alternate telephone answering machine 110, the network computer 111, the alternate beeper 112, and/or the alternate pager 113. The transmitter(s) 103F is also connected to the CPU 103A. The central processing computer 103 also comprises a receiver(s) 103G for receiving signals and/or data from the banking transaction terminal 102 and from the communication device 104 and/or from any other suitable device which may be utilized in conjunction with the apparatus 100. The receiver(s) 103G is also connected to the CPU 103A.

The central processing computer 103 also comprises a database(s) 103H which contains account information and data pertaining to the account owner's account(s). The database 103H contains information about the account owner, the account number, etc., and any other information and/or data necessary to the manage and/or process an account and/or account transaction as described herein. The database 103H is also connected to the CPU 103A. The central processing computer 103 also comprises a printer 103I or other appropriate output device for outputting information and/or data to a user or operator, which printer 103I or other output device is also connected to the CPU 103A.

In FIG. 5, the communication device 104, in the preferred embodiment, comprises a central processing unit or CPU 104A, associated random access memory 104B (RAM) and read only memory 104C (ROM) devices, which are also connected to the CPU 104A, a user input device 104D, which is a keypad or a plurality of keys and/or switches for inputting data into the communication device 104 and which is also connected to the CPU 104A, and a display device 104E, for displaying information and/or data to the account owner, and a database 104F. This display device 104E and the database 104F are also connected to the CPU 104A. The communication device 104 also comprises a receiver 104G for receiving signals and/or data from the central processing computer 103 and which is also connected to the CPU 104A, and a transmitter 104H for transmitting signals and/or data to the central processing computer 103 and which is also connected to the CPU 104A.

In the preferred embodiment, the communication device 104, which is utilized, is a pager with a reply feature and/or device. A two-way pager and/or pager system(s) may also be utilized for implementing the respective component systems in the communication device 104/central processing computer 103 combination and/or link.

The apparatus 100 of the present invention, in the preferred embodiment, may be utilized in order to facilitate account owner authorization, notification and/or security, in financial transactions involving checking accounts, savings accounts and ATM accounts, and/or any transactions involving same in the manner described below and with reference to FIGS. 6A, 6B and 6C. In this manner, the apparatus and method of the present invention may be utilized to obtain account owner authorization in a banking and/or financial transaction.

Figure 6A:
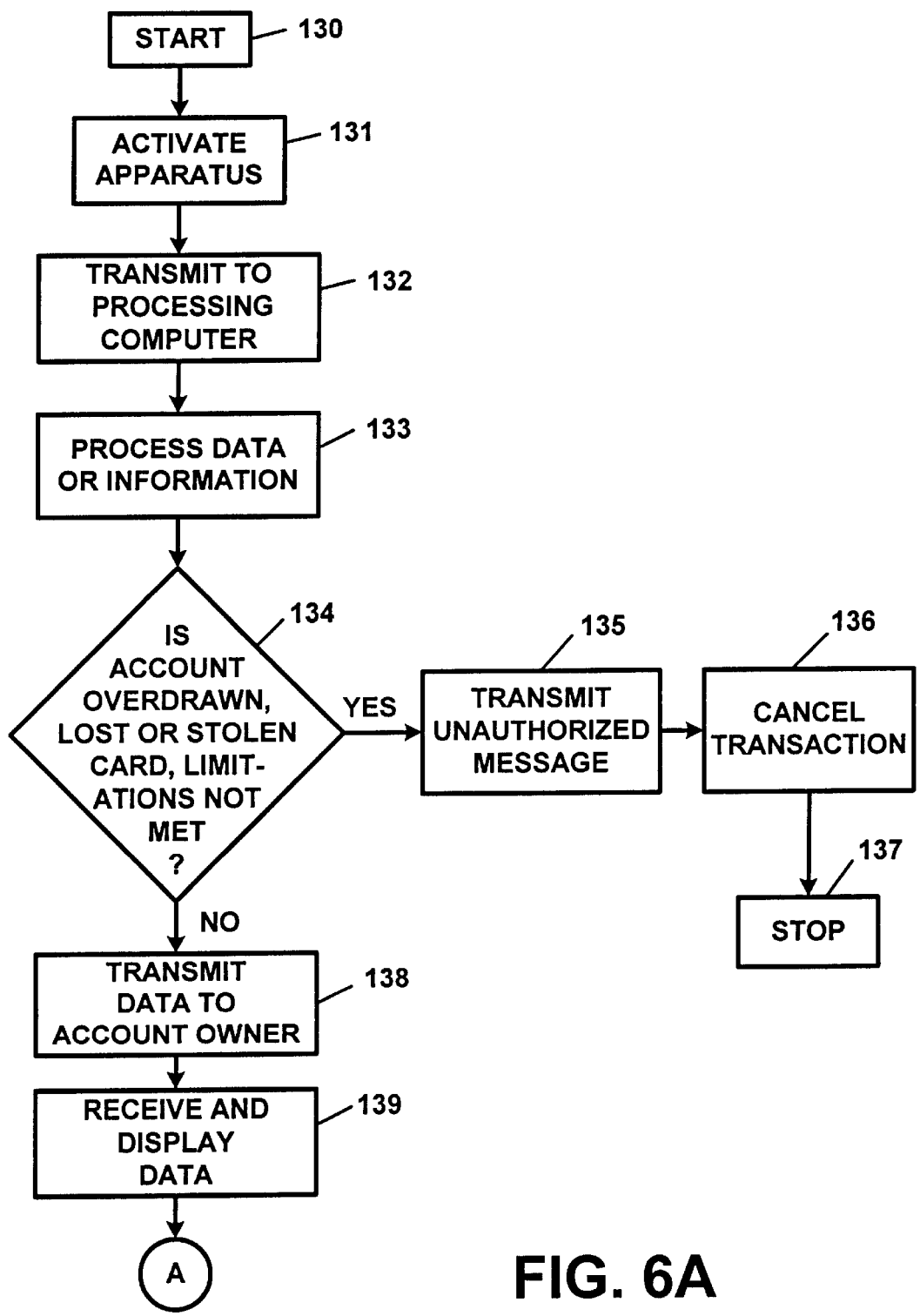
FIGS. 6A, 6B, and 6C illustrate the operation of the apparatus of FIG. 4 in flow diagram form.
Figure 6B:
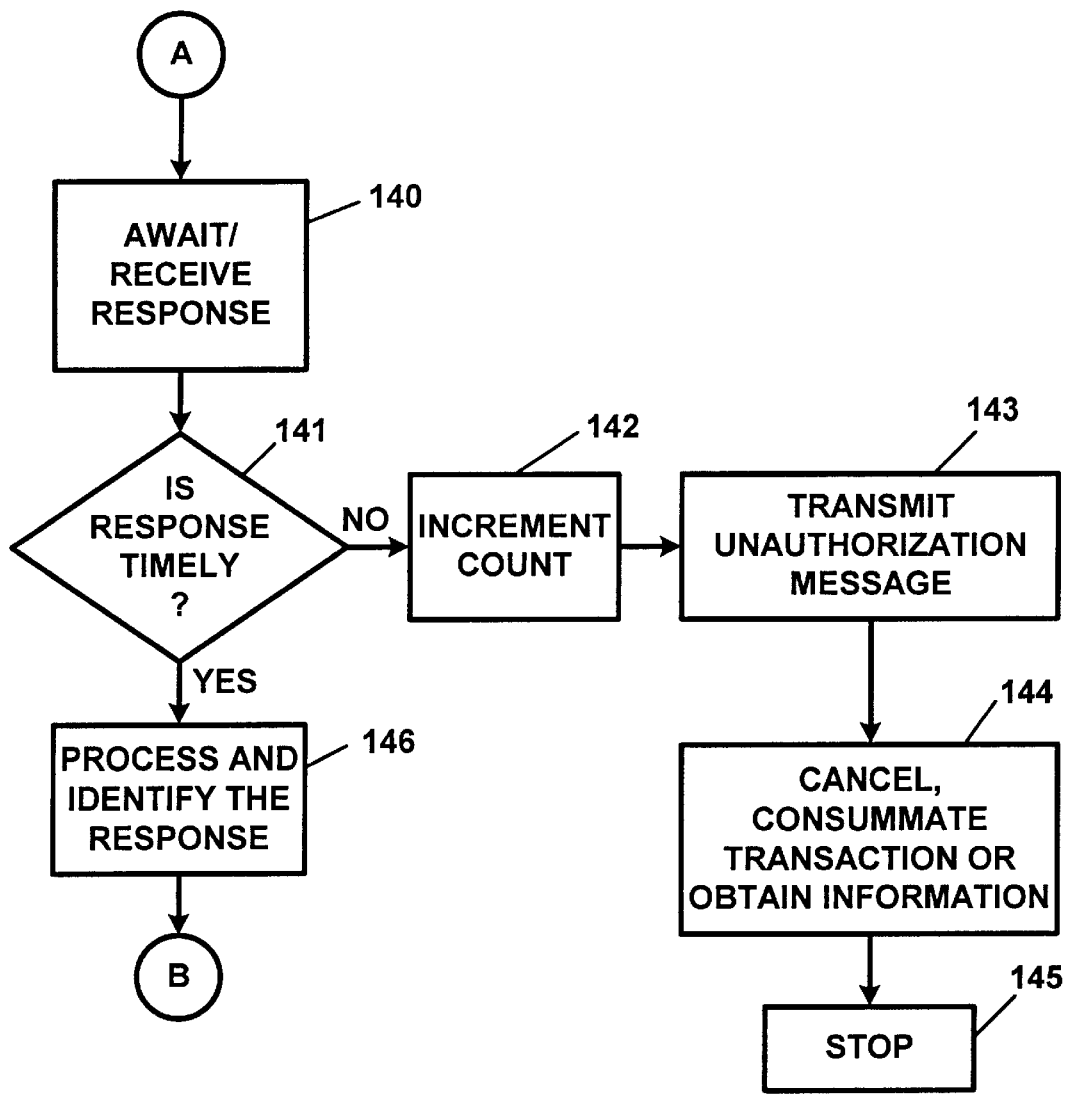
Figure 6C:
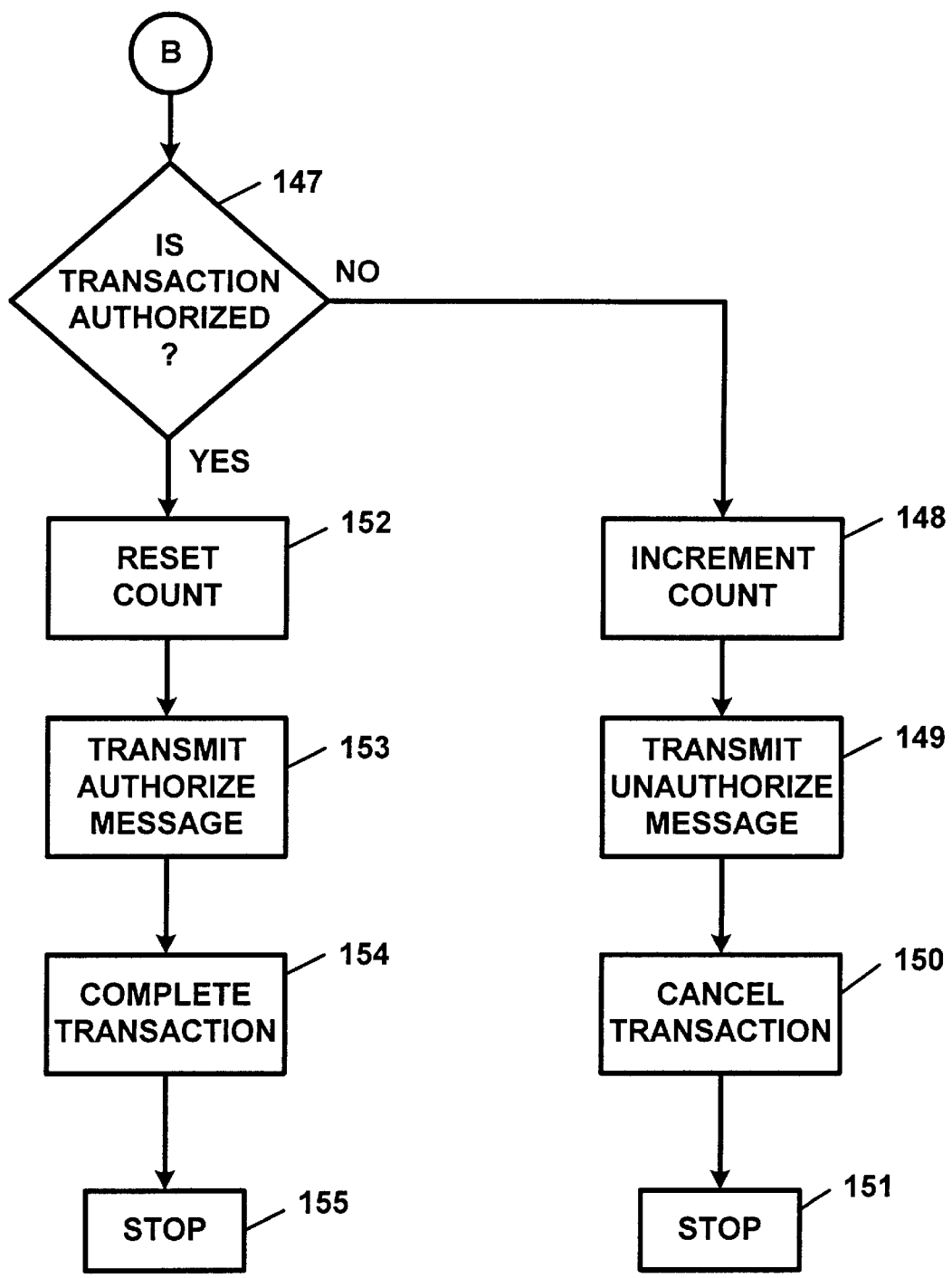

FIGS. 6A, 6B and 6C illustrates the operation of the apparatus 100 in flow diagram form. With reference to FIGS. 6A, 6B and 6C, the operation of the apparatus 100 commences at step 130 when the financial transaction and/or instrument or ATM card is presented to the bank or financial institution employee, representative and/or placed in a card reader, respectively. At step 131, the employee or representative of the bank or financial institution will activate the apparatus, via the banking transaction terminal 102, in any typical manner, such as by entering account and/or card information, into the banking transaction terminal 102. This data entry is typically performed by manual data entry and/or via a card reader, depending upon the transaction. For example, if a person offers a check for cashing and provides a savings account or a checking account number, as the means by which to endorse the check, the employee or representative will enter the savings account or checking account number into the banking terminal 102 for processing. Similarly, if one desires to withdraw money from an ATM account, the card reader will read and enter the account number and/or information for processing. The information and/or data pertinent to the transaction and the card is then transmitted, at step 132, to the central processing computer 103.

The central processing computer 103 will then, at step 133, process the information and/or data pertinent to the transaction and to the particular account. The central processing computer 103 may utilize any of the widely known data processing and/or software routines, which are known to those skilled in that art, in order to process transaction requests and/or authorizations involving the use of the respective account(s) and/or related card(s).

The central processing computer 103 will process the information and/or data pertinent to the transaction in conjunction with the account information in order to determine the status of the account (i.e. whether any holds have been placed on the account, such as those prohibiting withdrawal(s). Further, the central processing computer 103 will then perform a test, at step 134, in order to determine if the transaction amount has reached and/or exceeded the amount available in the account and/or if the ATM card has been reported lost, stolen, cancelled and/or de-activated, and/or determine whether any other pre-defined, pre-selected and/or programmed limitations) and/or restriction(s) have been met, satisfied and/or reconciled. The central processing computer 103 will also perform a test in order to determine if the predetermined maximum number count of unauthorized transactions, pre-defined in the preferred embodiment to be one (1), has occurred on the account.

The unauthorized transaction count refers to a count of the transactions which are not authorized by the account owner as will be described herein. The authorized transaction count (UNAUTHCT) is a variable which is pre-set to zero (0) at the time the account is opened. Each time an unauthorized transaction occurs, the unauthorized transaction count is incremented by one. Once the unauthorized transaction count reaches a pre-defined limit of, for example, one (1), although it may be pre-defined to be zero (0), the central processing computer 103 will cancel the transaction and de-activate the account and/or the ATM card. The central processing computer 103 will then notify the account owner. In this manner, the apparatus 100 will enable the central processing computer 103 of a banking and/or financial institution to cancel and/or de-activate the account and/or the ATM card, either permanently or temporarily, in cases when the account owner may have failed to respond or to reply to transaction notices, which may be the case when the account owner is not aware that the account has been charged, overdrawn, and/or that the ATM card has been lost or stolen, cancelled or de-activated, duplicated, "cloned", or in other ways utilized without the account owner's knowledge or authorization, or when the account owner is unable to respond or reply to the transaction notices for some other reason(s). This feature of the present invention serves to place a transaction stop limit on the account and/or on the use of the ATM card.

If any of the above listed conditions exist (i.e. account overdrawn and/or ATM card is lost, stolen, cancelled and/or de-activated), the central processing computer 103 will, at step 135, transmit a signal to the banking transaction terminal 102 indicating that the transaction is not approved and/or is not authorized. The banking terminal operator, or employee, or representative, may then cancel the transaction at step 136. The employee or representative may then alert the authorities and/or confiscate the ATM card. In the case when an ATM machine is utilized as the banking terminal 102, the ATM machine may confiscate the ATM card automatically. Upon the completion of step 136, the apparatus will cease operation at step 137.

If, at step 134, the central processing computer 103 determines that the account is not overdrawn or that the ATM card is not lost, stolen, cancelled or de-activated, or that the of unauthorized transactions count (UNAUTHCT) has not reached a predefined limit, and/or that pre-defined or pre-specified limitations and/or restrictions have been met, the central processing computer 103 will, at step 138, transmit a signal and/or data to the communication device 104 which is located at the account owner.

At step 138, the central processing computer 103 will then also transmit respective signals and/or data to any one or more of the cardholder's designated fax machine 105, personal computer 106, telephone 107, telephone answering machine 108, alternate telephone 109, alternate telephone answering machine 110, network computer 111, and/or alternate beeper 112 or alternate pager 113.

The information and/or data transmitted to the communication device 104 includes information and data identifying the transaction and may include the name of the bank or financial institution where the transaction is taking place, the account number and/or description, the amount of the transaction, the time of the transaction and the location (i.e. city, town, village, state, country etc.) of the transaction. The information and/or data may also include the phone number of the central processing office and/or computer servicing, and/or the banking and/or financial institution handling, the account so that the account owner may telephone same in order to authorize or cancel the transaction. The information and/or data may also be supplemented to include a description of the person seeking to make the transaction and the type of transaction sought (i.e. cash withdrawal, cashing of check, etc.).

At step 139, the information and/or data which is transmitted from the central processing computer 103, and received at the communication device 104, is displayed to the account owner on the display device 104E of the communication device 104. The information displayed on the display device 104 includes the name of the banking and/or financial institution, the amount of the transaction, the time of the transaction and the location of the transaction. The information and/or data may also include the type of transaction and a description of the person seeking to make the transaction, etc.

The apparatus 100, at step 140, will then wait for the account owner to respond to the transmission. During this time, the account owner may either utilize the reply or two-way pager feature on the communication device 104 in order to either approve or authorize the transaction or disapprove of, or void, the transaction. At step 140, the apparatus 100 will receive the reply or response from the account owner. At step 141, the central processing computer 103 will determine if the account owner has made a reply or response within the pre-defined time limit which is chosen, in the preferred embodiment, to be one (1) minute. The account owner may also transmit a signal via an appropriate key or button suspending use of the account or ATM card, such as when he or she may first be apprised of the fact that the account is being unlawfully accessed, or the use thereof is unauthorized, or that the ATM card has been lost or stolen.

In instances when the communication device 104 does not have a reply or two-way pager feature, the account owner may simply telephone the central processing office or processing center and/or the banking or financial institution so as to personally reply or respond to the authorization request.

If, at step 141, it is determined that the account owner's reply or response was not made within the pre-specified time, chosen in the preferred embodiment to be one (1) minute, the central processing computer 103 will, at step 142, increment the unauthorized transaction count (UNAUTHCT) by one (1) and will, at step 143, transmit a signal and/or data to the banking transaction terminal 102 indicating that the transaction is not authorized by the account owner. The banking terminal operator may then, at step 144, either cancel the transaction, proceed to consummate the transaction, and/or attempt to obtain additional information or identification from the customer and/or obtain an alternate account number from which to draw against.

The action taken by the banking transaction terminal operator may be dictated by the specific agreement in effect between the account owner and the bank or financial institution administering the accounts. Upon the completion of step 144, the operation of the apparatus will cease at step 145. If the account owner should reply or respond to the transaction notice at a later period, this information may then be utilized to approve of or to disapprove and/or to dispute the transaction.

If, at step 141, it is determined that the reply or response was timely, the central processing computer 103 will, at step 146, process and identify the account owner response. At step 147, the central processing computer 103 will determine if the account owner has authorized the transaction. If the account owner's response is to cancel, to disapprove, or to not authorize, the transaction, the central processing computer 103 will, at step 148, increment the unauthorized transaction count (UNAUTHCT) by 1. At this juncture, it is important to note that the unauthorized count (UNAUTHCT) is set to zero at the time of the opening of the account.

After the unauthorized transaction count has been incremented, the central processing computer 103 will, at step 149, transmit a signal and/or data to the banking terminal 102 which will notify and/or instruct the banking terminal operator that the transaction is not authorized and should, therefore, be cancelled or voided. The banking terminal operator may then cancel the transaction at step 150. The banking transaction terminal operator or the ATM machine may then confiscate the ATM card and/or alert the authorities. Upon the completion of step 150, the apparatus will cease operation at step 151.

If, at step 147, the central processing computer 103 identifies the account owner's reply or response as being one to authorize the transaction, the central processing computer 103 will, at step 151, reset the unauthorized transaction count (UNAUTHCT) to zero (0). The central processing computer 103 will then, at step 153, transmit a signal and/or data to the banking terminal 102 which will notify and/or instruct the banking terminal operator, and/or the ATM machine, that the transaction is authorized and/or approved. The banking terminal operator, and/or the ATM machine, may then complete the transaction, at step 154. After the transaction has been completed at step 154, the operation of the apparatus 100 will cease at step 155.

In instances when the account owner is a party to the transaction, which should typically be the case in banking and/or financial transactions, the account owner, having the communication device 104 on his or her person, may authorize the transaction at the point of the transaction. If the transaction is an overnight or other remotely made transaction, such as in clearing and/or account settling transactions, the account owner may authorize the transaction from his or her remote location.

The account owner may also program and/or set the communication device 104 so as to automatically authorize or disapprove or disallow transactions. In this regard, the communication device 104 may be programmable so as to receive and analyze the transaction information and/or data and reply or respond to same automatically and/or with preset or programmed replies and/or responses. The communication device 104 may also be programmable so as to limit the amounts of transactions. In this regard, the account owner may provide for temporary transaction types and/or amounts.

The communication device 104, in the preferred embodiment, is provided with a memory device for storing any number of transactions so that the account owner may review his or her account activity and/or transactions which have occurred involving his or her accounts and/or ATM card. In this manner, the account owner may "scroll" through and/or in other ways review account activity. The communication device 104 may also be equipped to service more than one bank and/or financial account and/or ATM card. For example, any number and/or types of accounts may be serviced with or by a single communication device 104.

The apparatus and method of the present invention provides for the real-time notification of banking and/or financial transactions involving various bank and/or financial accounts and enables an account owner to monitor, in real-time, activity involving his or her bank and/or financial accounts and/or ATM card(s).

The apparatus and method of the present invention also provides a means and a mechanism by which to inform an account owner that his or her account is overdrawn, has been charged against and/or that his or her ATM card(s) are lost, stolen, cancelled or de-activated and/or provides an indication to the account owner of when and/or where his or her accounts are being accessed in transactions. The account owner may then report the unauthorized activity, and/or the discovery of a lost or stolen ATM card, and/or cancel and/or de-activate the respective account(s) and/or ATM card(s).

The present invention, in an alternate embodiment, may also be utilized so as to provide authorization, notification and/or security for, and in conjunction with, cellular and/or mobile telephone and/or communication systems wherein a cellular or mobile telephone owner and/or account owner may be notified of a transmission and/or an attempted transmission and/or telephone call made with his or her cellular or mobile telephone and/or with the telephone number and or transmission codes and/or associated signatures and/or data which corresponds to his or her cellular or mobile telephone.

Figure 7:
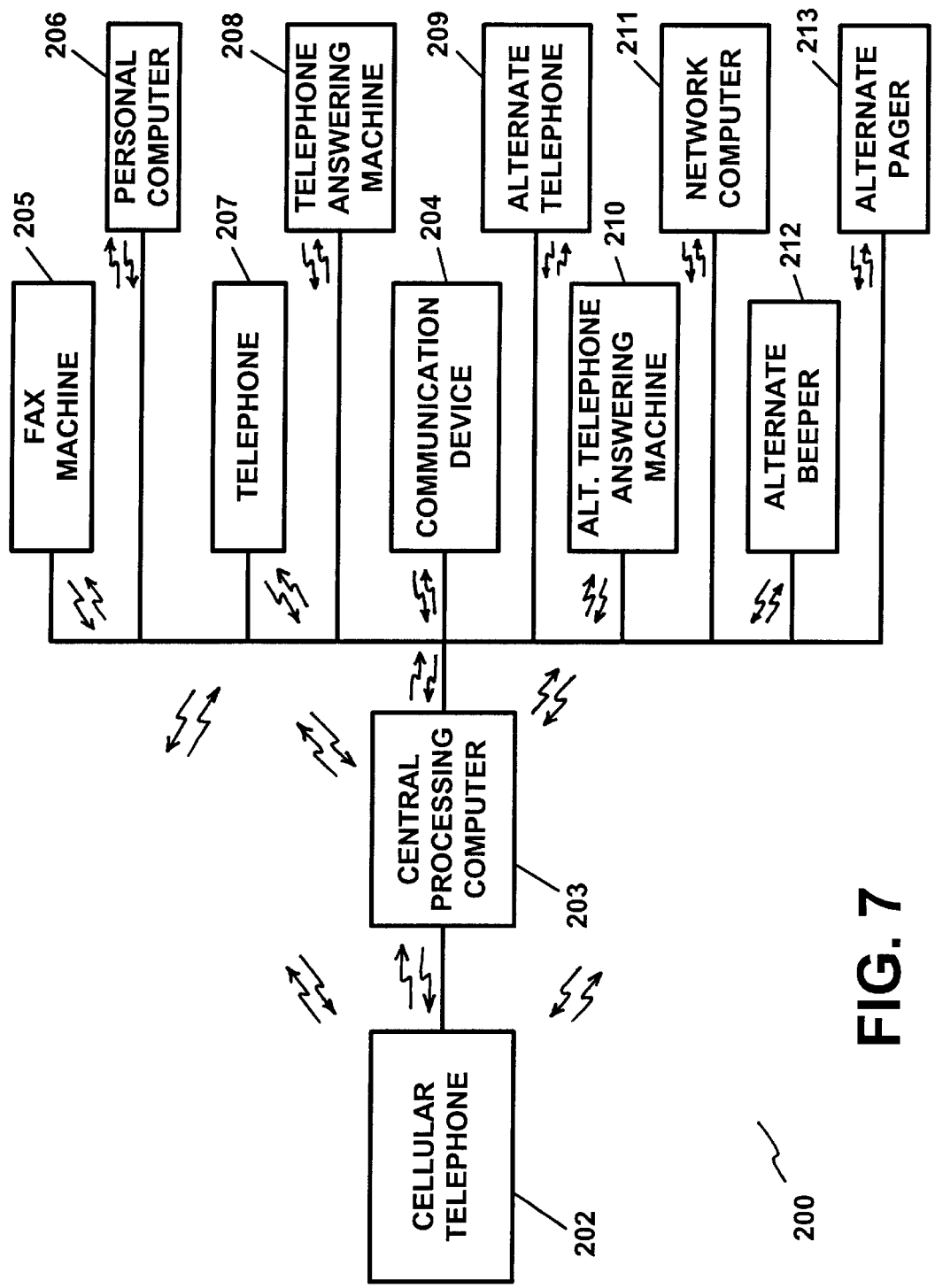
FIG. 7 illustrates a block diagram of an alternate embodiment of the apparatus of the present invention which is utilized in conjunction with a cellular and/or a mobile telephone.

FIG. 7 illustrates a block diagram of an alternate embodiment of the apparatus of the present invention which is utilized in conjunction with a cellular or mobile telephone (hereinafter referred to as "cellular telephone") and/or corresponding cellular telephone account number and/or information related thereto. The apparatus of FIG. 7 is denoted generally by the reference numeral 200. In FIG. 7, the apparatus 200 consists of a cellular telephone 202 which may be any typical cellular and/or mobile telephone. Any other cellular and/or mobile communication device may also be utilized.

The cellular telephone 202 may be any of the widely used and well known cellular telephones and/or mobile communication device(s). In the embodiment of FIG. 7, the cellular telephone 202 serves as the transaction terminal which is described above in conjunction with the previous embodiments. As is the case with cellular telephones, the cellular telephone may transmit the authorization request and/or notice to a central processing computer. The cellular telephone 202 may, but need not, receive authorization data and/or information from the central processing computer. The cellular telephone 202 may also comprise, or have associated therewith, a keypad for the manual entry of transaction information and/or data, such as the telephone number and various command codes utilized in making or placing a telephone call.

The apparatus 200 also comprises a central processing computer 203 which services any predefined group of cellular telephones or cellular communication devices. For example, the central processing computer 203 may handle all cellular telephone accounts for a given telecommunications company and/or area. The central processing computer 203, for example, may process and maintain records of cellular telephone calls, including billing information, for any number of cellular telephones, cellular telephone accounts, and/or cellular telephone owners which or who are serviced by a particular communications company or central processing office or computer.

The central processing computer 203 may be a mainframe computer, a mini-computer, a micro-computer, a server computer, such as those utilized in conjunction with on-line services and/or in a network environment, and/or any other suitable computer or computer system.

The central processing computer 203 may also process accounts for any of the various cellular and/or mobile communications accounts and/or devices. In the preferred embodiment, the cellular telephone 202 is linked and/or connected to the central processing computer 203 via a telecommunications system, link and/or medium (hereinafter referred to as "communications system") such as, for example, a telephone network or line. It is important to note that the communications system which is utilized may be any communications system and may include telecommunication systems, satellite communications systems, radio communication systems, digital communications systems, digital satellite communications systems, personal communications services communication systems as well as any other appropriate communications system. The cellular telephone 202 transmits signals and/or data to the central processing computer 203 as well as receives signals and/or data from the central processing computer 203.

The apparatus 200 also comprises a cellular telephone owner communication device 204 which may receive signals and/or data from either or both of the cellular telephone 202 and/or the central processing computer 203. In the embodiment of FIG. 7, the communication device 204 receives signals and data from the central processing computer 203 with said signals being transmitted via a suitable communication system. In the embodiment of FIG. 7, the communications system utilized for transmitting signals and/or data to the communication device 204 is a wireless telephone network or line and the communication device 204 is a wireless telephone signal receiving device such as a telephone beeper or pager. The communication device 204 or pager receives the wireless telephone signals and/or data from the central processing computer 203 during the authorization procedure as will be described in more detail below.

In the preferred embodiment, the communication device 204 is also equipped with a transmitter for transmitting signals and/or data to the central processing computer 203. In this regard, the central processing computer 203 transmits signals and/or data to the communication device 204 as well as receives signals and/or data from the communication device 204. The communication device 204 may also transmit signals and/or data directly to the cellular telephone 202 and receive signals and/or data directly from the cellular telephone 202.

In the preferred embodiment, signals and/or data which are transmitted by the cellular telephone 202 are received at the central processing computer 203. The cellular telephone 202 also receives signals and/or data from the central processing computer 203. Further, in the alternate embodiment of FIG. 7, the communication device 204 receives signals and/or data from the central processing computer 203 and transmits signals and/or data to the central processing computer 203.

As noted above, the communication device 204 is a wireless device. In this regard, the communication device 204 or pager may be carried by the cellular telephone owner and/or be kept on and/or close to the cellular telephone owner's person so that the central processing computer 203 may transmit signals and/or data to the communication device 204 so as to communicate with the cellular telephone owner at any time.

In the alternate embodiment of FIG. 7, the apparatus 200 also comprises a facsimile (fax) machine 205, a personal computer 201, a telephone 202, a telephone answering machine 208, an alternate telephone 209, an alternate telephone answering machine 210, a network computer 211, an alternate beeper 212, and an alternate pager 213.

The central processing computer 203 may be linked with the above fax machine 205, personal computer 206, telephone 207 and associated answering machine 208, alternate telephone 209 and associated answering machine 210, network computer 211, alternate beeper 212 and/or alternate pager 213, via any suitable communication system. In the preferred embodiment, a telecommunications link or telephone line or link, which may or may not be a wireless link depending on the device and/or the circumstances, is utilized in order to link the central processing computer 203 with each of the fax machine 205, the personal computer 206, the telephone 207 and associated answering machine 208, the alternate telephone 209 and associated answering machine 210, the network computer 211, the alternate beeper 212, and/or the alternate pager 213.

Figure 8:
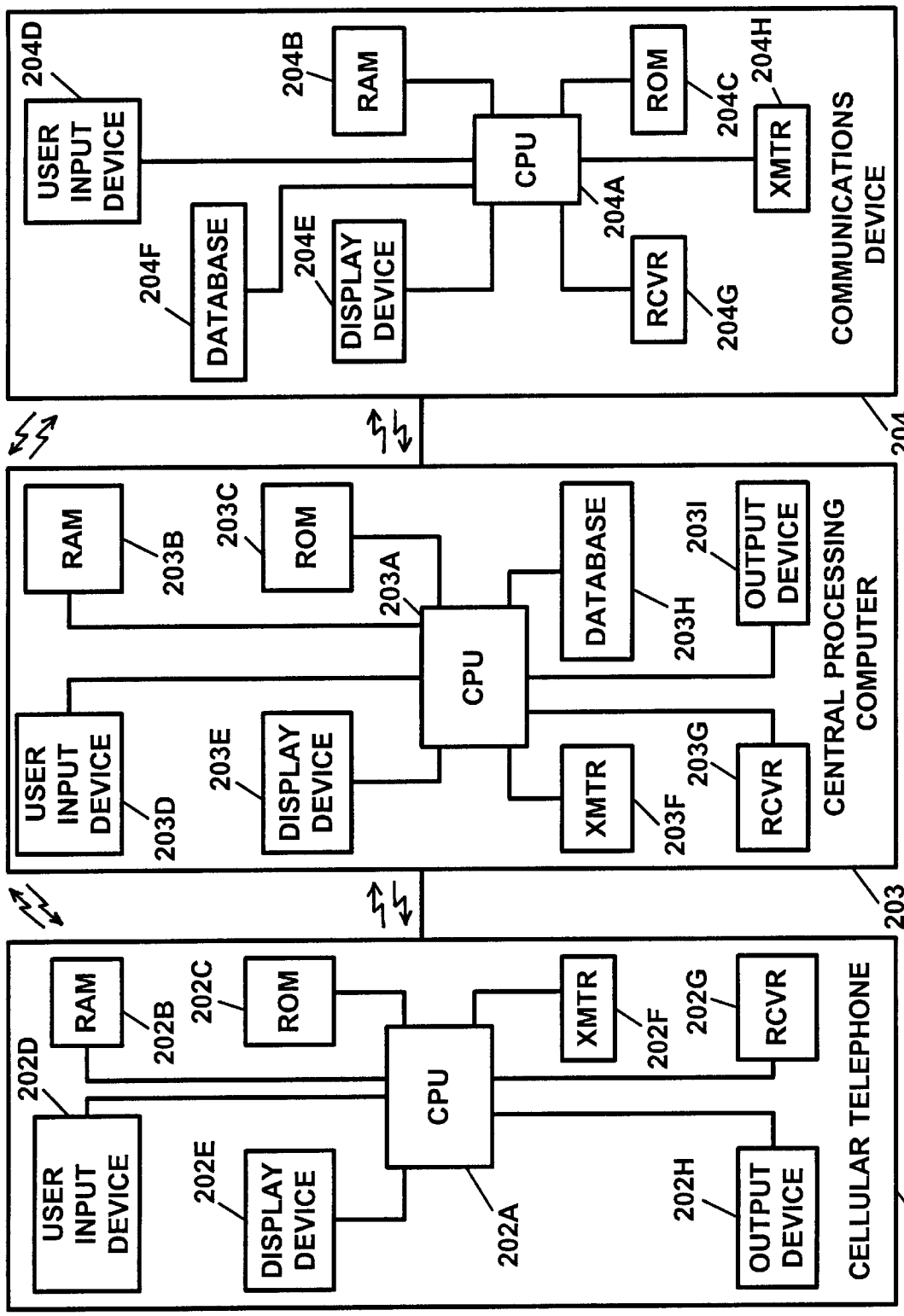
FIG. 8 illustrates the various components of the apparatus of FIG. 7.

FIG. 8 illustrates the various components of the apparatus 200 of FIG. 7. In FIG. 8, the cellular telephone 202, in the preferred embodiment, comprises a central processing unit or CPU 202A, associated random access memory 202B (RAM) and read only memory 202C (ROM) devices, which are also connected to the CPU 202A, a user input device 202D, which is a typically a keypad or other suitable input device for inputting data into the cellular telephone 202 and which is also connected to the CPU 202A, and a display device 202E for displaying information and/or data to a user or operator.

The cellular telephone 202 also comprises a transmitter 202F for transmitting signals during normal telephone operation and/or for transmitting signals and/or data to the central processing computer 203, and/or to the communication device 204 and/or to any other device associated with the account owner or apparatus 200 if desired. The transmitter 202F is also connected to the CPU 202A. The cellular telephone 202 also comprises a receiver 202G for receiving signals during normal telephone operation and/or for receiving signals and/or data from the central processing computer 203, and from the communication device 204 and/or from any other associated device which may be utilized, if desired.

The receiver 202G is also connected to the CPU 202A. The cellular telephone 202 may also comprise a printer 202H or other appropriate output device for outputting data to the user. The printer 202H, if utilized, is also connected to the CPU 202A. In the preferred embodiment, the printer 202H prints receipts corresponding to the transaction and/or information transmitted during the telephone call or transaction.

In FIG. 8, the central processing computer 203, in the preferred embodiment, comprises a central processing unit or CPU 203A, associated random access memory 203B (RAM) and read only memory 203C (ROM) devices, which are connected to the CPU 203A, a user input device 203D, which is a keypad or any other suitable input device for inputting data into the central processing computer 203 and which is also connected to the CPU 203A and a display device 203E for displaying information and/or data to a user or operator.

The central processing computer 203 also comprises a transmitter(s) 203F for transmitting signals and/or data to the cellular telephone 202 and to the communication device 204 and/or to any other device which may be utilized and/or to any one or more of the fax machine 205, personal computer 206, telephone 207 and associated answering machine 208, alternate telephone 209 and associated answering machine 210, network computer 211, alternate beeper 212, and/or alternate pager 213. The transmitter(s) 203F is also connected to the CPU 203A. The central processing computer 203 also comprises a receiver(s) 203G for receiving signals and/or data from the cellular telephone 202 and from the communication device 204 and/or from any other suitable device which may be utilized in conjunction with the apparatus 200. The receiver(s) 203G is also connected to the CPU 203A.

The central processing computer 203 also comprises a database(s) 203H which contains account information and data pertaining to the cellular telephone owner(s) and/or account(s). The database 203H contains information about the cellular telephone owner, the telephone number, etc., and any other information and/or data necessary to the manage and/or process an account and/or account transaction as described herein. The database 203H may also contain information regarding any limitations and/or restrictions placed on the cellular telephone and/or the use thereof. The database 203H is also connected to the CPU 203A. The central processing computer 203 also comprises a printer 203I or other appropriate output device for outputting information and/or data to a user or operator.

In FIG. 8, the communication device 204, in the preferred embodiment, comprises a central processing unit or CPU 204A, associated random access memory 204B (RAM) and read only memory 204C (ROM) devices, which also connected to the CPU 204A, a user input device 204D, which is a keypad or a plurality of keys and/or switches for inputting data into the communication device 204 and which is also connected to the CPU 204A, and a display device 204E, for displaying information and/or data to the cellular telephone owner, and a database 204F, which are also connected to the CPU 204A.

The communication device 204 also comprises a receiver 204G for receiving signals and/or data from the central processing computer 203 and which is also connected to the CPU 204A, a transmitter 204H for transmitting signals and/or data to the central processing computer 203 and which is also connected to the CPU 204A. In the preferred embodiment, the communication device 204 utilized is a pager with a reply feature and/or device. A two-way pager and/or pager systems may also be utilized for implementing the respective components, and/or systems in the communication device 204/central processing computer 203 combination and/or link.

The apparatus 200 of the present invention, in the preferred embodiment, may be utilized in order provide cellular telephone owner and/or account owner authorization, notification and/or security measures in transactions involving cellular telephones and/or cellular telephone numbers, and any transactions involving same in the manner described below and with reference to FIGS. 9A, 9B and 9C. In this manner, the apparatus and method of the present invention may be utilized to obtain cellular telephone owner and/or account owner authorization in a transaction involving cellular telephones and/or cellular telephone numbers.

Figure 9A:
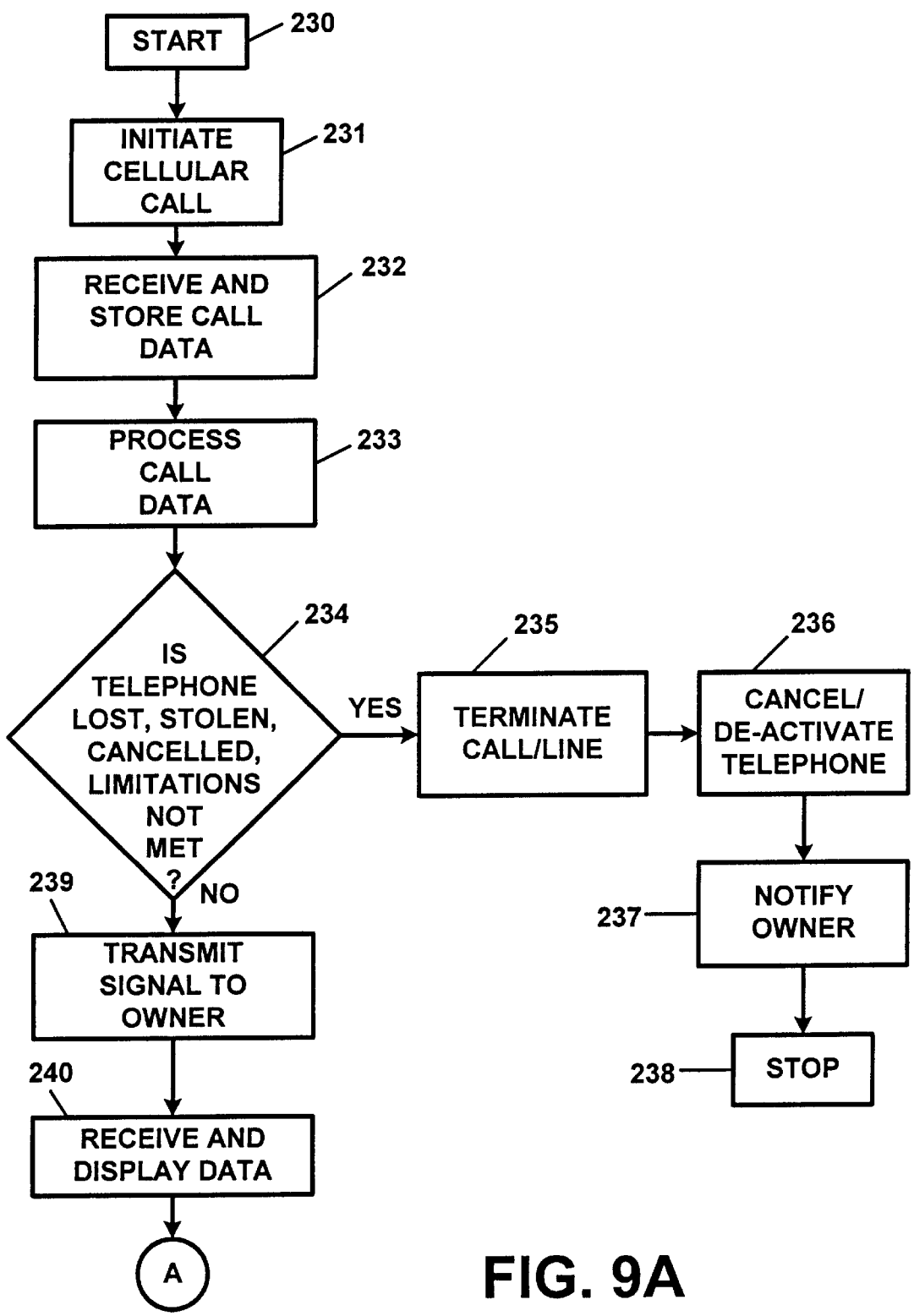
FIGS. 9A, 9B, and 9C illustrate the operation of the apparatus of FIG. 7 in flow diagram form.
Figure 9B:
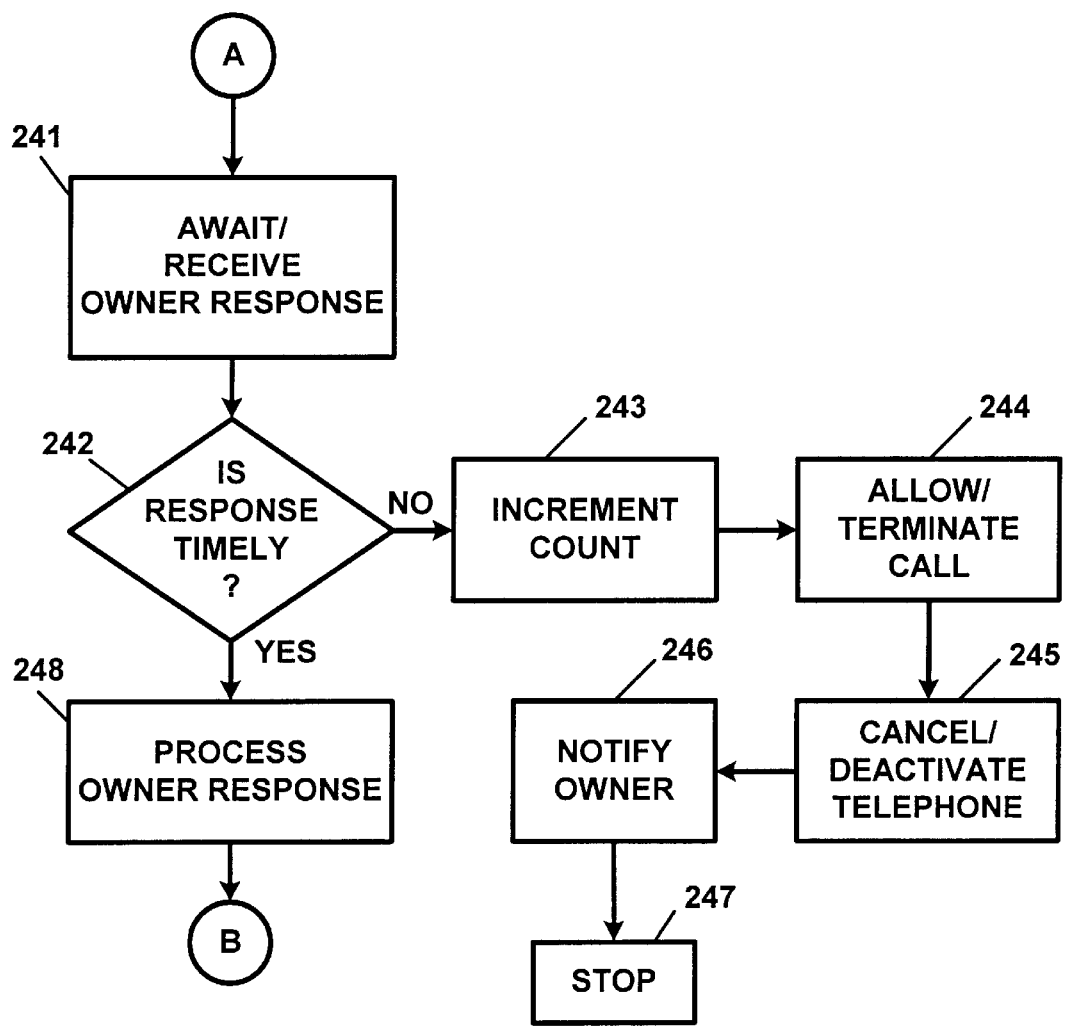
Figure 9C:
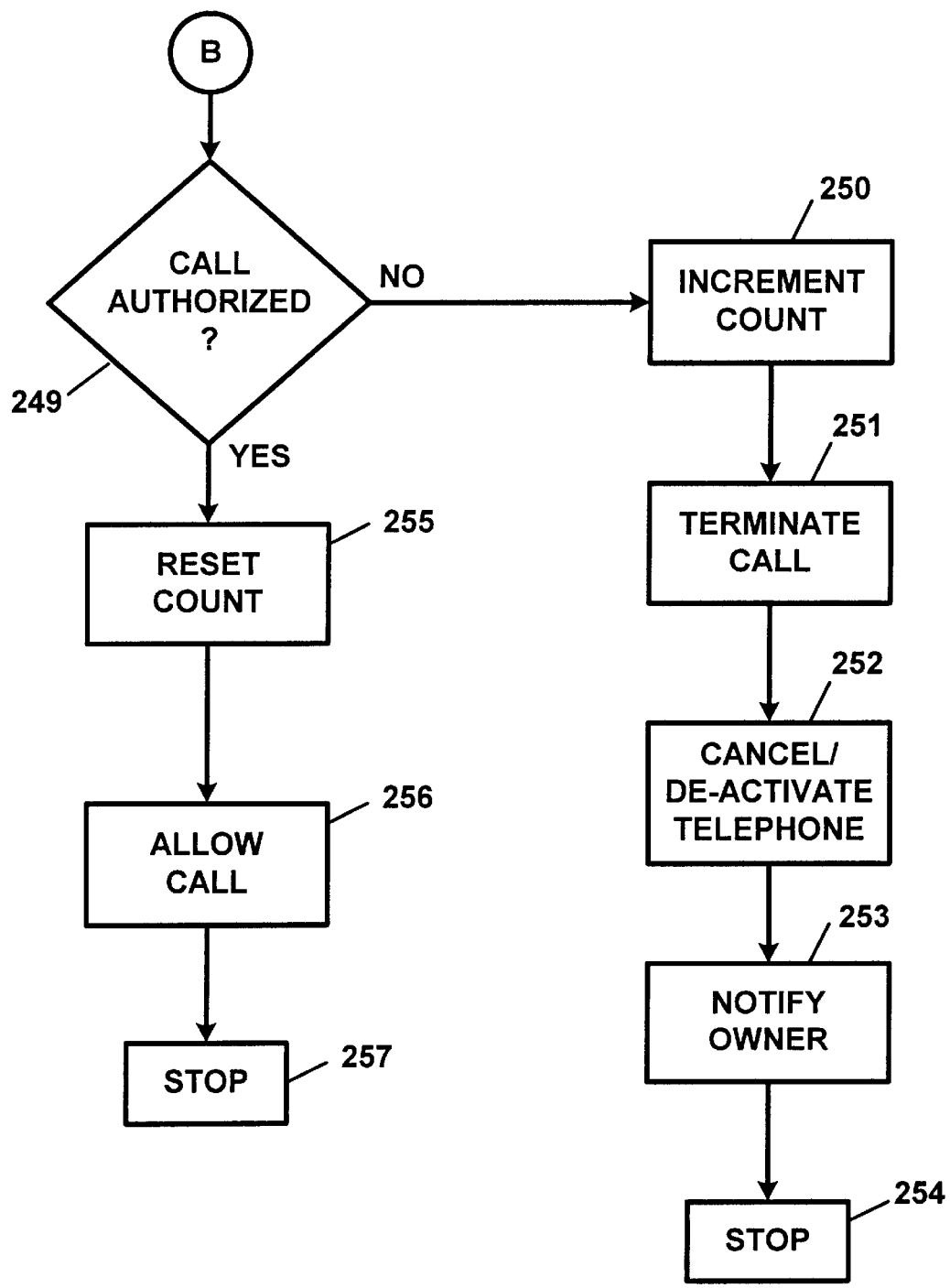

FIGS. 9A, 9B and 9C illustrates the operation of the apparatus 200 of FIG. 7 in flow diagram form. It is important to note, with regards to the apparatus 200 of FIG. 7, that the cellular/telephone replaces the transaction terminal of the previously described embodiments. With reference to FIGS. 9A, 9B and 9C, the operation of the apparatus 200 commences at step 230 when the cellular telephone 202 is utilized to make a cellular telephone call and/or transaction.

The cellular telephone 202 will activate the apparatus 200, at step 231, with the initiation of the cellular telephone call, and/or in any other typical manner, such as when a cellular telephone is utilized to gain access to the telephone network so that the calling connection may be established via the cellular communications network and/or the cell site. Upon the making of the cellular telephone call, at step 231, the cellular telephone 202 will transmit data and/or information, which identifies the calling telephone, to the central processing computer which services the particular cellular telephone or cellular telephone network, so that appropriate billing and/or accounting of telephone usage may be noted and/or processed. In the preferred embodiment, the central processing computer for the particular cellular telephone and/or cellular telephone network is the central processing computer 203. At step 232, the central processing computer will receive and store the data and/or information which is transmitted by the cellular telephone 202. At step 233, the central processing computer 203 will process the data and/or information which is received from the cellular telephone 202.

The central processing computer 203 may utilize any of the widely known data processing and/or software routines, which are known to those skilled in that art, in order to process transaction requests and/or authorizations involving the use of the respective cellular telephone(s) and/or cellular communication device, and/or cellular telephone number. At step 234, the central processing computer 203 will perform a test in order to determine if the cellular telephone is lost, stolen, cancelled or de-activated. If the cellular telephone is determined to be lost, stolen, cancelled or de-activated, the central processing computer 203 will, at step 235, block the telephone call or terminate the call if it has already been connected. The central processing computer 203 will then, at step 236, cancel and/or de-activate the cellular telephone number or account. The central processing computer 203 will then, at step 237, notify the cellular telephone owner that his or her cellular telephone has been cancelled and/or de-activated. The operation of the apparatus will then cease at step 238.

If, at step 234, the central processing computer 203 determines that the cellular telephone is not lost, stolen, cancelled or de-activated, the central processing computer 203 will, at step 239, transmit a signal and/or data to the communication device 204 which is located at the cellular telephone owner. At step 240, the communication device 204 will receive and display the data and/or information which is transmitted from the central processing computer 203. The displayed information, in the preferred embodiment, will include the number called, the time of the call, and the duration of the call, in real-time. The information will remain displayed during the duration of the call so that the cellular telephone owner will be notified continuously throughout the duration of the call.

At step 241, the central processing computer 203 will await the cellular telephone owner's reply or response. If the cellular telephone owner replies or responds, the reply or response data will also be transmitted to, and received by, the central processing computer 203 at step 241. At step 242, the central processing computer 203 will then determine if the cellular telephone owner's response was made within a pre-defined time period, which is chosen, in the preferred embodiment, to be one (1) minute. If at step 242, it is determined that the cellular telephone owner did not reply or respond within the pre-defined time limit, the central processing computer will, at step 243, increment the unauthorized transaction count (UNAUTHCT) by one (1).

The central processing computer 203 will then, depending upon pre-defined instructions of the cellular telephone owner, at step 244, either allow the telephone call to continue, such as for a pre-defined duration of one (1) minute, so as to allow for cases wherein an emergency condition exists, or terminate the telephone call immediately. The decision to either allow the telephone call to continue or to terminate the telephone call can be made by the cellular telephone owner and/or by the cellular telephone service provider. Upon the completion of step 244, the central processing computer 203 will then, at step 245, cancel and/or de-activate the cellular telephone. Thereafter, the central processing computer 203 will, at step 246, notify the cellular telephone owner that the cellular telephone number or account has been cancelled and/or de-activated. Upon completion of step 246, the apparatus will cease operation at step 247.

If, at step 242, the cellular telephone owner did respond in time, the central processing computer 203 will process the reply or response data and/or information, at step 248. The central processing computer 203 will then determine, at step 249, if the cellular telephone call is authorized by the cellular telephone owner. If, at step 249, the cellular telephone call is unauthorized, the central processing computer will, at step 250, increment the unauthorized transaction count (UNAUTHCT) by one (1). The central processing computer 203 will then, at step 251, terminate the telephone call immediately. Upon the completion of step 251, the central processing computer 203 will then, at step 252, cancel and/or de-activate the cellular telephone. Thereafter, the central processing computer 203 will, at step 253, notify the cellular telephone owner that the cellular telephone has been cancelled and/or de-activated. Upon completion of step 253, the apparatus will cease operation at step 254.

If, at step 249, the central processing computer 203 identifies the cardholder reply or response as being one to authorize the cellular telephone call, the central processing computer 203 will, at step 255, reset the unauthorized transaction count (UNAUTHCT) to zero (0). An unauthorized transaction count (UNAUTHCT) of 0 will signify that any string of unauthorized transactions has now been broken by the cellular telephone owner. The central processing computer 203 will then, at step 256, allow the cellular telephone call to continue uninterrupted. Upon the completion of the cellular telephone call, at step 256, the apparatus 200 will cease operation at step 257.

In instances when the cellular telephone owner is a party to the cellular telephone call and/or transaction, he or she, having the communication device 204 on his or her person, may authorize the call and/or transaction at his or her present location. If the cellular telephone owner has lent out the cellular telephone, he or she may authorize the cellular telephone call and/or transaction from his or her remote location. The cellular telephone owner may also program and/or set the communication device 204 to automatically authorize or disapprove or disallow cellular telephone calls and/or transactions with said selective authorizations being made as to time of day, calling areas, numbers called, and/or call and/or transaction duration. In this regard, the communication device 204 may be programmable so as to receive and analyze the cellular telephone call information and/or data and reply or respond to same automatically and/or with preset or programmed replies and/or responses. The communication device 204 may also be programmable so as to limit the number of cellular telephone calls made from the cellular telephone and/or with the cellular telephone number.

The communication device 204, in the preferred embodiment, is provided with a memory device for storing any number of cellular telephone calls and/or transactions so that the cellular telephone owner may review his or her account activity and/or cellular calls and/or transactions made and/or which have occurred involving his or her cellular telephone. In this manner, the cellular telephone owner may "scroll" through and/or in other ways review account activity. The communication device 204 may also be equipped to service more than one cellular telephone and/or mobile communication device(s).

The apparatus and method of the present invention provides for the real-time notification of cellular and/or mobile telephone usage which enables a cellular telephone owner and/or account owner to monitor, in real-time, activity involving his or her cellular telephone and/or cellular telephone number. The apparatus and method of the present invention also provides a means and a mechanism by which to inform a cellular telephone owner that the cellular telephone is lost or stolen, and/or to provide notification to the cellular telephone owner that his or her cellular telephone number is being utilized in calls and/or transactions, such as when a cellular telephone has been illegally "cloned". The cellular telephone owner may then report the cellular telephone lost or stolen and/or cancel and/or de-activate the cellular telephone number and/or account.

The present invention also provides a means and a mechanism by which to monitor the number of cellular or mobile telephone calls and/or transactions which are unauthorized by the cellular telephone owner and to determine whether or not to de-activate the cellular telephone and/or the cellular telephone number and/or account. In the above manner, the apparatus and method of the present invention provides an apparatus and a method to prevent and/or to drastically limit fraudulent and/or unauthorized use of, and/or the "cloning" of, cellular telephones and/or the unauthorized use of cellular telephone numbers.

The apparatus and method of the present invention may also be utilized in connection with an on-line service and/or on, or over, the Internet and/or the World Wide Web, so as to provide for a means by which the respective cardholder, account owner, and/or cellular telephone owner, may utilize the apparatus and method in conjunction with a home and/or a personal computer, a personal communications device, and/or a commercial or industrial computer system (i.e., an internet server computer), and/or any other appropriate device, in any appropriate network, system or medium.

Figure 10:
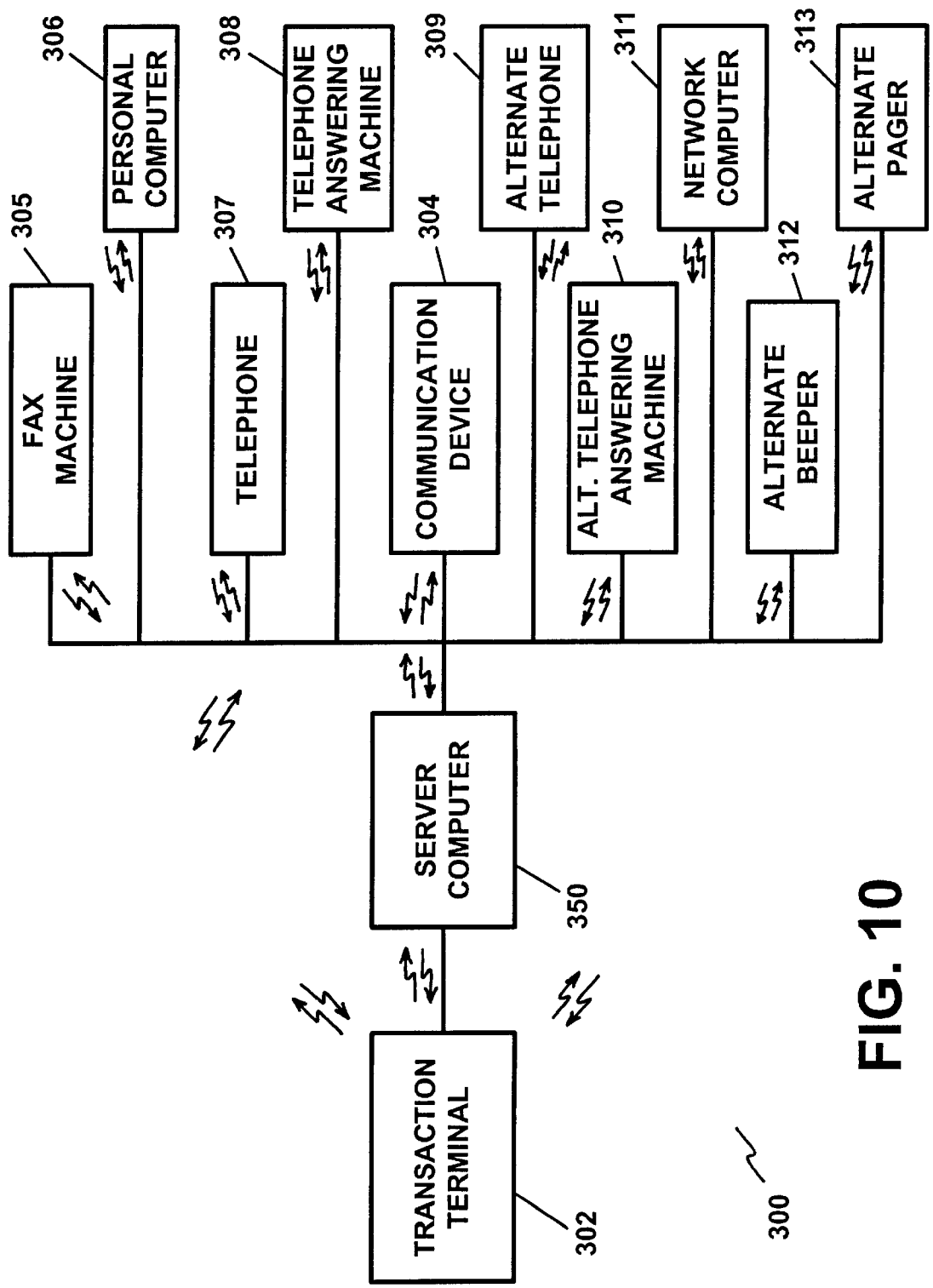
FIG. 10 illustrates yet another alternate embodiment of the present invention wherein the apparatus of the present invention is utilized on, or over, an on-line service, the INTERNET and/or the World Wide Web or other suitable communication network or medium.

FIG. 10 illustrates yet another alternate embodiment of the present invention wherein the apparatus and method of any of the embodiments described herein may be utilized on, or over, an on-line service, the Internet, and/or the World Wide Web, and/or any other suitable communication network or medium. In FIG. 10, the apparatus, which is denoted generally by the reference numeral 300, comprises a transaction terminal 302, which may be a transaction terminal or a cellular telephone or communication device, depending upon the application, a server computer 350, which is a central processing computer for processing data and/or information in an on-line, and/or Internet, and/or World Wide Web, communication environment, network, or medium.

The server computer 350 may be a mainframe computer, a mini-computer, a micro-computer, a server computer, such as those utilized in conjunction with on-line services and/or in a network environment, and/or any other suitable computer or computer system. The server computer 350, in the preferred embodiment, should have associated therewith a suitable receiver(s) or transmitter(s) which may be a fax/modem and/or any other device(s) which are well known to those skilled in the art for providing communications and/or a link with a server computer in such a network environment.

The apparatus of FIG. 10 also comprises a communications device 304 which may comprise a home and/or a personal computer, a laptop or a notebook computer and any one or more of the herein-described personal communications devices so that the individual may access the apparatus 300, and in particular, the server computer 350, at any time and from any location. Basically, the embodiment of FIG. 10 serves to replace the central processing computer of the previously described embodiments with a server computer for utilization on, or over, an on-line service, the Internet, the World Wide Web, and/or any other suitable communications network or medium. The apparatus of FIG. 10 operates and is utilized in the same, in similar and/or an analogous, manner as described herein in conjunction with the previously described embodiments.

Figure 11:
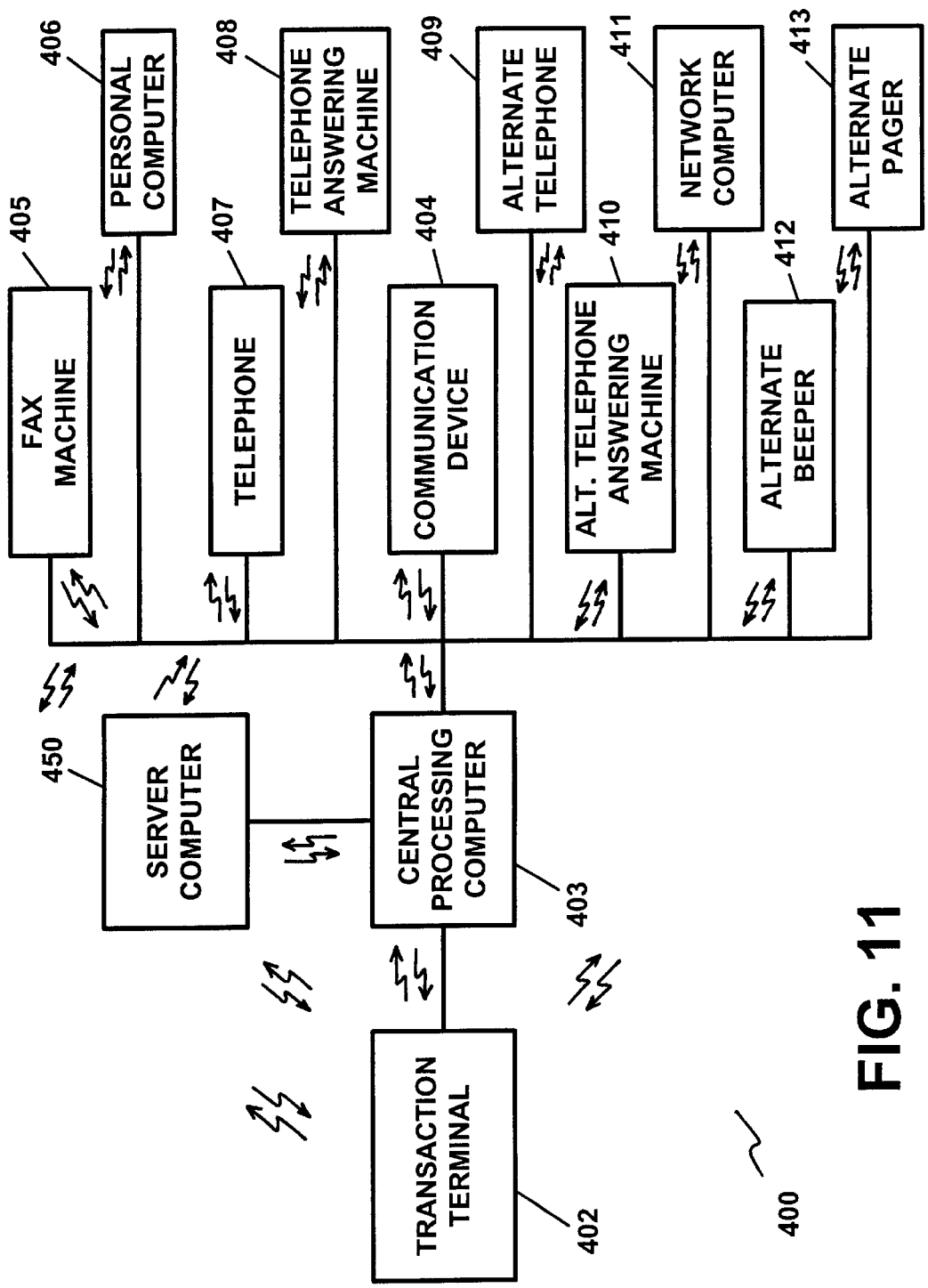
FIG. 11 illustrates yet another alternate embodiment of the present invention which is also utilized in conjunction with an on-line service and/or on, or over, the INTERNET and/or the World Wide Web or the suitable communication network or medium.

FIG. 11 illustrates yet another alternate embodiment of the present invention, wherein the present invention is also utilized in conjunction with an on-line service and/or on, or over, the Internet and/or the World Wide Web, and/or any other suitable communication network or medium. In FIG. 11, the apparatus, which is denoted generally by the reference numeral 400, comprises a transaction terminal 402, which may be a transaction terminal and/or a cellular telephone and/or cellular communications device, depending upon the application.

The apparatus of FIG. 11 also comprises a central processing computer 403 which provides processing and/or control over the apparatus 400 in the manner described above in conjunction with the previously described embodiments. The central processing computer 403 and/or the server computer 450 may be a mainframe computer, a mini-computer, a micro-computer, a server computer, such as those utilized in conjunction with on-line services and/or in a network environment, and/or any other suitable computer or computer system.

The apparatus 400 of FIG. 11 also comprises a communications device(s) 404 such as those described herein and in conjunction with the apparatus 300 of FIG. 10. The apparatus also comprises a server computer 450 which may either perform parallel operations and/or processing of the data and/or information which is performed and/or processed by the central processing computer 403 and/or may simply receive the data and/or information processed by the central processing computer 403. In any event, the server computer 450 provides the means by which the data and/or information, which is provided by the apparatus, can be accessed and or utilized via an on-line service and/or on, or over, the Internet, and/or the World Wide Web, and/or any other communications network or medium.

The server computer 450 should have associated therewith a suitable receiver(s) or transmitter(s) which may be a fax/modem and/or any other device(s) which are well known to those skilled in the art for providing communications and/or a link with a server computer in such a network environment. The apparatus of FIG. 11 also comprises a communications device 404 which may comprise a home and/or a personal computer, a laptop or a notebook computer, and/or any one or more of the herein described personal communications devices so that the individual may access the apparatus, and in particular, the server computer 450, at any time and from any location. The apparatus of FIG. 11 is utilized and/or operates in the same, a similar and/or an analogous, manner as any of the embodiments described herein.

Applicant hereby incorporates by reference herein all of the methods and/or techniques for providing information and/or data over on-line service and/or on, or over, the Internet, and/or the World Wide Web, and/or any other suitable communication network or medium, along with client/server and/or Web Site technology and methods and/or techniques utilized in conjunction therewith, which are known as of the filing date of this application.

In any and/or all of the embodiments described herein, each and every one the components of the apparatus, which include, but which are not limited to, the described transaction terminals, cellular telephones and/or other cellular communications devices, central processing computers, server computers, if utilized, and any of the various communications devices, may transmit and/or receive signals and/or data, and/or be capable or transmitting and/or receiving signals and/or data, to and from any and all of the other apparatus components which may be utilized in conjunction therewith, in and for a given embodiment. In this regard, it is important to note, with respect to the embodiments of FIGS. 10 and 11, and any of the other embodiments described herein, that each and every component involved in the transmission and/or reception of signals, data and/or information may include an associated transmitter, receiver and/or suitable communication device.

The communication system or medium should provide for the transmission and/or for the reception of a multitude of remote electrical, electronic, electromagnetic, and/or other suitable signals, over long distances and/or in a mobile and/or a wireless communications environment. Telephone signals and telephone communication devices can be utilized in the present invention as well as personal computers and associated peripheral devices which may be utilized with telecommunications and/or other suitable communication systems and/or mediums.

The apparatus and method of the present invention may operate over any appropriate communications system, network and/or medium and/or other suitable communications systems, including radio signal, optical, satellite, digital, digital satellite, and/or other communications systems. The communications system utilized may operate anywhere in the electromagnetic and/or radio frequency spectrum. As noted above, the present invention may also be utilized in conjunction with a satellite communications system, in which case, the receivers and transmitters which are utilized in conjunction with the apparatus should be satellite communication receivers and transmitters, respectively. For example, the associated receiver(s) may be a satellite dish receiver(s).

In this regard, the cardholders account owner or cellular telephone owner may utilize the apparatus and method of the present invention to its fullest capabilities over an on-line service and/or on, or over, the Internet, and/or the World Wide Web, and/or any other suitable communication network or medium. In this manner, the embodiment of FIGS. 10 and 11 may allow the cardholder, account owner or cellular telephone owner to utilize the apparatus and/or to monitor the operation of the apparatus over the on-line service and/or on, or over, the Internet, and/or the World Wide Web, and/or any other communication network or medium, from any suitable computer or device, and/or from any location.

The system receiver(s) may also be utilized in conjunction with a home and/or a personal computer and/or other personal communications device(s) and/or apparatuses which may be utilized with an associated receiver or equivalent peripheral device(s). The apparatus may also be utilized in conjunction with a computer network such as an on-line service and/or on, or over, the Internet, and/or the World Wide Web, by employing any appropriate server computer and/or an associated Web Site and/or Web Site technology in conjunction with an appropriate communication medium and communication equipment.

In any of the above described embodiments, the present invention may be utilized in conjunction with any suitable communication device(s) and/or communication system(s). In this manner, the present invention may be utilized in conjunction with a telephone, a line-connected and/or a permanent telephone, a touch-tone telephone, a cordless telephone and/or a cellular or mobile telephone, a home and/or a personal computer having associated telecommunication devices or other suitable peripheral device(s), such as a modem and/or a fax/modem, and/or other suitable personal communication devices which can operate over an appropriate communications system, and/or other suitable communications systems and/or mediums, including radio signal, optical, satellite, digital, and/or other communications systems and/or mediums.

Any suitable communication system and/or medium may be utilized. Personal communication service (PCS) systems and devices, including stationary, portable and/or hand-held devices, may also be utilized. Digital signal communications devices and systems may also be utilized. Televisions, interactive and/or digital televisions, personal communication devices, personal communication services (PCS) devices, personal digital assistants, cellular telephones, display telephones, video telephones, display cellular telephones and electronically equipped watches and/or other devices and/or effects and/or accessories, may also be utilized for performing user interactive control, monitoring, authorization, notification and/or security functions in conjunction with the present invention.

It should be noted that the telephone/telephone beeper or pager system, including two-way pager systems, may be replaced with any other type of transmitter/receiver combination, electronic or otherwise, which provides for the transmission and reception of a multitude of remote electrical, electronic, electromagnetic, and/or other suitable signals, over long distances and/or in a mobile and/or a wireless communications environment. As noted above, a personal computer system which may be adapted to such operation, or a personal communication device(s) or personal communication services (PCS) device(s) may also be utilized for, or in, any of the transmitter/receiver system combinations described herein. Two-way pagers and reply pagers may also be utilized for any, or in any, of the transmitter/receiver system combinations described herein.

The communication device(s) utilized in the present invention, as well as the associated transaction terminal and/or cellular communications device(s) and/or associated central processing computer may be personal communication services (PCS) devices and/or other suitable communications devices. A television, appropriately equipped to receive and/or to transmit signals may also be utilized. It is also envisioned that digital televisions, interactive televisions, personal communications devices, personal communications services (PCS) devices, personal digital assistants, display telephones, electronically equipped watches, cellular telephones and/or display cellular telephones may also be utilized in conjunction with the present invention.

It is also important to note that the communication device(s), in any of the embodiments described herein may be a home and/or a personal computer having associated therewith an appropriate receiver(s) and transmitter(s) such as, for example, a fax/modem.

It is important to note that the telephone/telephone beeper system, described above, may be replaced with any remote transmitter/receiver system, such as by a remote transmitter, i.e., a television-type remote control unit, which control unit would require a user interface feature and which has the capability to remotely transmit a multitude of signals over long distances to an associated receiver. A two-way pager, a reply pager, or any other appropriate two-way communication device may also be utilized. A home and/or a personal computer, with requisite peripheral devices, a personal communication device and/or a personal communication services (PCS) device may also be utilized. Digital communications devices, interactive televisions and/or digital televisions may also be utilized. It is also envisioned that digital televisions, interactive televisions, personal communications devices, personal communications services (PCS) devices, personal digital assistants, display telephones, video telephones, electronically equipped watches and/or other effects or accessories, cellular telephones, display cellular telephones, may also be utilized.

The apparatus of the present invention may be designed or programmed to telephone an owner, user, operator, occupant, or other authorized central office individual or other authorized individual, at a primary phone number, at an alternate or forwarding phone number and/or at a business phone number, send a beeper or pager message to the individual or central office and/or send a facsimile message, an electronic mail message, a voice mail message and/or an answering service message to, or for, the individual or central office. In this manner, the apparatus may report a theft and/or a malfunction situation to the interested individual(s) by utilizing multiple notification and/or reporting avenues and/or schemes so as to provide and ensure that the interested individual (s) are in fact notified as soon as possible. The multiple notification transmissions may be sequentially and/or simultaneously performed.

The apparatus and method of the present invention may also be programmable for programmed and/or automatic activation, self-activation, programmed and/or automatic operation and/or self-operation. The apparatus and method of the present invention may provide for an immediate, as well as for a deferred, control, monitoring and/or security function, and/or response thereto, so as to provide for the immediate and/or the deferred control, activation, de-activation, programming, monitoring and/or security, etc., of any one or more the herein described credit cards, charge cards, debit cards, currency or "smart" cards, banking and/or financial accounts and associated transaction cards, and/or cellular telephones and/or cellular or mobile communications devices, and/or any other suitable application in and for which the present invention may be utilized.

In any of the herein-described embodiments, the communications devices and associated transaction terminals and/or cellular communications devices and associated central processing computers, may be devices for receiving, and transmitting, respectively, radio signals, satellite communication signals, telecommunications signals, optical communication signals and/or other signals and/or those signals, including digital signals, which are utilized in conjunction with personal communication devices and/or personal communication services (PCS) devices. The devices utilized should, however, be of the same type and/or operate compatibly with the corresponding transmitters and receivers of the apparatus of the present invention.

The present invention may also be equipped with, and be utilized in conjunction with, hardware and software necessary for providing self-monitoring functions, automatic control and/or responses to occurrences, providing automatic notice of an occurrence and/or a situation to an owner, user and/or authorized individual. In this regard, any and all of the embodiments described above may comprise a monitoring device, a triggering device and/or any other suitable device for detecting an occurrence and/or a transaction which may warrant providing notice to the respective cardholder, account owner and/or cellular telephone owner. In this regard, the apparatus may provide for an appropriate signal, data and/or information transmission to the central processing computer, and/or server computer, if utilized. The signal, data and/or information may be conveyed in the form of a communication transmission, depending upon the communication medium utilized, a telephone call, a voice message, a beeper and/or a pager message, an electronic mail message, a fax transmission, and/or any other mode of communication which may be utilized in conjunction with any of the embodiments described herein.

The present invention, in any of the embodiments described herein, may be designed to be user-friendly. In this regard, the present invention may be menu-driven, and/or its operation may be menu-selected, from audio menus, visual menus, or both audio and visual menus.

While the present invention has been illustrated and described as being utilized in conjunction with providing notice and for obtaining authorizations with regard to transactions involving credit cards, charge cards, debit cards, and/or currency or "smart" cards, banking and/or financial accounts, and/or in conjunction with cellular and/or mobile telephones, it is also envisioned that the present invention may be utilized in any similar type of transactional activity, such as purchasing and/or sale activity over an on-line service, the Internet, and/or the World Wide Web and/or in any other type of transaction wherein frequent notice and/or account holder authorization may be utilized to guard against theft and/or fraud and/or unauthorized transactions.

The apparatus of the present invention may be accessed at any time by the respective cardholder, account owner and/or cellular telephone owner and/or cellular communications device owner so as to obtain information regarding activity on his or her respective account. The respective cardholder, account owner and/or cellular telephone owner and/or cellular communications device owner may access the apparatus and, in particular, the central processing computer, and/or the server computer, if utilized, so as to obtain transaction records regarding any transaction, group or string of transactions, transactions by goods and/or service type, transactions by dollar amount, etc.

The respective cardholder, account owner, and/or cellular telephone owner and/or cellular communications device owner may also obtain, via the central processing computer, and/or the server computer, if utilized, periodic transaction records showing all transactions for a given week, which may by provided weekly, bi-weekly, monthly, yearly, and/or for any given and/or desired time period and/or interval. The apparatus and, in particular, the central processing computer, and/or the server computer, if utilized, may be designed and/or programmed so as to automatically and/or periodically provide and/or transmit any of the above-described account and/or transaction information to the respective cardholder, account owner and/or cellular telephone owner and/or cellular communications device owner, by transmitting same to the respective communications device, which may be any of the devices described herein which are utilized as the communications device.

The apparatus and, in particular, the central processing computer, and/or the server computer, if utilized, may also be designed and or programmed to transmit any of the above-described account information and/or transaction information to any one or all of the respective cardholder's, account owner's, and/or cellular telephone owner's and/or cellular communications device owner's facsimile (fax) machine, personal computer, telephone, telephone answering machine, alternate telephone, alternate telephone answering machine, network computer, and/or alternate beeper or pager. Such multiple notification transmissions, if utilized, may be performed sequentially and/or simultaneously.

The central processing computer may be linked with a fax machine, personal computer, telephone, associated answering machine, alternate telephone and associated answering machine, network computer, and/or alternate beeper or pager via any suitable communication system. The telecommunications link or telephone line or link, which may or may not be a wireless link, depending on the device and/or the circumstances, is utilized in order to link the central processing computer with each of the fax machine, the personal computer, the telephone, the associated answering machine, the alternate telephone, the alternate telephone answering machine, the network computer, and/or the alternate beeper or pager.

In any of the herein-described and/or envisioned embodiments, the respective central processing computer which is utilized may comprise a plurality of computers and/or computer systems. Further, the respective central processing computer may be the processing computer for processing account information, and/or for servicing, and/or monitoring, the respective account(s) activity, and/or the central processing computer may be a separate and/or distinct computer or computer system which is associated with and/or linked with the processing computer.

In any of the herein-described and/or envisioned embodiments, the respective communication device which may be utilized may operate independently of, and/or in conjunction with, a central service and/or a communications service. For example, a beeper or pager may be utilized in conjunction with a corresponding beeper or pager communications service, which communications service may serve to relay signals, data and/or information, to, and from, the beeper or pager, whichever the case may be. The communication device which may be utilized may also be capable of transmitting signals, data and/or information, directly to, and receiving signals, data and/or information, directly from, a component(s) of the apparatus, without the need for a central service and/or a communications service and/or a relay system.

It is also envisioned that the apparatus and method of the present invention may provide for transmitting signals, data and/or information to the cardholder, account owner and/or cellular telephone owner via transmissions made to, and received at a television, radio, car radio, computer and/or other communication device which receives signals transmitted via any suitable communication system. In this manner, for example, a cardholder, account owner and/or cellular telephone owner may be notified by having signals, data and/or information transmitted to their television, radio, car radio, computer, etc., in such a manner so as to interrupt the normal operation of same, so as to convey the information and/or message to the cardholder, account owner and/or cellular telephone owner, in real-time and/or upon the occurrence of the event triggering or giving rise to same.

In any and/or all of the above described embodiments, the apparatus may be programmed and/or be programmable by the respective cardholder, account owner and/or cellular telephone owner or cellular device owner, for his or her account. In conjunction with the use of credit cards, charge cards, debit cards, the cardholder may program the central processing computer, and/or the server computer, if utilized, so as to change the credit limits on his or her account, periodically and/or at any desired time. For example, a cardholder having a credit card with a $10,000.00 dollar credit limit, but who very seldom utilizes his or her card for much more than $500.00 dollars during a monthly billing period, may program the apparatus and, in particular, the central processing computer, or server computer, if utilized, so as to temporarily reduce his or her credit limit.

If the cardholder should then desire to make a major purchase with his or her credit card of, for example, a purchase in the amount of $8500.00, the cardholder may, prior to the transaction, reprogram the central processing computer and/or server computer, if utilized, so as to temporarily increase his or her temporary credit limit. The apparatus may then be programmed so that, after the major purchase has been made, the apparatus may revert operation back to the reduced credit limit.

The cardholder may program the central processing computer, and/or the server computer, if utilized, via the communication device, which may be any one or more of the devices described herein. The cardholder may also perform the above-described programming via a touch-tone telephone. In the same manner, the cardholder may program the apparatus so as to limit the types of transactions involving, and/or the goods and/or services which may be purchased with, his or her card, and/or the stores and/or service providers which may be authorized to accept the card, limits on the dollar amounts of transactions pertaining to each authorized vendor, seller and/or service provider, daily spending limits, the vendors, sellers, and/or service providers with which the card may be utilized, the geographical area or location within which the card may be utilized, and/or authorized times for card usage (i.e. specific days, dates, times of day, times of month, year, etc.), and/or any other limitations and/or restrictions regarding amount of transaction, parties involved, geographical area, and or times of allowed usage. In a similar manner, the cardholder may similarly program the apparatus as described above in conjunction with use of any of the hereindescribed cards.

In a similar manner, a cardholder of a currency and/or "smart" card may program the apparatus so as to limit the types of transactions involving, and/or the goods and/or services which may be purchased with, his or her card, and/or the stores or service providers which may be authorized to accept the card, limits on the dollar amounts of transactions pertaining to each authorized vendor, seller and/or service provider, daily spending limits, the vendors, sellers, and/or service providers with which the card may be utilized, the geographical area or location within which the card may be utilized, and/or authorized times for card usage (i.e. specific days, dates, times of day, times of month, year, etc.), and/or any other limitations and/or restrictions regarding amount of transaction, parties involved, geographical area, and or times of allowed usage.

In the case of savings accounts, checking accounts, and/or automated teller machine accounts, the account owner may program the apparatus and, in particular, the central processing computer, and/or the server computer, if utilized, so as to limit the amount of any one transaction or transactions, individuals who may make the transactions, proof of identity of which the types of proof may be specified, specific banks and/or financial institutions authorized to accept and/or perform transactions for the account, geographical areas and/or location within which banks and/or financial institutions may be authorized to accept and/or perform transactions with the account, specific times of day, specific days, dates and/or time of the month in, or on, which transactions may be authorized, limits of charge-backs, returned item amount withdrawals, maintenance and/or other fee charge withdrawals, etc. and/or authorized times for account usage (i.e. specific days, dates, times of day, times of month, year, etc.), and/or any other limitations and/or restrictions regarding amount of transaction, parties involved, geographical area, and or times of allowed usage.

With regards to automated teller machine accounts, it is also possible to specify and programmably change personal identification numbers and/or any other access code(s) and provide for various personal identification numbers and/or access codes for different locations, different automated teller machines, different days, different times and/or different transaction amounts.

In the cases of cellular telephones and/or cellular communications devices, the cellular telephone owner and/or cellular communication device owner may program the apparatus and, in particular, the central processing computer, and/or the server computer, if utilized, so as to limit the phone numbers which may be called, and/or the numbers from which incoming calls may be accepted and/or received, the geographical areas and/or locations which may be called and/or accessed or from which calls may be received, the times of day, specific days, dates, times of month or year, during which the cellular telephone and/or cellular communication device may be utilized, specific phone numbers which may be called, specific time durations for a phone call and/or any authorized times for cellular telephone and/or cellular communication device usage (i.e. specific days, dates, times of day, times of month, year, etc.), and/or any other limitations and/or restrictions, regarding amount of transaction, parties involved, geographical area, and or times of allowed usage.

The present invention may also be utilized so as to provide financial transaction and/or wireless communication device authorization, notification and/or security for any number and/or types of accounts, including credit card accounts, charge card accounts, debit card accounts, currency or "smart" card accounts, and/or other transaction card accounts, savings accounts, checking accounts, automated teller machine accounts, cellular telephone accounts and/or cellular communication device accounts. In this manner, the apparatus may comprise a communication device or communications devices which may receive and/or transmit signals, data and/or information, for any number and/or types of the above accounts, and/or for each of the respective accounts utilized, from and to the respective central processing computer and/or central processing computers for the respective accounts. In this manner, an individual may utilize a single communication device so as to monitor all of his or her accounts and/or types of accounts.

The apparatus and method of the present invention provides for the real-time notification of financial transactions involving credit cards, charge cards, debit cards, and/or currency or "smart" cards, which enables a cardholder to monitor, in real-time, activity involving his or her card(s) and the corresponding accounts. The apparatus and method of the present invention also provides a means and a mechanism by which to inform a cardholder that his or her card(s) are lost, stolen, or is being utilized in an unauthorized manner and provides an indication to the cardholder of when and where his or her card(s) is being utilized in transactions. The cardholder may then report the card lost or stolen and/or cancel and/or de-activate the card. The apparatus and method of the present invention provides the same, and/or analogous, features and/or functions for banking and/or financial accounts and/or for cellular telephone accounts.

While the communications device(s) described above are described, in each of the respective embodiments, as being utilized for specific uses (i.e. credit and other cards transactions, banking and/or financial transactions, and/or cellular telephone transactions, the communication device (s) may also be adapted and/or programmed for use in all of these aforementioned transactions so that an individual may utilize a single communication device for all of the above described and/or envisioned transaction types.

It is envisioned that the apparatus and method of the present invention may be utilized in conjunction with other apparatuses and methods in the prior art, and that the present invention may be incorporated with these known apparatuses and methods so as to improve upon them and so as to find additional applications for the present invention.

Applicant hereby incorporates by reference herein the following United States Patents: U.S. Pat. No. 5,173,594 which teaches a system for printing personalized charge-card service receipts at remote locations; U.S. Pat. No. 5,479,510 which teaches an automated data card payment verification method; U.S. Pat. No. 5,473,667 which teaches a paging system with third party authorization; U.S. Pat. No. 3,723,655 which teaches a credit authorization terminal; U.S. Pat. No. 5,485,510 which teaches a secure credit/debit card authorization; U.S. Pat. No. 5,406,619 which teaches a universal authentication device for use over telephone lines; U.S. Pat. No. 5,444,616 which teaches financial transaction systems and methods utilizing a multi-reader transaction terminal; U.S. Pat. No. 5,513,250 which teaches telephone based credit card protection; U.S. Pat. No. 4,485,300 which teaches a loss control system; U.S. Pat. No. 4,758,714 which teaches a point-of-sale mechanism; U.S. Pat. No. 4,947,027 which teaches a system for identifying authorized use of credit cards; U.S. Pat. No. 5,357,563 which teaches a data card terminal for receiving authorizations from remote locations; U.S. Pat. No. 5,444,763 which teaches a translation and connection device for radio frequency point of sale transaction system; U.S. Pat. No. 5,243,645 which teaches an automatic system for forwarding of calls; and U.S. Pat. No. 3,938,090 which teaches a terminal apparatus.

While the present invention has been described and illustrated in various preferred and alternate embodiments, such descriptions are merely illustrative of the present invention and are not to be construed to be limitations thereof. In this regard, the present invention encompasses any and all modifications, variations and/or alternate embodiments with the scope of the present invention being limited only by the claims which follow.

What is claimed is:

1. A transaction security apparatus, comprising:

at least one of an input device and a data entry device for at least one of inputting and entering transaction information regarding a transaction into a first communication device;

a processing device for processing the transaction information and for generating a first signal corresponding to the transaction; and a transmitter for transmitting the first signal to a second communication device independently of any processing of the transaction by a central transaction processing computer, wherein the second communication device is associated with an individual account holder, and wherein the second communication device provides information to the individual account holder regarding the transaction, and further wherein the second communication device is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

2. A transaction security method, comprising:

at least one of inputting and entering transaction information regarding a transaction on an account into a first communication device;

processing the transaction information;

generating a first signal corresponding to the transaction; and transmitting the first signal to a second communication device independently of any processing of the transaction by a central transaction processing computer, wherein the second communication device is associated with an individual account holder, and wherein the second communication device provides information to the individual account holder regarding the transaction, and further wherein the second communication device is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

3. A transaction security apparatus, comprising:

a receiver, wherein the receiver is associated with a first communication device, and wherein the receiver receives a first signal, wherein the first signal is transmitted from a second communication device to the receiver independently of any processing of the transaction by a central transaction processing computer, wherein the first communication device is associated with an individual account holder, and further wherein the first signal contains information regarding a transaction occurring on an account, wherein the first communication device is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine, and a processor for processing the first signal and for generating a second signal, wherein the second signal provides information regarding the transaction to the individual account holder.

4. A transaction security method, comprising:

receiving a first signal from a first communication device, wherein the first signal is received at a second communication device, wherein the first signal is transmitted from the first communication device to the second communication device independently of any processing of the transaction by a central transaction processing computer, wherein the second communication device is associated with an individual account holder, and wherein the first signal contains information regarding a transaction occurring on an account, and further wherein the second communication device is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine;

processing the first signal;

generating a second signal; and providing or displaying at least a portion of the information contained in the second signal, wherein the at least a portion of the information contained in the second signal provides information regarding the transaction to the individual account holder.

5. A transaction security apparatus, comprising:

a memory device for storing a limitation or restriction on a use of an account, wherein the account is capable of being utilized in transactions involving the purchase of goods and services, wherein the limitation or restriction is transmitted to a receiver from a communication device associated with an individual account holder, and wherein the limitation or restriction is automatically received by the receiver, and further wherein the limitation or restriction is automatically stored in the memory device; and a central processing device for processing an authorization request for a transaction on the account, wherein the central processing device utilizes the limitation or restriction automatically stored in the memory device in processing the authorization request, wherein the central processing device generates a signal containing information for authorizing or disallowing the transaction.

6. The apparatus of claim 5, further comprising:

a transmitter for transmitting a second signal to a communication device associated with the individual account holder, wherein the communication device receives the second signal, and further wherein the second signal contains information regarding the transaction.

7. The apparatus of claim 6, wherein the communication device which receives the second signal is at least one of a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

8. The apparatus of claim 6, further comprising:

a receiver for receiving a third signal, wherein the third signal is transmitted to the receiver from the communication device which receives the second signal, and further wherein the third signal contains information for authorizing or disallowing the transaction.

9. The apparatus of claim 8, wherein the central processing device processes the third signal and determines whether the transaction is authorized or disallowed.

10. The apparatus of claim 8, wherein the central processing device processes the third signal and determines whether the transaction is authorized or disallowed, and further wherein the central processing device transmits a fourth signal to the transaction authorization device, wherein the fourth signal contains information for at least one of authorizing the transaction, disallowing the transaction, and canceling the transaction.

11. The apparatus of claim 6, wherein the transmitter transmits the second signal to a plurality of communication devices which receive the second signal, wherein the plurality of communication devices which receive the second signal are associated with the individual account holder, and further wherein the transmitter transmits the second signal to the plurality of communication devices which receive the second signal at least one of simultaneously and sequentially.

12. The apparatus of claim 5, wherein the authorization request is transmitted to the apparatus from at least one of a credit card authorization device, a charge card authorization device, and a debit card authorization device.

13. The apparatus of claim 5, wherein the authorization request is transmitted to the apparatus from at least one of a currency card transaction authorization device and a "smart" card authorization device.

14. The apparatus of claim 5, wherein the authorization request is transmitted to the apparatus from at least one of a point-of-sale authorization device, a point-of-sale authorization terminal, and a transaction authorization device.

15. The apparatus of claim 5, wherein the transaction is at least one of a point-of-sale transaction, a telephone order, a mail order, an Internet transaction, and an on-line transaction.

16. The apparatus of claim 5, wherein the transaction involves a use of at least one of a credit card, a charge card, a debit card, a currency card, and a "smart" card.

17. The apparatus of claim 5, wherein the apparatus is utilized on or over at least one of a telecommunication system, a satellite communication system, a radio communication system, a digital communication system, a personal communications services system, the Internet, and the World Wide Web.

18. The apparatus of claim 5, wherein information contained in the second signal is transmitted in at least one of communication transmission, a telephone call, a voice message, a voice mail message, a beeper message, a pager message, a facsimile message, and an answering service message.

19. The apparatus of claim 5, further comprising:
a transmitter for transmitting an electronic mail message to a network computer associated with the individual account holder, wherein the electronic mail message contains information regarding the transaction.

20. The apparatus of claim 5, further comprising:
a transmitter for transmitting a second signal to at least one of a communication device which receives the second signal, a computer, a radio, a car radio, and a television, wherein the second signal contains information regarding the transaction, and further wherein the normal operation of the at least one of a communication device which receives the second signal, a computer, a radio, a car radio, and a television, is interrupted to convey the information to the individual account holder.

21. The apparatus of claim 5, wherein the apparatus is programmed for at least one of automatic activation, self-activation, automatic operation, and self-operation.

22. The apparatus of claim 5, wherein the apparatus is programmed to revert to a pre-established credit limit or spending limit.

23. The apparatus of claim 5, wherein at least one of the communication device from which the limitation or restriction is received and the communication device which receives the second signal is utilized to program the apparatus to at least one of change a credit limit, decrease a credit limit, and increase a credit limit.

24. The apparatus of claim 5, wherein the limitation or restriction involves at least one of types of transactions, goods or services which may be purchased, stores or service providers which may be authorized to accept a card associated with the account, limits on dollar amounts of transactions pertaining to each authorized at least one of vendor, seller, and service provider, daily spending limits, at least one of vendors, sellers, and service providers, with which a card associated with the account may be utilized, a geographical area or location within which the card associated with the account may be utilized, authorized times of account usage, and a limitation or restriction regarding at least one of an amount of a transaction, parties involved, geographical area, and times of allowed usage.

25. The apparatus of claim 5, wherein the limitation or restriction involves at least one of a type of a transaction, a good, or a service which may be purchased, a store or a service provider which may be authorized to accept a card associated with the account, a limit on a dollar amount of a transaction pertaining to each authorized at least one of vendor, seller, and service provider, a daily spending limit, at least one of a vendor, a seller, and a service provider, with which a card associated with the account may be utilized, a geographical area or location within which the card associated with the account may be utilized, an authorized time of account usage, and a limitation or restriction regarding at least one of an amount of a transaction, a party involved, a geographical area, and a time of allowed usage.

26. The apparatus of claim 5, wherein the communication device from which the limitation or restriction is received is at least one of a telephone, a touch-tone telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

27. The apparatus of claim 5, wherein the apparatus comprises a plurality of computers or computer systems.

28. A transaction security apparatus, comprising:
a memory device for storing a limitation or restriction on a use of an account, wherein the limitation or restriction is transmitted to a receiver from a communication device associated with an individual account holder, and wherein the limitation or restriction is automatically received by the receiver, and further wherein the limitation or restriction is automatically stored in the memory device; and a central processing device for processing an authorization request for a transaction on the account, wherein the authorization request is received from a transaction authorization device, wherein the transaction authorization device is utilized in conjunction with at least one of a credit card transaction, a charge card transaction, a debit card transaction, a currency card, and a "smart" card transaction, and further wherein the transaction device is located at a point-of-sale in a transaction involving an in-person transaction or at a location of at least one of a goods provider and a service provider in a transaction involving at least one of a telephone order, a mail order, an Internet transaction, and an on-line transaction, wherein the central processing device utilizes the limitation or restriction automatically stored in the memory device in processing the authorization request, and further wherein the central processing device generates a signal containing information for authorizing or disallowing the transaction.

29. The apparatus of claim 28, further comprising:
a transmitter for transmitting a second signal to a communication device associated with the individual account holder, wherein the communication device receives the second signal, and further wherein the second signal contains information regarding the transaction.

30. The apparatus of claim 29, wherein the communication device which receives the second signal is at least one of a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

31. The apparatus of claim 29, further comprising:
a receiver for receiving a third signal, wherein the third signal is received from the communication device which receives the second signal, and further wherein the third signal contains information for authorizing or disallowing the transaction.

32. The apparatus of claim 31, wherein the central processing device processes the third signal and determines whether the transaction is authorized or disallowed.

33. The apparatus of claim 31, wherein the central processing device processes the third signal and determines whether the transaction is authorized or disallowed, and further wherein the central processing device transmits a fourth signal to the transaction authorization device, wherein the fourth signal contains information for at least one of authorizing the transaction, disallowing the transaction, and canceling the transaction.

34. The apparatus of claim 29, wherein the transmitter transmits the second signal to a plurality of communication devices which receive the second signal, wherein the plurality of communication devices which receive the second signal are associated with the individual account holder, and further wherein the transmitter transmits the second signal to the plurality of communication devices which receive the second signal at least one of simultaneously and sequentially.

35. The apparatus of claim 29, wherein information contained in the second signal is transmitted to the communication device which receives the second signal in at least one of a communication transmission, a telephone call, a voice message, a voice mail message, a beeper message, a pager message, a facsimile message, and an answering service message.

36. The apparatus of claim 28, wherein the authorization request is transmitted to the apparatus from at least one of a credit card transaction authorization device, a charge card authorization device, and a debit cad authorization device.

37. The apparatus of claim 28, wherein the authorization request is transmitted to the apparatus from at least one of a currency card transaction authorization device and a "smart" authorization device.

38. The apparatus of claim 28, wherein the authorization request is transmitted to the apparatus from at least one of a point-of-sale authorization device, a point-of-sale authorization terminal, and a transaction authorization device.

39. The apparatus of claim 28, wherein the transaction is at least one of a point-of-sale transaction, a telephone order, a mail order, an Internet transaction, and an on-line transaction.

40. The apparatus of claim 28, wherein the apparatus is utilized on or over at least one of a telecommunication system, a satellite communication system, a radio communication system, a digital communication system, a personal communications services system, the Internet, and the World Wide Web.

41. The apparatus of claim 28, further comprising:
a transmitter for transmitting an electronic mail message to a network computer associated with the individual account holder, wherein the electronic mail message contains information regarding the transaction.

42. The apparatus of claim 28, further comprising:
a transmitter for transmitting a second signal containing information regarding the transaction to at least one of a communication device which receives the second signal, a computer, a radio, a car radio, and a television, wherein the second signal contains information regarding the transaction, and further wherein the normal operation of the at least one of a communication device which receives the second signal, a computer, a radio, a car radio, and a television, is interrupted to convey the information to the individual account holder.

43. The apparatus of claim 28, wherein the apparatus is programmed for at least one of automatic activation, self-activation, automatic operation, and self-operation.

44. The apparatus of claim 28, wherein the apparatus is programmed to revert to a pre-established credit limit or spending limit.

45. The apparatus of claim 28, wherein at least one of the communication device from which the limitation or restriction is received and the communication device which receives the second signal is utilized to perform the apparatus to at least one of change a credit limit, decrease a credit limit, and increase a credit limit.

46. The apparatus of claim 28, wherein the limitation or restriction involves at least one of types of transactions, goods or services which may be purchased, stores or service providers which may be authorized to accept a card associated with the account, limits on dollar amounts of transactions pertaining to each authorized at least one vendor, seller, and service provider, daily spending limits, at least one of vendors, sellers, and service providers, with which a card associated with the account may be utilized, a geographical area or location within which the card associated with the account may be utilized, authorized times of account usage, and a limitation or restriction regarding at least one of an amount of a transaction, parties involved, geographical area, and times of allowed usage.

47. The apparatus of claim 28, wherein the limitation or restriction involves at least one of a type of a transaction, a good or a service which may be purchased, a store or a service provider which may be authorized to accept a card associated with the account, a limit on a dollar amount of a transaction pertaining to each authorized at least one of vendor, seller, and service provider, a daily spending limit, at least one of a vendor, a seller, and a service provider, with which a card associated with the account may be utilized, a geographical area or location within which the card associated with the account may be utilized, an authorized time of account usage, and a limitation or restriction regarding at least one of an amount of a transaction, a party involved, a geographical area, and a time of allowed usage.

48. The apparatus of claim 28, wherein the communication device from which the limitation or restriction is received is at least one of a telephone, a touch-tone telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

49. The apparatus of claim 28, wherein the apparatus comprises a plurality of computers or computer systems.

50. A transaction security apparatus, comprising:
a memory device for storing a limitation or restriction on a use of an account, wherein the limitation or restriction is transmitted to a receiver from a communication device associated with an individual account holder, and wherein the limitation or restriction includes information regarding a name of a party authorized to use the account and information regarding a spending a spending limit on the account, wherein the limitation or restriction is automatically received by the receiver, and further wherein the limitation or restriction is automatically stored in the memory device; and a central processing device for processing an authorization request for a transaction on the account, wherein the central processing device utilizes the limitation or restrcition automatically stored in the memory device, and further wherein the central processing device generates a signal containing information for authorizing or disallowing the transaction.

51. The apparatus of claim 50, further comprising:

a transmitter for transmitting a second signal to a communication device associated with the individual account holder, wherein the communication device receives the second signal, and further wherein the second signal contains information regarding the transaction.

52. The apparatus of claim 51, wherein the communication device which receives the second signal is at least one of a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

53. The apparatus of claim 51, further comprising:

a receiver for receiving a third signal from the communication device which receives the second signal, wherein the third signal contains information for authorizing or disallowing the transaction.

54. The apparatus of claim 53, wherein the central processing device processes the third signal and determines whether the transaction is authorized or disallowed.

55. The apparatus of claim 53, wherein the central processing device processes the third signal and determines whether the transaction is authorized or disallowed, and further wherein the central processing device at least one of authorizes the transaction, disallows the transaction, and cancels the transaction.

56. The apparatus of claim 51, wherein the transmitter transmits the second signal to a plurality of communication devices which receive the second signal, wherein the plurality of communication devices which receive the second signal are associated with the individual account holder, and further wherein the transmitter transmits the second signal to the plurality of communication devices which receive the second signal at least one of simultaneously and sequentially.

57. The apparatus of claim 51, wherein information contained in the second signal is transmitted to the communication device which receives the second signal in at least one of a communication transmission, a telephone call, a voice message, a voice mail message, a beeper message, a pager message, a facsimile message, and an answering service message.

58. The apparatus of claim 50, wherein the authorization request is transmitted to the apparatus from at least one of a credit card transaction authorization device, a charge card authorization device, and a debit card authorization device.

59. The apparatus of claim 50, wherein the authorization request is transmitted to the apparatus from at least one of a currency card transaction authorization device and a "smart" card authorization device.

60. The apparatus of claim 50, wherein the authorization request is transmitted to the apparatus from at least one of a point-of-sale authorization device, a point-of-sale authorization terminal, and a transaction authorization device.

61. The apparatus of claim 50, wherein the transaction is at least one of a point-of-sale transaction, a telephone order, a mail order, an Internet transaction, and an on-line transaction.

62. The apparatus of claim 50, wherein the transaction involves a use of at least one of a credit card, a charge card, a debit card, a currency card, and a "smart" card.

63. The apparatus of claim 50, wherein the apparatus is utilized on or over at least one of a telecommunication system, a satellite communication system, a radio communication system, a digital communication system, a personal communications services system, the Internet, and the World Wide Web.

64. The apparatus of claim 50, further comprising:

a transmitter for transmitting an electronic mail message to a network computer associated with the individual account holder, wherein the electronic mail message contains information regarding the transaction.

65. The apparatus of claim 50, further comprising:

a transmitter for transmitting a second signal containing information regarding the transaction to at least one of a communication device which receives the second signal, a computer, a radio, a car radio, and a television, wherein the second signal contains information regarding the transaction, and further wherein the normal operation of the at least one of a communication device which receives the second signal, a computer, a radio, a car radio, and a television, is interrupted to convey the information to the individual account holder.

66. The apparatus of claim 50, wherein the apparatus is programmed for at least one of automatic activation, self-activation, automatic operation, and self-operation.

67. The apparatus of claim 50, wherein the apparatus is programmed to revert to a pre-established credit limit or spending limit.

68. The apparatus of claim 50, wherein the one of the communication which transmits the limitation or restriction to the receiver and the communication device which receives the second signal is utilized to program the apparatus to at least one of change a credit limit, decrease a credit limit, and increase a credit limit.

69. The apparatus of claim 50, wherein the communication device from which the limitation or restriction is received is at least one of a telephone, a touch-tone telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

70. The apparatus of claim 50, wherein the apparatus comprises a plurality of computers or computer systems.

71. A transaction security apparatus, comprising:

a memory device for storing a limitation or restriction on a use of an account, wherein the limitation or restriction is transmitted to a receiver from a communication device associated with an individual account holder, wherein the limitation or restriction includes information regarding a name of a party authorized to use the account and information regarding a spending limit on the account, and wherein the limitation or restriction is automatically received by the receiver, and further wherein the limitation or restriction is automatically stored in the memory device;

a central processing device for processing an authorization request for a transaction on the account, wherein the central processing device utilizes the limitation or restriction automatically stored in the memory device in processing the authorization request, wherein the central processing device generates a first signal containing information for authorizing or disallowing the transaction, and further wherein the central processing device generates a second signal containing information regarding the transaction; and a transmitter for transmitting the second signal to a communication device associated with the individual account holder.

72. The apparatus of claim 71, wherein the authorization request is transmitted to the apparatus from at least one of a credit card authorization device, a charge card authorization device, and a debit card authorization device.

73. The apparatus of claim 71, wherein the authorization request is transmitted to the apparatus from at least one of a currency card authorization device and a "smart" card authorization device.

74. The apparatus of claim 71, further comprising:
a receiver for receiving a third signal from the communication device which receives the second signal, wherein the third signal contains information for authorizing or disallowing the transaction.

75. The apparatus of claim 71, wherein the authorization request is transmitted to the apparatus from at least one of a point-of-sale authorization device, a point-of-sale authorization terminal, and a transaction authorization device.

76. The apparatus of claim 71, wherein the transaction is at least one of a point-of-sale transaction, a telephone order, a mail order, an Internet transaction, and an on-line transaction.

77. The apparatus of claim 71, wherein the transaction involves a use of at least one of a credit card, a charge card, a debit card, a currency card, and a "smart" card.

78. The apparatus of claim 71, wherein the apparatus is utilized on or over at least one of a telecommunication system, a satellite communication system, a radio communication system, a digital communication system, a personal communications services system, the Internet, and the World Wide Web.

79. The apparatus of claim 71, wherein the transmitter transmits the second signal to a plurality of communication devices which receive the second signal, wherein the plurality of communication devices which receive the second signal are associated with the individual account holder, and further wherein the transmitter transmits the second signal to the plurality of communication devices which receive the second signal at least one simultaneously and sequentially.

80. The apparatus of claim 71, wherein information contained in the second signal is transmitted to the communication device which receives the second signal in at least one of a communication transmission, a telephone call, a voice message, a voice mail message, a beeper message, a pager message, a facsimile message, and an answering service message.

81. The apparatus of claim 71, wherein the transmitter transmits an electronic mail message to a network computer associated with the individual account holder, wherein the electronic mail message contains information regarding the transaction.

82. The apparatus of claim 74, wherein the central processing device processes the third signal and determines whether the transaction is authorized or disallowed.

83. The apparatus of claim 74, wherein the central processing device processes the third signal and determines whether the transaction is authorized or disallowed, and further wherein the central processing device at least one of authorizes the transaction, disallows the transaction, and cancels the transaction.

84. The apparatus of claim 71, wherein the transmitter transmits the second signal to at least one of the communication device which receives the second signal, a computer, a radio, a car radio, and a television, and further wherein the normal operation of the at least one of the communication device which receives the second signal, a computer, a radio, a car radio, and a television, is interrupted to convey the information to the individual account holder.

85. The apparatus of claim 71, wherein the communication device from which the limitation or restriction is received is at least one of a telephone, a touch-tone telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

86. The apparatus of claim 71, wherein the apparatus comprises a plurality of computers or computer systems.

87. A transaction security apparatus, comprising:
a memory device for storing a limitation or restriction on a use of an account, wherein the account is at least one of a credit card account, a charge card account, a debit card account, a currency card account, a "smart" card account, a checking account, a savings account, and an automated teller machine account, wherein the limitation or restriction is transmitted to a receiver from a communication device associated with an individual account holder, and wherein the limitation or restriction is automatically received by the receiver, and further wherein the limitation or restriction is automatically stored in the memory device;

a central processing device for processing an authorization request for a transaction on the account, wherein the central processing device utilizes the limitation or restriction automatically stored in the memory device in processing the authorization request, wherein the central processing device generates a first signal containing information for authorizing or disallowing the transaction, and further wherein the central processing device generates a second signal containing information regarding the transaction; and a transmitter for transmitting the second signal to a communication device associated with the individual account holder, wherein the second signal is transmitted to the communication device in real-time.

88. The apparatus of claim 87, wherein the authorization request is transmitted to the apparatus from at least one of a credit card authorization device, a charge card authorization device, and a debit card authorization device.

89. The apparatus of claim 87, wherein the authorization request is transmitted to the apparatus from at least one of a currency card authorization device and a "smart" card authorization device.

90. The apparatus of claim 87, further comprising:
a receiver for receiving a third signal from the communication device which receives the second signal, wherein the third signal contains information for authorizing or disallowing the transaction.

91. The apparatus of claim 90, wherein the central processing device processes the third signal and determines whether the transaction is authorized or disallowed.

92. The apparatus of claim 90, wherein the central processing device processes the third signal and determines whether the transaction is authorized or disallowed, and further wherein the central processing device at least one of authorizes the transaction, disallows the transaction, and cancels the transaction.

93. The apparatus of claim 90, wherein the transmitter transmits the second signal to at least one of a communication device which receives the second signal, a computer, a radio, a car radio, and a television, and further wherein the normal operation of the at least one of a communication device which receives the second signal, a computer, a radio, a car radio, and a television, is interrupted to convey the information to the individual account holder.

94. The apparatus of claim 87, wherein the authorization request is transmitted to the apparatus from at least one of a point-of-sale authorization device, a point-of-sale authorization terminal, and a transaction authorization device.

95. The apparatus of claim 87, wherein the transaction is at least one of a point-of-sale transaction, a telephone order, a mail order, an Internet transaction, and an on-line transaction.

96. The apparatus of claim 87, wherein the apparatus is utilized on or over at least one of a telecommunication system, a satellite communication system, a radio communication system, a digital communication system, a personal communications services system, the Internet, and the World Wide Web.

97. The apparatus of claim 87, wherein the apparatus is programmed for at least one of automatic activation, self-activation, automatic operation, and self-operation.

98. The apparatus of claim 87, wherein the communication device which receives the second signal is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

99. The apparatus of claim 87, wherein the apparatus is programmed to revert to a pre-established credit limit or spending limit.

100. The apparatus of claim 87, wherein at least one of the communication device from which the limitation or restriction is received and the communication device which receives the second signal is utilized to program the apparatus to at least one of change a credit limit, decrease a credit limit, and increases a credit limit.

101. The apparatus of claim 87, wherein the limitation or restriction involves at least one of types of transactions, goods or services which may be purchased, stores or service providers which may be authorized to accept a card associated with the account, limits on dollar amounts of transactions pertaining to each authorized at least one of vendor, seller, and service provider, daily spending limits, at least one of vendors, sellers, and service providers, with which a card associated with the account may be utilized, a geographical area or location within which the card associated with the account may be utilized, authorized times of account usage, and a limitation or restriction regarding at least one of an amount of a transaction, parties involved, geographical area, and times of allowed usage.

102. The apparatus of claim 87, wherein the limitation or restriction involves at least one of a type of a transaction, a good or a service which may be purchased, a store or a service provider which may be authorized to accept a card associated with the account, a limit on dollar amount of a transaction pertaining to each authorized at least one of vendor, seller, and service provider, a daily spending limit, at least one of a vendor, a seller, and a service provider, with which a card associated with the account may be utilized, a geographical area or location within which the card associated with the account may be utilized, an authorized time of account usage, and a limitation or restriction regarding at least one of an amount of a transaction, a party involved, a geographical area, and a time of allowed usage.

103. The apparatus of claim 87, wherein the transmitter transmits the second signal to a plurality of communication devices which receive the second signal at least one of simultaneously and sequentially.

104. The apparatus of claim 87, wherein information contained in the second signal is contained in at least one of a communication transmission, a telephone call, a voice message, a voice mail message, a beeper message, a pager message, a facsimile message, and an answering service message.

105. The apparatus of claim 87, wherein the transmitter transmits an electronic mail message to a network computer associated with the individual account holder, wherein the electronic mail message contains information regarding the transaction.

106. The apparatus of claim 87, wherein the communication device from which the limitation or restriction is received is at least one of a telephone, a touch-tone telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

107. The apparatus of claim 87, wherein the apparatus comprises a plurality of computers or computer systems.

108. A transaction security apparatus, comprising:
a memory device for storing a limitation or restriction regarding a banking transaction, wherein the limitation or restriction prohibits a withdrawal from at least one of a checking account, a savings account, and an automated teller machine account, or prohibits use of at least one of a checking account, a savings account, and an automated teller machine account, wherein the limitation or restriction is transmitted to a receiver from a communication device associated with an individual account holder, wherein the limitation or restriction is automatically received by the receiver, and further wherein the limitation or restriction is automatically stored in the memory device; and
a central processing device for processing information regarding a banking transaction, wherein the central processing device utilizes the limitation or restriction automatically stored in the memory device in processing the banking transaction, and further wherein the central processing device generates a signal containing information for allowing or disallowing the banking transaction.

109. The apparatus of claim 108, further comprising:
a transmitter for transmitting a second signal to a communication device associated with an individual account holder, wherein the communication device receives the second signal, and further wherein the second signal contains information regarding the banking transaction.

110. The apparatus of claim 109, further comprising:
a receiver for receiving a third signal from the communication device which receives the second signal, wherein the third signal contains information for allowing or disallowing the banking transaction.

111. The apparatus of claim 110, wherein the central processing device processes the third signal and determines whether the banking transaction is allowed or disallowed.

112. The apparatus of claim 110, wherein the central processing device processes the third signal and determines whether the banking transaction is authorized or disallowed, and further wherein the central processing device at least one of authorizes the banking transaction, disallows the banking transaction, and cancels the banking transaction.

113. The apparatus of claim 109, wherein the transmitter transmits the second signal to a plurality of communication devices which receive the second signal at least one of simultaneously and sequentially.

114. The apparatus of claim 109, wherein information contained in the second signal is transmitted to the communication device which receives the second signal in at least one of a communication transmission, a telephone call, a voice message, a voice mail message, a beeper message, a pager message, a facsimile message, and an answering service message.

115. The apparatus of claim 109, wherein the communication device which receives the second signal is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

116. The apparatus of claim 108, wherein the second signal contains information regarding at least one of information identifying the banking transaction, a name of a bank or financial institution where the banking transaction is taking place, an account number or description, an amount of the banking transaction, a description of the person seeking to make the banking transaction, the type of banking transaction, and a location of the banking transaction.

117. The apparatus of claim 108, wherein the banking transaction is at least one of a checking account transaction, a savings account transaction, and an automated teller machine account transaction.

118. The apparatus of claim 108, wherein the banking transaction is at least one of a clearing transaction, a check clearing transaction, an account charging transaction, and a charge-back transaction.

119. The apparatus of claim 108, wherein the banking transaction is an account settling transaction.

120. The apparatus of claim 108, wherein the apparatus is at least one of a banking transaction processing computer and a financial transaction processing computer.

121. The apparatus of claim 108, wherein the authorization request is transmitted to the apparatus from at least one of a banking transaction device, a banking transaction terminal, a teller terminal, a teller work station, a processing computer terminal, an automated teller machine terminal, a cashier work station, and an over-the-counter transaction device.

122. The apparatus of claim 108, wherein the apparatus is utilized on or over at least one of a telecommunication system, a satellite communication system, a radio communication system, a digital communication system, a personal communications services system, the Internet, and the World Wide Web.

123. The apparatus of claim 108, wherein the banking transaction is a check cashing transaction.

124. The apparatus of claim 108, wherein the banking transaction is a savings account withdrawal transaction.

125. The apparatus of claim 108, wherein the banking transaction is an automated teller machine account withdrawal transaction.

126. The apparatus of claim 108, further comprising:
a transmitter for transmitting an electronic mail message to a network computer associated with the individual account holder, wherein the electronic mail message contains information regarding the banking transaction.

127. The apparatus of claim 108, further comprising:
a transmitter for transmitting a second signal to at least one of a communication device which receives the second signal, a computer, a radio, a car radio, and a television, wherein the second signal contains information regarding the banking transaction, and further wherein the normal operation of the at least one of a communication device which receives the second signal, a computer, a radio, a car radio, and a television, is interrupted to convey the information to the individual account holder.

128. The apparatus of claim 108, wherein the apparatus is programmed for at least one of automatic activation, self-activation, automatic operation, and self-operation.

129. The apparatus of claim 108, wherein the apparatus is programmed to revert to a pre-established spending limit.

130. The apparatus of claim 108, wherein the limitation or restriction involves at least one of an amount of a transaction or transactions, an individual who may make the transaction, a specified type of proof of identity, a specific bank or financial institution authorized to accept or perform a transaction for the account, a geographical area or location within which a bank or financial institution may be authorized to accept or perform a transaction with the account, at least one of a specific time of day, a specific day, a date, and a time of the month, on which a transaction may be authorized, a limit of at least one of a charge-back, a returned item amount withdrawal, and a maintenance or other fee charge withdrawal, an authorized time for account usage, and a limitation or restriction regarding at least one of an amount of transaction, a party involved, a geographical area, and a time of allowed usage.

131. The apparatus of claim 108, wherein the limitation or restriction involves at least one of an amount of a transaction or transactions, individuals who may make transactions, specified types of proof of identity, specific banks or financial institutions, authorized to accept or perform transactions for the account, geographical areas or location within which banks or financial institutions may be authorized to accept or perform transactions with the account, at least one of specific times of day, specific days, dates, and times of the month, on which transactions may be authorized, limits of at least one of charge-backs, returned item amount withdrawals, and maintenance or other fee charge withdrawals, authorized times for account usage, and a limitation or restriction regarding at least one of an amount of transaction, parties involved, a geographical area, and times of allowed usage.

132. The apparatus of claim 108, wherein the communication device from which the limitation or restriction is received is utilized to change a personal identification number or access code.

133. The apparatus of claim 108, wherein the apparatus is programmed to provide for various personal identification numbers or access codes for at least one of different locations, different automated teller machines, different days, different times, and different transaction amounts.

134. The apparatus of claim 108, wherein the communication device from which the limitation or restriction is received is utilized to program the apparatus to provide for various personal identification numbers or access codes for at least one of different locations, different automated teller machines, different days, different times, and different transaction amounts.

135. The apparatus of claim 108, wherein the central processing device determines whether a hold for prohibiting a withdrawal is placed on the at least one of a checking account, a savings account, and an automated teller machine account, and further wherein the central processing device disallows the banking transaction.

136. The apparatus of claim 108, wherein the communication device from which the limitation or restriction is received is at least one of a telephone, a touch-tone telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

137. The apparatus of claim 108, wherein the apparatus comprises a plurality of computers or computer systems.

138. A transaction security apparatus, comprising:
a memory device for storing a limitation or restriction regarding a banking transaction, wherein the banking transaction involves a withdrawal from at least one of a checking account, a savings account, and an automated teller machine account, or a cashing of a check on a checking account, wherein the limitation or restriction contains information for prohibiting the withdrawal from the at least one of a checking account, a savings account, and an automated teller machine account, or for prohibiting the cashing of a check on a checking account, and further wherein the limitation or restriction is transmitted to a receiver from a communication device associated with an individual account holder, wherein the limitation or restriction is automatically received by the receiver, and further wherein the limitation or restriction is automatically stored in the memory device; and
a central processing device for processing information regarding a banking transaction, wherein the central processing device utilizes the limitation or restriction automatically stored in the memory device in processing the banking transaction, and further wherein the central processing device generates a signal containing information for allowing or disallowing the banking transaction.

139. The apparatus of claim 138, further comprising:
a transmitter for transmitting a second signal to a communication device associated with an individual account holder, wherein the communication device receives the second signal, and further wherein the second signal contains information regarding the banking transaction.

140. The apparatus of claim 139, further comprising:
a receiver for receiving a third signal from the communication device which receives the second signal, wherein the third signal contains information for allowing or disallowing the banking transaction.

141. The apparatus of claim 140, wherein the central processing device processes the third signal and determines whether the banking transaction is allowed or disallowed.

142. The apparatus of claim 140, wherein the central processing device processes the third signal and determines whether the banking transaction is allowed or disallowed, and further wherein the central processing device at least one of authorizes the banking transaction, disallows the banking transaction, and cancels the banking transaction.

143. The apparatus of claim 140, wherein the communication device which receives the second signal is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

144. The apparatus of claim 139, wherein the transmitter transmits the second signal to a plurality of communication devices which receive the second signal at least one of simultaneously and sequentially.

145. The apparatus of claim 139, wherein information contained in the second signal is transmitted to the communication device which receives the second signal in at least one of a communication transmission, a telephone call, a voice message, a voice mail message, a beeper message, a pager message, a facsimile message, and an answering service message.

146. The apparatus of claim 138, wherein the second signal contains information regarding at least one of information identifying the transaction, a name of a bank or financial institution where the transaction is taking place, an account number or description, an amount of the transaction, a description of the person seeking to make the transaction, the type of transaction, and a location of the transaction.

147. The apparatus of claim 138, wherein the banking transaction is at least one of a checking account transaction, a savings account transaction, and an automated teller machine account transaction.

148. The apparatus of claim 138, wherein the banking transaction is at least one of a clearing transaction, a check clearing transaction, an account charging transaction, a charge-back transaction, and an account settling transaction.

149. The apparatus of claim 138, wherein the apparatus is at least one of a banking transaction processing computer and a financial transaction processing computer.

150. The apparatus of claim 138, wherein the authorization request is transmitted to the apparatus from at least one of a banking transaction device, a banking transaction terminal, a teller terminal, a teller work station, a processing computer terminal, an automated teller machine terminal, a cashier work station, an over-the-counter transaction device.

151. The apparatus of claim 138, wherein the apparatus is utilized on or over at least one of a telecommunication system, a satellite communication system, a radio communication system, a digital communication system, a personal communications services system, the Internet, and the World Wide Web.

152. The apparatus of claim 138, wherein the banking transaction is a check cashing transaction.

153. The apparatus of claim 138, wherein the banking transaction is a savings account withdrawal transaction.

154. The apparatus of claim 138, further comprising:
a transmitter for transmitting an electronic mail message to a network computer associated with the individual account holder, wherein the electronic mail message contains information regarding the transaction.

155. The apparatus of claim 138, wherein the banking transaction is an automated teller machine account withdrawal transaction.

156. The apparatus of claim 138, further comprising:
a transmitter for transmitting a second signal to at least one of a communication device which receives the second signal, a computer, a radio, a car radio, and a television, wherein the second signal contains information regarding the banking transaction, and further wherein the normal operation of the at least one of a communication device which receives the second signal, a computer, a radio, a car radio, and a television, is interrupted to convey the information to the individual account holder.

157. The apparatus of claim 138, wherein the apparatus is programmed for at least one of automatic activation, self-activation, automatic operation, and self-operation.

158. The apparatus of claim 138, wherein the apparatus is programmed to revert to a pre-established spending limit.

159. The apparatus of claim 138, wherein the limitation or restriction involves at least one of an amount of a transaction or transactions, an individual who may make the transaction, a specified type of proof of identity, a specific bank or financial institution authorized to accept or perform a transaction for the account, a geographical area or location within which a bank or financial institution may be authorized to accept or perform a transaction with the account, at least one of a specific time of day, a specific day, a date, and a time of the month, on which a transaction may be authorized, a limit of at least one of a charge-back, a returned item amount withdrawal, and a maintenance or other fee charge withdrawal, an authorized time for account usage, and a limitation or restriction regarding at least one of an amount of transaction, a party involved, a geographical area, and a time of allowed usage.

160. The apparatus of claim 138, wherein the limitation or restriction involves at least one of an amount of a transaction or transactions, individuals who may make transactions, specified types of proof of identity, specific banks or financial institutions, authorized to accept or perform transactions for the account, geographical area or location within which banks or financial institutions may be authorized to accept or perform transactions with the account, at least one of specific times of day, specific days, dates, and times of the month, on which transactions may be authorized, limits of at least one of charge-backs, returned item amount withdrawals, and maintenance or other fee charge withdrawals, authorized times for account usage, and a limitation or restriction regarding at least one of an amount of transaction, parties involved, a geographical area, and times of allowed usage.

161. The apparatus of claim 138, wherein the communication device from which the limitation or restriction is received is utilized to change a personal identification number or access code.

162. The apparatus of claim 138, wherein the apparatus can be programmed to provide for various personal identification numbers or access codes for at least one of different locations, different automated teller machines, different days, different times, and different transaction amounts.

163. The apparatus of claim 138, wherein the communication device from which the limitation or restriction is received is utilized to program the apparatus to provide for various personal identification numbers or access codes for at least one of different locations, different automated teller machines, different days, different times, and different transaction amounts.

164. The apparatus of claim 138, wherein the central processing device determines whether a hold for prohibiting a withdrawal is placed on the at least one of a checking account, a savings account, and an automated teller machine account, and further wherein the central processing device disallows the banking transaction.

165. The apparatus of claim 138, wherein the communication device from which the limitation or restriction is received is at least one of a telephone, a touch-tone telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

166. The apparatus of claim 138, wherein the apparatus comprises a plurality of computers or computer systems.

167. A transaction security apparatus, comprising:
a memory device for storing a limitation regarding a use of a communication device on a wireless communication device account or a cellular communication device account, wherein the limitation contains information regarding at least one of phone numbers which may be called, numbers from which an incoming call may be accepted or received, at least one of times of day, specific days, dates, and times of month or year, during which a communication device may be utilized, authorized times of usage of a communication device on the account, amount of transaction, parties involved, and times of allowed usage, wherein the limitation is transmitted to a receiver from a communication device associated with an individual account holder, wherein the limitation is automatically received by the receiver, and further wherein the limitation is automatically stored in the memory device;

a central processing device for processing information regarding a use of a communication device on the wireless communication device account or the cellular communication device account or an attempt to use a communication device on the wireless communication device account or the cellular communication device account, wherein the central processing device utilizes the limitation automatically stored in the memory device in processing the information regarding a use of a communication device on the wireless communication device account or the cellular communication device account or an attempt to use a communication device on the wireless communication device account or the cellular communication device account, and further wherein the central processing device generates a signal containing information for allowing or disallowing the use of the communication device.

168. The apparatus of claim 167, further comprising:
a transmitter for transmitting a second signal to a second communication device associated with an individual account holder, wherein the second signal contains information regarding the use of the communication device or the attempt to use the communication device.

169. The apparatus of claim 168, further comprising:
a receiver for receiving a third signal from the second communication device, wherein the third signal contains information for allowing or disallowing the use of the communication device.

170. The apparatus of claim 169, wherein the central processing device processes the third signal and determines whether the use of the communication device is allowed or disallowed.

171. The apparatus of claim 169, wherein the central processing device processes the third signal and determines whether the use of the communication device is allowed or disallowed, and further wherein the central processing device at least one of allows the use of the communication device, disallows the use of the communication device, and terminates the use of the communication device.

172. The apparatus of claim 168, wherein the transmitter transmits the second signal to a plurality of second communication devices at least one of simultaneously and sequentially.

173. The apparatus of claim 168, wherein information contained in the second signal is transmitted to the second communication device is at least one of a communication transmission, a telephone call, a voice message, a voice mail message, a beeper message, a pager message, a facsimile message, and an answering service message.

174. The apparatus of claim 168, wherein the second communication device is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

175. The apparatus of claim 168, wherein the transmitter transmits the second signal to at least one of a second communication device, a computer, a radio, a car radio, and a television, and further wherein the normal operation of the at least one of a second communication device, a computer, a radio, a car radio, and a television, is interrupted to convey the information to the individual account holder.

176. The apparatus of claim 168, wherein the second signal contains information regarding a number called, a time of a call, and a duration of a call.

177. The apparatus of claim 167, wherein the apparatus is a central processing computer for at least one of processing information and maintaining records for wireless communication device accounts or cellular communication device accounts, wherein the information includes at least one of account usage information and account billing information.

178. The apparatus of claim 167, wherein the apparatus is utilized on or over at least one of a telecommunication system, a satellite communication system, a radio communication system, a digital communication system, a personal communications services system, the Internet, and the World Wide Web.

179. The apparatus of claim 167, further comprising:
a transmitter for transmitting an electronic mail message to a network computer associated with the individual account holder, wherein the electronic mail message contains information regarding the use of the communication device or the attempt to use the communication device.

180. The apparatus of claim 167, wherein the apparatus is programmed for at least one of automatic activation, self-activation, automatic operation, and self-operation.

181. The apparatus of claim 167, wherein the central processing device utilizes a second limitation automatically received from the communication device from which the limitation is received and automatically stored in the memory device in processing information regarding the use of the communication device on the wireless communication device account or the cellular communication device account or the attempt to use the communication device on the wireless communication device account or the cellular communication device account, wherein the second limitation contains information regarding at least one of a geo-graphical area which may be called or accessed, geographical areas which may be called or accessed, a location which may be called or accessed, locations which may be called or accessed, a geographical area or areas from which calls may be received, a location or locations from which calls may be received, a specific phone number or specific phone numbers which may be called, a specific time duration or specific time durations for a phone call, and an authorized time or authorized times for communication device usage.

182. The apparatus of claim 167, wherein the communication device from which the limitation is received is at least one of a telephone, a touch-tone telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

183. The apparatus of claim 167, wherein the apparatus comprises a plurality of computers or computer systems.

184. A transaction security method, comprising:
receiving a limitation or restriction on a use of an account, wherein the account is capable of being utilized in transactions involving the purchase of goods and services, wherein the limitation or restriction is transmitted to a receiver from a communication device associated with an individual account holder, and wherein the limitation or restriction is automatically received by the receiver;
storing the limitation or restriction in a memory device, wherein the limitation or restriction is automatically stored in the memory device;
processing an authorization request for a transaction on the account, wherein the authorization request is processed by a central processing device, and further wherein the limitation or restriction automatically stored in the memory device is utilized in processing the authorization request; and
generating a signal containing information for authorizing or disallowing the transaction, wherein the signal is generated by the central processing device.

185. A transaction security method, comprising:
receiving a limitation or restriction on a use of an account, wherein the limitation or restriction is transmitted to a receiver from a communication device associated with an individual account holder, and wherein the limitation or restriction is automatically received by the receiver;
storing the limitation or restriction in a memory device, wherein the limitation or restriction is automatically stored in the memory device;
processing an authorization request for a transaction on the account, wherein the authorization request is received from a transaction authorization device, wherein the transaction authorization device is utilized in conjunction with at least one of a credit card transaction, a charge card transaction, a debit card transaction, a currency card, and a "smart" card transaction, and further wherein the transaction device is located at a point-of-sale in a transaction involving an in-person transaction or at a location of at least one of a goods provider and a service provider in a transaction involving at least one of a telephone order, a mail order, an Internet transaction, and an on-line transaction, and wherein the authorization request is processed by a central processing device, and further wherein the limitation or restriction automatically stored in the memory device is utilized in processing the authorization request; and generating a signal containing information for authorizing or disallowing the transaction, wherein the signal is generated by the central processing device.

186. A transaction security method, comprising:

receiving a limitation or restriction on a use of an account, wherein the limitation or restriction is transmitted to a receiver from a communication device associated with an individual account holder, and wherein the limitation or restriction includes information regarding a name of a party authorized to use the account and information regarding a spending limit on the account, wherein the limitation or restriction is automatically received by the receiver;

storing the limitation or restriction in a memory device, wherein the limitation or restriction is automatically stored in the memory device;

processing an authorization request for a transaction on the account, wherein the authorization request is processed by a central processing device, and further wherein the limitation or restriction automatically stored in the memory device is utilized in processing the authorization request; and generating a signal containing information for authorizing or disallowing the transaction, wherein the signal is generated by the central processing device.

187. A transaction security method, comprising:

receiving a limitation or restriction on a use of an account, wherein the limitation or restriction is transmitted to a receiver from a communication device associated with an individual account holder, wherein the limitation or restriction includes information regarding a name of a party authorized to use the account and information regarding a spending limit on the account, and wherein the limitation or restriction is automatically received by the receiver;

storing the limitation or restriction in a memory device, wherein the limitation or restriction is automatically stored in the memory device;

processing an authorization request for a transaction on the account, wherein the authorization request is processed by a central processing device, and further wherein the limitation or restriction automatically stored in the memory device is utilized in processing the authorization request;

generating a first signal containing information for authorizing or disallowing the transaction, wherein the first signal is generated by the central processing device;

generating a second signal containing information regarding the transaction, wherein the second signal is generated by the central processing device; and transmitting the signal to a communication device associated with the individual account holder.

188. A transaction security method, comprising:

receiving a limitation or restriction on a use of an account, wherein the account is at least one of a credit card account, a charge card account, a debit card account, a currency card account, a "smart" card account, a checking account, a savings account, and an automated teller machine account, wherein the limitation or restriction is transmitted to a receiver from a communication device associated with an individual account holder, and wherein the limitation or restriction is automatically received by the receiver;

storing the limitation or restriction in a memory device, wherein the limitation or restriction is automatically stored in the memory device;

processing an authorization request for a transaction on the account, wherein the authorization request is processed by a central processing device, wherein the central processing device utilizes the limitation or restriction automatically stored in the memory device in processing the authorization request;

generating a first signal containing information for authorizing or disallowing the transaction, wherein the first signal is generated by the central processing device;

generating a second signal containing information regarding the transaction, wherein the second signal is generated by the central processing device; and transmitting the second signal to a communication device associated with the individual account holder, wherein the second signal is transmitted to the communication device in real-time.

189. A transaction security method, comprising:

receiving a limitation or restriction regarding a banking transaction, wherein the limitation or restriction prohibits a withdrawal from at least one of a checking account, a savings account, and an automated teller machine account, or prohibits use of at least one of a checking account, a savings account, and an automated teller machine account, wherein the limitation or restriction is transmitted to a receiver from a communication device associated with an individual account holder, and wherein the limitation or restriction is automatically received by the receiver;

storing the limitation or restriction in a memory device, wherein the limitation or restriction is automatically stored in the memory device;

processing information regarding a banking transaction, wherein the information is processed by a central processing device, and further wherein the limitation or restriction automatically stored in the memory device is utilized in processing the banking transaction; and generating a signal containing information for allowing or disallowing the banking transaction, wherein the signal is generated by the central processing device.

190. A transaction security method, comprising:

receiving a limitation or restriction regarding a banking transaction, wherein the banking transaction involves a withdrawal from at least one of a checking account, a savings account, and an automated teller machine account, or a cashing of a check on a checking account, wherein the limitation or restriction contains information for prohibiting the withdrawal from the at least one of a checking account, a savings account, and an automated teller machine account, or for prohibiting the cashing of a check on a checking account, and further wherein the limitation or restriction is transmitted to a receiver from a communication device associated with an individual account holder, wherein the limitation or restriction is automatically received by the receiver;

storing the limitation or restriction in a memory device, wherein the limitation or restriction is automatically stored in the memory device;

processing information regarding a banking transaction, wherein the information is processed by a central processing device, and further wherein the limitation or restriction automatically stored in the memory device is utilized in processing the banking transaction; and generating a signal containing information for allowing or disallowing the banking transaction, wherein the signal is generated by the central processing device.

191. A transaction security method, comprising:

receiving a limitation regarding a use of a communication device on a wireless communication device account or a cellular communication device account, wherein the limitation contains information regarding at least one of phone numbers which may be called, numbers from which an incoming call may be accepted or received, at least one of times of day, specific days, dates, and times of month or year, during which a communication device may be utilized, authorized times of usage of a communication device on the account, amount of transaction, parties involved, and times of allowed usage, wherein the limitation is transmitted to a receiver from a communication device associated with an individual account holder, and further wherein the limitation is automatically received by the receiver;

storing the limitation in a memory device, wherein the limitation is automatically stored in the memory device;

processing information regarding a use of a communication device on the wireless communication device account or the cellular communication device account or an attempt to use a communication device on the wireless communication device account or the cellular communication device account, and further wherein the information is processed by a central processing device, wherein the limitation automatically stored in the memory device is utilized in processing the information; and generating a signal containing information for allowing or disallowing the use of the communication device, wherein the signal is generated by the central processing device.

192. A transaction security apparatus, comprising:

a processing device for processing information regarding a banking transaction, wherein the banking transaction involves at least one of a checking account, a savings account, and an automated teller machine account, and wherein the information is input via an input device or automatically received by a receiver, wherein the processing device generates a first signal containing information for allowing or disallowing the banking transaction, and further wherein the processing device generated a second signal containing information regarding the banking transaction; and a transmitter for transmitting the second signal to a communication device associated with an individual account holder, wherein the second signal is transmitted to the communication device in real-time, and further wherein the communication device provides information to the individual account holder regarding the banking transaction, and wherein the communication device is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

193. A transaction security method, comprising:

at least one of inputting information regarding a banking transaction via an input device and receiving information regarding a banking transaction with a receiver, wherein the banking transaction involves at least one of a checking account, a savings account, and an automated teller machine account;

processing the information regarding the banking transaction, wherein the information is processed with a processing device;

generating a first signal containing information for allowing or disallowing the banking transaction, wherein the first signal is generated by the processing device;

generating a second signal containing information regarding the banking transaction, wherein the second signal is generated by the processing device; and transmitting the second signal to a communication device associated with an individual account holder, wherein the second signal is transmitted to the communication device in real-time, and further wherein the communication device provides information to the individual account holder regarding the banking transaction, and wherein the communication device is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

194. A transaction security apparatus, comprising:

a memory device for storing a limitation regarding a use of a communication device on a wireless communication device account or a cellular communication device account, wherein the limitation contains information regarding at least one of phone numbers which may be called, numbers from which an incoming call may be accepted or received, at least one of times of day, specific days, dates, and times of month or year, during which a communication device may be utilized, authorized times of usage of a communication device on the account, amount of transaction, parties involved, and times of allowed usage, wherein the limitation is automatically received by a receiver, and further wherein the limitation is transmitted to the receiver from a communication device associated with an individual account holder, and further wherein the limitation is automatically stored in the memory device;

a central processing device for processing information regarding a use of a communication device on a wireless communication device account or a cellular communication device account or an attempt to use a communication device on a wireless communication device account or a cellular communication device account, wherein the central processing device determines whether the limitation automatically stored in the memory device is met, and further wherein the central processing device generates a first signal containing information for allowing or disallowing the use of the communication device, and further wherein the central processing device generates a second signal containing information regarding the use of the communication device or the attempt to use the communication device; and a transmitter for transmitting the second signal to a second communication device, wherein the second communication device is associated with an individual account holder, wherein the second signal is transmitted to the second communication device in real-time, and further wherein the second communication device provides information to the individual account holder regarding the use of the communication device or the attempt to use the communication device, and further wherein the second communication device is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

195. A transaction security method, comprising:

storing a limitation regarding a use of a communication device on a wireless communication device account or a cellular communication device account in a memory device, wherein the limitation contains information regarding at least one of phone numbers which may be called, numbers from which an incoming call may be accepted or received, at least one of times of day, specific days, dates, and times of month or year, during which a communication device may be utilized, authorized times of usage of a communication device on the account, amount of transaction, parties involved, and times of allowed usage, wherein the limitation is automatically received by a receiver, wherein the limitation is transmitted to the receiver from a communication device associated with an individual account holder, and further wherein the limitation is automatically stored in the memory device;

processing information regarding a use of a communication device on a wireless communication device account or a cellular communication device account or an attempt to use a communication device on a wireless communication device account or a cellular communication device account, wherein the information is processed by a central processing device;

determining whether the limitation automatically stored in the memory device is met, wherein the central processing device determines whether the limitation is met;

generating a first signal containing information for allowing or disallowing the use of the communication device, wherein the first signal is generated by the central processing device;

generating a second signal containing information regarding the use of the communication device or the attempt to use the communication device, wherein the second signal is generated by the central processing device; and transmitting the second signal to a second communication device, wherein the second communication device is associated with an individual account holder, wherein the second signal is transmitted to the second communication device in real-time, and wherein the second communication device in real-time, and wherein the second communication device provides information to the individual account holder regarding the use of the communication device or the attempt to use the communication device, and further wherein the second communication device is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

196. A transaction security apparatus, comprising:

at least one of an input device and a data entry device for at least one of inputting and entering transaction information regarding a transaction into the apparatus;

a processing device for processing the transaction information and for generating a signal corresponding to the transaction; and a transmitter for transmitting the signal from the apparatus to a communication device independently of any processing of the transaction by a central transaction processing computer, wherein the communication device is associated with an individual account holder, and wherein the communication device provides information to the individual account holder regarding the transaction, and further wherein the communication device is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

197. The apparatus of claim 196, further comprising:

a receiver for receiving a second signal from the communication device, wherein the second signal contains information for at least one of authorizing, allowing, and disallowing, the transaction.

198. The apparatus of claim 197, wherein the processing device processes the second signal and determines whether the transaction is at least one of authorized, allowed, and disallowed.

199. The apparatus of claim 196, wherein the transmitter transmits the signal to a central processing computer.

200. The apparatus of claim 196, further comprising:

a receiver for receiving a second signal, wherein the second signal is transmitted from at least one of the communication device and a central processing computer, wherein the second signal contains information for at least one of authorizing, allowing, and disallowing, the transaction.

201. The apparatus of claim 196, wherein the apparatus is at least one of a point-of-sale authorization device, a point-of-sale authorization terminal, and a transaction authorization device.

202. The apparatus of claim 196, wherein the apparatus is at least one of a credit card authorization device, a charge card authorization device, and a debit card authorization device.

203. The apparatus of claim 196, wherein the apparatus is at least one of a currency card authorization device and a "smart" card authorization device.

204. The apparatus of claim 196, wherein the transaction is at least one of a point-of-sale transaction, a telephone order, a mail order, an Internet transaction, and an on-line transaction.

205. The apparatus of claim 196, wherein the signal contains information regarding a card utilized in the transaction and an amount of the transaction.

206. The apparatus of claim 196, wherein the apparatus is a component of a cash register.

207. The apparatus of claim 196, further comprising:
a display device for displaying information regarding the transaction.

208. The apparatus of claim 196, further comprising:
a printer for outputting information regarding the transaction.

209. The apparatus of claim 196, wherein the transaction involves a use of at least one of a credit card, a charge card, a debit card, a currency card, and a "smart" card.

210. The apparatus of claim 196, wherein the transaction is at least one of a checking account transaction, a savings account transaction, and an automated teller machine account transaction.

211. The apparatus of claim 196, wherein the transaction is at least one of a clearing transaction, a check clearing transaction, an account charging transaction, and a charge-back transaction.

212. The apparatus of claim 196, wherein the apparatus is at least one of a banking transaction device, a banking transaction terminal, a teller terminal, a teller work station, a processing computer terminal, an automated teller machine terminal, a cashier work station, and an over-the-counter transaction device.

213. The apparatus of claim 196, further comprising:
at least one of a reading device and a scanning device for at least one of reading and scanning information regarding the transaction.

214. The apparatus of claim 196, wherein the apparatus is at least one of a wireless communication device and a cellular communication device.

215. The apparatus of claim 196, wherein the apparatus is utilized on or over at least one of a telecommunication system, a satellite communication system, a radio communication system, a digital communication system, a personal communications services system, the Internet, and the World Wide Web.

216. The apparatus of claim 196, wherein the transmitter transmits the signal to a plurality of communication devices associated with the individual account holder at least one of simultaneously and sequentially.

217. The apparatus of claim 196, wherein information contained in the signal is transmitted to the communication device in at least one of a communication transmission, a telephone call, a voice message, a voice mail message, a beeper message, a pager message, a facsimile message, and an answering service message.

218. The apparatus of claim 196, wherein the transaction is a check cashing transaction.

219. The apparatus of claim 196, wherein the transaction is a savings account withdrawal transaction.

220. The apparatus of claim 196, wherein the transaction is an automated teller machine account withdrawal transaction.

221. The apparatus of claim 196, wherein the transmitter transmits an electronic mail message to a network computer associated with the individual account holder, wherein the electronic mail message contains information regarding the transaction.

222. The apparatus of claim 196, further comprising;
a receiver for receiving a second signal, wherein the second signal is transmitted from at least one of the communication device and a central processing computer, wherein the second signal contains information for at least one of authorizing, allowing, and disallowing, the transaction, wherein the processing device processes the second signal, and further wherein the processing device determines whether the transaction is at least one of authorized, allowed, and disallowed.

223. The apparatus of claim 196, wherein the processing device processes the second signal and determines whether the transaction is at least one of authorized, allowed, and disallowed, and further wherein the processing device at least one of authorizes the transaction, disallows the transaction, and cancels the transaction.

224. The apparatus of claim 196, wherein the transmitter transmits the signal to at least one of the communication device, a computer, a radio, a car radio, and a television, and further wherein the normal operation of the at least one of the communication device, a computer, a radio, a car radio, and a television, is interrupted to convey the information to the individual account holder.

225. The apparatus of claim 196, wherein the first signal contains information regarding at least one of information identifying the transaction, a name of a store or service provider, an amount of the transaction, a time of the transaction, a location of the transaction, and a good or service involved in the transaction.

226. The apparatus of claim 196, wherein the signal contains information regarding at least one of information identifying the transaction, a name of a bank or financial institution where the transaction is taking place, an amount of the transaction, an account number or description, a description of a person seeking to make the transaction, a type of transaction, a time of the transaction, and a location of the transaction.

227. The apparatus of claim 196, wherein the processing device processes transaction information for at least one of any number of accounts and any number of types of accounts.

228. The apparatus of claim 196, wherein the signal contains information regarding at least one of a number called, a time of a call, and a duration of a call.

229. The apparatus of claim 196, wherein the apparatus suspends use of a card associated with the account.

230. The apparatus of claim 196, wherein the apparatus notifies the individual account holder of the transaction.

231. The apparatus of claim 196, wherein the apparatus is programmed for at least one of automatic activation, self-activation, automatic operation, and self-operation.

232. A transaction security method, comprising:
at least one of inputting and entering transaction information regarding a transaction on an account into a transaction device;
processing the transaction information;
generating a signal corresponding to the transaction; and
transmitting the signal from the transaction device to a communication device independently of any processing of the transaction by a central transaction processing computer, wherein the communication device is associated with an individual account holder, and wherein the communication device provides information to the individual account holder regarding the transaction, and further wherein the communication device is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

233. The method of claim 232, further comprising:

receiving a second signal, wherein the second signal is transmitted from at least one of the communication device and a central processing computer, wherein the second signal contains information for at least one of authorizing, allowing, and disallowing, the transaction, processing the second signal; and determining whether the transaction is at least one of authorized, allowed, and disallowed.

234. A transaction security apparatus, comprising:

a receiver for receiving a first signal, wherein the first signal is transmitted from a transaction device to the receiver independently of any processing of the transaction by a central transaction processing computer, wherein the apparatus is associated with an individual account holder, and further wherein the first signal contains information regarding a transaction occurring on an account, wherein the apparatus is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine; and a processing device for processing the first signal and for generating a second signal, wherein the second signal provides information regarding the transaction to the individual account holder.

235. The apparatus of claim 234, further comprising:

a transmitter for transmitting a third signal to the transaction device, wherein the third signal contains information for at least one of authorizing, allowing, and disallowing, the transaction.

236. The apparatus of claim 234, further comprising:

a transmitter for transmitting a third signal to at least one of the transaction device and a central processing computer, wherein the third signal contains information for at least one of authorizing, allowing, and disallowing, the transaction.

237. The apparatus of claim 234, wherein the receiver receives a transaction notification signal from a central processing computer, wherein the transaction notification signal provides information regarding the transaction.

238. The apparatus of claim 234, wherein the apparatus is utilized on or over at least one of a telecommunication system, a satellite communication system, a radio communication system, a digital communication system, a personal communications services system, the Internet, and the World Wide Web.

239. The apparatus of claim 234, wherein information contained in the first signal is transmitted to the apparatus in at least one of a communication transmission, a telephone call, a voice message, a voice mail message, a beeper message, a pager message, a facsimile message, and an answering service message.

240. The apparatus of claim 234, further comprising:

an input device for inputting information into the apparatus.

241. The apparatus of claim 234, further comprising:

a display device for displaying information contained in the second signal.

242. The apparatus of claim 234, wherein the apparatus generates a signal containing information for suspending use of a card associated with the account.

243. The apparatus of claim 234, wherein the apparatus is programmed to automatically transmit a third signal in response to the first signal, wherein the third signal contains information for at least one of authorizing, allowing, and disallowing, the transaction.

244. The apparatus of claim 234, wherein the apparatus is programmed to respond to the first signal with at least one of a programmed response and a pre-set response.

245. The apparatus of claim 234, wherein the apparatus is programmed to at least one of allow and disallow a use of a communication device on a wireless communication device account or a cellular communication device account according to at least one of time of day, calling area, number called, call duration, and transaction duration.

246. The apparatus of claim 234, wherein the apparatus is programmed to at least one of analyze information contained in the first signal and limit the amounts of transactions.

247. The apparatus of claim 234, further comprising:

a memory device for storing information regarding any number of transactions for any number of accounts or for any types of accounts.

248. The apparatus of claim 247, wherein the apparatus provides the information stored in the memory device to the individual account holder.

249. The apparatus of claim 234, wherein at least one of the first signal and the second signal contain information regarding at least one of information identifying the transaction, a name of a store or service provider, an amount of the transaction, a time of the transaction, a location of the transaction, and information regarding a good or service involved in the transaction.

250. The apparatus of claim 234, further comprising:

a display device for displaying information contained in the second signal, wherein the second signal contains information regarding at least one of a name of a store and a service provider, an amount of the transaction, a time of the transaction, a location of the transaction, and information regarding a good or service involved in the transaction.

251. The apparatus of claim 234, wherein the transaction device is at least one of a credit card authorization device, a charge card authorization device, and a debit card authorization device.

252. The apparatus of claim 234, wherein the transaction device is at least one of a currency card authorization device and a "smart" card authorization device.

253. The apparatus of claim 234, wherein the transaction device is at least one of a banking transaction device, a banking transaction terminal, a teller terminal, a teller work station, a processing computer terminal, an automated teller machine terminal, a cashier work station, and an over-the-counter transaction device.

254. The apparatus of claim 234, wherein the transaction device is at least one of a wireless communication device and a cellular communication device.

255. The apparatus of claim 234, wherein at least one of the first signal and the second signal contain information regarding at least one of information identifying the transaction, a name of a bank or financial institution where the transaction is taking place, an amount of the transaction, an account number or description, a description of a person seeking to make the transaction, a type of transaction, a time of the transaction, and a location of the transaction.

256. The apparatus of claim 234, further comprising:

a display device for displaying information contained in the second signal, wherein the second signal contains information regarding at least one of a name of a bank or financial institution, an amount of the transaction, a time of the transaction, and a location of the transaction.

257. The apparatus of claim 234, wherein at least one of the first signal and the second signal contain information regarding at least one of a number called, a time of a call, and a duration of a call.

258. The apparatus of claim 234, wherein the apparatus is programmed for automatically transmitting a third signal in response to the first signal, wherein the third signal contains information for allowing or disallowing a use of a wireless communication device or a cellular communication device.

259. The apparatus of claim 234, wherein the apparatus is programmed to allow or disallow at least one of a cellular telephone call, a wireless telephone call, and a transaction, according to at least one of a time of day, a calling area, a number called, a call duration, and a transaction duration.

260. The apparatus of claim 234, wherein the apparatus is programmed to limit the number of telephone calls made from a wireless communication is device or a cellular communication device.

261. The apparatus of claim 234, further comprising:

a memory device for storing information regarding any number of telephone calls or transactions made on a wireless communication account or a cellular communication account.

262. The apparatus of claim 234, wherein the processing device processes information for at least one of any number of accounts and any number of types of accounts.

263. The apparatus of claim 234, wherein the apparatus notifies the individual account holder of at least one of the transaction, a use of the account, a use of a card associated with the account, and a use of a wireless communication device or a cellular communication device in a call or transaction.

264. The apparatus of claim 234, wherein the apparatus is programmed for at least one of automatic activation, self-activation, automatic operation, and self-operation.

265. A transaction security method, comprising:

receiving a first signal from a transaction device, wherein the first signal, is received at a communication device, wherein the first signal is transmitted from the transaction device to the communication device independently of any processing of the transaction by a central transaction processing computer, wherein the communication device is associated with an individual account holder, and wherein the first signal contains information regarding a transaction occurring on an account, and further wherein the communication device is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine;

processing the first signal;

generating a second signal; and providing or displaying at least a portion of the information contained in the second signal, wherein the at least a portion of the information contained in the second signal provides information regarding the transaction to the individual account holder.

266. A transaction security apparatus, comprising:

at least one of an input device and a data entry device for at least one of inputting and entering transaction information regarding a transaction into the apparatus;

a processing device for processing the transaction information and for generating a first signal corresponding to the transaction; and a transmitter for transmitting the first signal from the apparatus to a communication device independently of any processing of the transaction by a central transaction processing computer, wherein the communication device is associated with an individual account holder, and wherein the communication device provides information to the individual account holder regarding the transaction, and further wherein the communication device is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine; and a receiver for receiving a second signal from the communication device, wherein the second signal contains information for at least one of authorizing, allowing, and disallowing, the transaction.

267. A transaction security apparatus, comprising:

a processing device for processing information regarding a banking transaction, wherein the banking transaction involves at least one of a checking account, a savings account, and an automated teller machine account, and wherein the information is input via an input device or automatically received by a receiver, wherein the processing device is capable of allowing or disallowing the banking transaction, and further wherein the processing device generates a signal containing information regarding the banking transaction; and a transmitter for transmitting the signal to a communication device associated with an individual account holder, wherein the signal is transmitted to the communication device in real-time, and further wherein the communication device provides information to the individual account holder regarding the banking transaction, and wherein the communication device is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

268. The apparatus of claim 267, further comprising:

a receiver for receiving a second signal from the communication device, wherein the second signal contains information for allowing or disallowing the banking transaction.

269. The apparatus of claim 268, wherein the processing device processes the second signal and determines whether the banking transaction is allowed or disallowed.

270. The apparatus of claim 268, wherein the processing device processes the second signal and determines whether the banking transaction is allowed or disallowed, and further wherein the processing device generates a third signal containing information for at least one of allowing the banking transaction, disallowing the banking transaction, and canceling the banking transaction.

271. The apparatus of claim 270, wherein the processing device generates a fourth signal for confiscating an automated teller machine account card associated with the at least one of a checking account, a savings account, and an automated teller machine account.

272. The apparatus of claim 267, wherein the processing device counts a number of unauthorized transactions occurring on the at least one of a checking account, a savings account, and an automated teller machine account.

273. The apparatus of claim 272, wherein the processing device at least one of cancels a transaction and de-activates the at least one of a checking account, a savings account, and an automated teller machine account, when a pre-determined unauthorized transaction count is reached.

274. The apparatus of claim 267, wherein the processing device determines whether a hold is placed on the at least one of a checking account, a savings account, and an automated teller machine account, for prohibiting a withdrawal from the at least one of a checking account, a savings account, and an automated teller machine account.

275. The apparatus of claim 267, wherein the apparatus is at least one of a debit card authorization device, a currency card authorization device, and a "smart" card authorization device.

276. The apparatus of claim 267, further comprising:
a display device for displaying information regarding the banking transaction.

277. The apparatus of claim 267, further comprising:
a printer for outputting information regarding the banking transaction.

278. The apparatus of claim 267, wherein the banking transaction is at least one of a clearing transaction, a check clearing transaction, an account charging transaction, and a charge-back transaction.

279. The apparatus of claim 267, wherein the apparatus is a central processing computer for processing a transaction occurring on at least one of a checking account, checking accounts, a savings account, savings accounts, an automated teller machine account, and automated teller machine accounts.

280. The apparatus of claim 267, wherein the apparatus processes information regarding at least one of a deposit, a withdrawal, a check cashed, a draft, an ATM deposit, an ATM withdrawal, a charge made against at the least one of a checking account, a savings account, and an automated teller machine account, and a credit made to the at least one of a checking account, a savings account, and an automated teller machine account.

281. The apparatus of claim 267, wherein the apparatus is utilized on or over at least one of a telecommunication system, a satellite communication system, a radio communication system, a digital communication system, a personal communications services system, the Internet, and the World Wide Web.

282. The apparatus of claim 267, wherein the transmitter transmits the signal to a plurality of communication devices associated with the individual account holder at least one of simultaneously and sequentially.

283. The apparatus of claim 267, wherein information contained in the signal is transmitted to the communication device in at least one of a communication transmission, a telephone call, a voice message, a voice mail message, a beeper message, a pager message, a facsimile message, and an answering service message.

284. The apparatus of claim 267, wherein the banking transaction is a check cashing transaction.

285. The apparatus of claim 267, wherein the banking transaction is a savings account withdrawal transaction.

286. The apparatus of claim 267, wherein the banking transaction is an automated teller machine account withdrawal transaction.

287. The apparatus of claim 267, wherein the transmitter transmits an electromagnetic mail message to a network computer associated with the individual account holder, wherein the electronic mail message contains information regarding the banking transaction.

288. The apparatus of claim 267, wherein the processing device suspends use of the at least one of a checking account, a savings account, and an automated teller machine account, or suspends use of a card associated with the at least one of a checking account, a savings account, and an automated teller machine account account.

289. The apparatus of claim 267, wherein the transmitter transmits the signal to at least one of the communication device, a computer, a radio, a car radio, and a television, and further wherein the normal operation of the at least one of the communication device, a computer, a radio, a car radio, and a television, is interrupted to convey the information to the individual account holder.

290. The apparatus of claim 267, wherein the apparatus comprises a plurality of computers or computer systems.

291. The apparatus of claim 267, wherein the processing device processes banking transactions for at least one of a plurality of accounts and a plurality of types of accounts.

292. The apparatus of claim 267, wherein the processing device is at least one of a mainframe computer, a mini-computer, a micro-computer, and a server computer.

293. The apparatus of claim 267, wherein the processing device generates a periodic transaction record showing transactions on the account for a pre-determined time period, wherein the periodic transaction record is generated at least one of automatically and in response to a request for the periodic transaction record, and further wherein the transmitter transmits the periodic transaction record to the communication device.

294. The apparatus of claim 267, wherein the apparatus notifies the individual account holder of the banking transaction.

295. The apparatus of claim 267, wherein the apparatus notifies the individual account holder of a check being presented for payment.

296. The apparatus of claim 267, wherein the banking transaction is an account settling transaction.

297. The apparatus of claim 267, wherein the apparatus is programmed for at least one of automatic activation, self-activation, automatic operation, and self-operation.

298. The apparatus of claim 267, wherein the apparatus notifies the individual account holder that the at least one to a checking account, a savings account, and an automated teller machine account, is overdrawn.

299. The apparatus of claim 267, wherein the apparatus notifies the individual account holder that the at least one to a checking account, a savings account, and an automated teller machine account, has been charged against.

300. The apparatus of claim 267, wherein the apparatus notifies the individual account holder that the at least one to a checking account, a savings account, and an automated teller machine account, is being accessed in the banking transaction.

301. A transaction security method, comprising:

at least one of inputting information regarding a banking transaction via an input device and receiving information regarding a banking transaction with a receiver, wherein the banking transaction involves at least one of a checking account, a savings account, and an automated teller machine account;

processing the information regarding the banking transaction, wherein the information is processed with a processing device, wherein the processing device is capable of allowing or disallowing the banking transaction;

generating a signal containing information regarding the banking transaction, wherein the signal is generated by the processing device; and transmitting the signal to a communication device associated with an individual account holder, wherein the signal is transmitted to the communication device in real-time, and further wherein the communication device provides information to the individual account holder regarding the banking transaction, and wherein the communication device is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

302. A transaction security apparatus, comprising:

a memory device for storing a limitation regarding a use of a communication device on a wireless communication device account or a cellular communication device account, wherein the limitation contains information regarding at least one of a phone number which may be called, a number from which an incoming call may be accepted or received, at least one of a time of day, a specific day, a date, and a time of a month or year, during which a communication device may be utilized, an authorized time of usage of a communication device on the account, an amount of a transaction, a party involved, and a time of an allowed usage, wherein the limitation is automatically received by a receiver, and further wherein the limitation is transmitted to the receiver from a communication device associated with an individual account holder, and further wherein the limitation is automatically stored in the memory device;

a processing device for processing information regarding a use of a communication device on a wireless communication device account or a cellular communication device account or an attempt to use a communication device on a wireless communication device account or a cellular communication device account, wherein the processing device is capable of allowing or disallowing the use of the communication device, wherein the processing device determines whether the limitation automatically stored in the memory device is met, and further wherein the processing device generates a signal containing information regarding the use of the communication device or the attempt to use the communication device; and a transmitter for transmitting the signal to a second communication device, wherein the second communication device is associated with an individual account holder, wherein the signal is transmitted to the second communication device in real-time, and further wherein the second communication device provides information to the individual account holder regarding the use of the communication device or the attempt to use the communication device, and further wherein the second communication device is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

303. The apparatus of claim 302, further comprising:

a receiver for receiving a second signal from the communication device, wherein the second signal contains information for allowing or disallowing the use of the communication device.

304. The apparatus of claim 302, wherein the apparatus is a central processing computer for at least one of processing information and maintaining records for wireless communication accounts or cellular communication accounts, wherein the information includes at least one of account usage information and account billing information.

305. The apparatus of claim 302, further comprising:

a display device for displaying information regarding the use of the communication device or the attempt to use the communication device.

306. The apparatus of claim 302, further comprising:

a printer for outputting information regarding the use of the communication device or the attempt to use the communication device.

307. The apparatus of claim 302, wherein the apparatus is utilized on or over at least one of a telecommunication system, a satellite communication system, a radio communication system, a digital communication system, a personal communications services system, the Internet, and the World Wide Web.

308. The apparatus of claim 302, wherein the transmitter transmits the signal to a plurality of second communication devices at least one of simultaneously and sequentially.

309. The apparatus of claim 302, wherein information contained in the signal is transmitted to the second communication device in at least one of a communication transmission, a telephone call, a voice message, a voice mail message, a beeper message, a pager message, a facsimile message, and an answering service message.

310. The apparatus of claim 302, wherein the transmitter transmits an electronic mail message to a network computer associated with the individual account holder, wherein the electronic mail message contains information regarding the use of the communication device.

311. The apparatus of claim 302, wherein the processing device processes the second signal and determines whether the use of the communication device is allowed or disallowed.

312. The apparatus of claim 302, wherein the processing device processes the second signal and determines whether the use of the communication device is allowed or disallowed, and further wherein the processing device at least one of allows the use of the communication device, disallows the use of the communication device, and terminates the use of the communication device.

313. The apparatus of claim 302, wherein the transmitter transmits the signal to at least one of the second communication device, a computer, a radio, a car radio, and a television, and further wherein the normal operation of the at least one of the second communication device, a computer, a radio, a car radio, and a television, is interrupted to convey the information to the individual account holder.

314. The apparatus of claim 302, wherein the apparatus comprises a plurality of computers or computer systems.

315. The apparatus of claim 302, wherein the processing device at least one of de-activates and cancels the wireless communication device account or the cellular communication device account.

316. The apparatus of claim 302, wherein the processing device processes information for any number of wireless communication device accounts or cellular communication device accounts.

317. The apparatus of claim 302, wherein the processing device is at least one of a mainframe computer, a mini-computer, a micro-computer, and a server computer.

318. The apparatus of claim 302, wherein the processing device generates a periodic transaction record showing a use of the communication device during a pre-determined period of time, wherein the periodic transaction record is generated at least one of automatically and in response to a request for the periodic transaction record, and further wherein the transmitter transmits the periodic transaction record to the second communication device.

319. The apparatus of claim 302, wherein the signal contains information regarding a number called, a time of a call, and a duration of a call.

320. The apparatus of claim 302, wherein the apparatus notifies the individual account holder of the use of the communication device or the attempt to use the communication device.

321. The apparatus of claim 302, wherein the apparatus is programmed for at least one of automatic activation, self-activation, automatic operation, and self-operation.

322. A transaction security method, comprising:

storing a limitation regarding a use of a communication device on a wireless communication device account or a cellular communication device account in a memory device, wherein the limitation contains information regarding at least one of a phone number which may be called, a number from which an incoming call may be accepted or received, at least one of a time of day, a specific day, a date, and a time of a month or year, during which a communication device may be utilized, an authorized time of usage of a communication device on the account, an amount of a transaction, a party involved, and a time of an allowed usage, wherein the limitation is automatically received by a receiver, wherein the limitation is transmitted to the receiver from a communication device associated with an individual account holder, and further wherein the limitation is automatically stored in the memory device;

processing information regarding a use of a communication device on a wireless communication device account or a cellular communication device account or an attempt to use a communication device or a wireless communication device account or a cellular communication device account, wherein the information is processed by a processing device, wherein the processing device is capable of allowing or disallowing the use of the communication device;

determining whether the limitation automatically stored in the memory device is met, wherein the processing device determines whether the limitation is met;

generating a signal containing information regarding the use of the communication device or the attempt to use the communication device, wherein the signal is generated by the processing device; and transmitting the signal to a second communication device, wherein the second communication device is associated with an individual account holder, wherein the signal is transmitted to the second communication device in real-time, and wherein the second communication device provides information to the individual account holder regarding the use of the communication device or the attempt to use the communication device, and further wherein the second communication device is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

323. A transaction security apparatus, comprising:

a memory device for storing a limitation regarding a use of a communication device on a wireless communication device account or a cellular communication device account, wherein the limitation contains information regarding at least one of a phone number which may be called, a number from which an incoming call may be accepted or received, at least one of a time of day, a specific day, a date, and a time of month or year, during which a communication device may be utilized, an authorized time of usage of a communication device on the account, an amount of transaction, a party involved, and a time of allowed usage, wherein the limitation is transmitted to a receiver from a communication device is associated with an individual account holder, wherein the limitation is automatically received by the receiver, and further wherein the limitation is automatically stored in the memory device;

a processing device for processing information regarding a use of a communication device on the wireless communication device account or the cellular communication device account or an attempt to use a communication device on the wireless communication device account or the cellular communication device account, wherein the processing device utilizes the limitation automatically stored in the memory device in processing the information regarding a use of a communication device on the wireless communication device account or the cellular communication device account or an attempt to use a communication device on the wireless communication device account or the cellular communication device account, and further wherein the processing device generates a signal containing information for allowing or disallowing the use of the communication device.

324. The apparatus of claim 323, further comprising:

a transmitter for transmitting a second signal to a second communication device associated with an individual account holder, wherein the second signal contains information regarding the use of the communication device or the attempt to use the communication device.

325. The apparatus of claim 324, further comprising:

a receiver for receiving a third signal from the second communication device, wherein the third signal contains information for allowing or disallowing the use of the communication device.

326. The apparatus of claim 325, wherein the processing device processes the third signal and determines whether the use of the communication device is allowed or disallowed.

327. The apparatus of claim 325, wherein the processing device processes the third signal and determines whether the use of the communication device is allowed or disallowed, and further wherein the processing device at least one of allows the use of the communication device, disallows the use of the communication device, and terminates the sue of the communication device.

328. The apparatus of claim 324, wherein the transmitter transmits the second signal to a plurality of second communication devices at least one of simultaneously and sequentially.

329. The apparatus of claim 324, wherein information contained in the second signal is transmitted to the second communication device in at least one of a communication transmission, a telephone call, a voice message, a voice mail message, a beeper message, a pager message, a facsimile message, and an answering service message.

330. The apparatus of claim 324, wherein the second communication device is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

331. The apparatus of claim 324, wherein the transmitter transmits the second signal to at least one of a second communication device, a computer, a radio, a car radio, and a television, and further wherein the normal operation of the at least one of a second communication device, a computer, a radio, a car radio, and a television, is interrupted to convey the information to the individual account holder.

332. The apparatus of claim 324, wherein the second signal contains information regarding a number called, a time of a call, and a duration of a call.

333. The apparatus of claim 323, wherein the apparatus is a central processing computer for at least one of processing information and maintaining records for wireless communication device accounts or cellular communication device accounts, wherein the information includes at least one of account usage information and account billing information.

334. The apparatus of claim 323, wherein the apparatus is utilized on or over at least one of a telecommunication system, a satellite communication system, a radio communication system, a digital communication system, a personal communication services system, the Internet, and the World Wide Web.

335. The apparatus of claim 323, further comprising:
a transmitter for transmitting an electronic mail message to a network computer associated with the individual account holder, wherein the electronic mail message contains information regarding the use of the communication device or the attempt to use the communication device.

336. The apparatus of claim 323, wherein the apparatus is programmed for at least one of automatic activation, self-activation, automatic operation, and self-operation.

337. The apparatus of claim 323, wherein the processing device utilizes a second limitation automatically received from the communication device from which the limitation is received and automatically stored in the memory device in processing information regarding the use of a communication device on the wireless communication device account or the cellular communication device account or the attempt to use a communication device on the wireless communication device account or the cellular communication device account, wherein the second limitation contains information regarding at least one of a geographical area which may be called or accessed, geographical areas which may be called or accessed, a location which may be called or accessed, locations which may be called or accessed, a geographical area or areas from which calls may be received, a location or locations from which calls may be received, a specific phone number or specific phone numbers which may be called, a specific time duration or specific time durations for a phone call, and an authorized time or authorized times for communication device usage.

338. The apparatus of claim 323, wherein the communication device from which the limitation is received is at least one of a telephone, a touch-tone telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

339. The apparatus of claim 323, wherein the apparatus comprises a plurality of computers or computer systems.

340. A transaction security apparatus, comprising:
a memory device for storing a limitation regarding a use of a communication device on a wireless communication device account or a cellular communication device account, wherein the limitation contains information regarding at least one of phone numbers which may be called, numbers from which an incoming call may be accepted or received, at least one of times a day, specific days, dates, and times of month or year, during which a communication device may be utilized, authorized times of usage of a communication device on the account, amount of transaction, parties involved, and times of allowed usage, wherein the limitation is automatically received by a receiver, and further wherein the limitation is transmitted to the receiver from a communication device associated with an individual account holder, and further wherein the limitation is automatically stored in the memory device;
a processing device for processing information regarding a use of a communication device on a wireless communication device account or a cellular communication device account or an attempt to use a communication device on a wireless communication device account or a cellular communication device account, wherein the processing device is capable of allowing or disallowing the use of the communication device, wherein the processing device determines whether the limitation automatically stored in the memory device is met, and further wherein the processing device generates a signal containing information regarding the use of the communication device or the attempt to use the communication device; and
a transmitter for transmitting the signal to a second communication device, wherein the second communication device is associated with an individual account holder, wherein the signal is transmitted to the second communication device in real-time, and further wherein the second communication device provides information to the individual account holder regarding the use of the communication device or the attempt to use the communication device, and further wherein the second communication device is at least one of a beeper, a pager, a telephone, a two-way pager, a reply pager, a home computer, a personal computer, a personal communication device, a personal communication services device, a television, an interactive television, a digital television, a personal digital assistant, a display telephone, a video telephone, a watch, a cellular telephone, a wireless telephone, a mobile telephone, a display cellular telephone, and a facsimile machine.

* * * * *

UNITED STATES PATENT AND TRADEMARK OFFICE
CERTIFICATE OF CORRECTION

PATENT NO. : 6,529,725 B1
DATED : March 4, 2003
INVENTOR(S) : Joao et al.

It is certified that error appears in the above-identified patent and that said Letters Patent is hereby corrected as shown below:

<u>Title page,</u>
Item [56], References Cited, add the following documents on the attached pages

UNITED STATES PATENT AND TRADEMARK OFFICE
CERTIFICATE OF CORRECTION

PATENT NO. : 6,529,725 B1
DATED : March 4, 2003
INVENTOR(S) : Joao et al.

It is certified that error appears in the above-identified patent and that said Letters Patent is hereby corrected as shown below:

U.S. PATENT DOCUMENTS

| | | |
|---|---|---|
| 3,852,571 A | 12/1974 | Hall et al. |
| 4,554,418 A | 11/1985 | Toy |
| 4,678,895 A | 7/1987 | Tateisi et al. |
| 4,706,275 A | 11/1987 | Kamil |
| 4,777,647 A | 10/1988 | Smith et al. |
| 4,831,647 A | 5/1989 | D'Avello et al. |
| 4,860,336 A | 8/1989 | D'Avello et al. |
| 4,877,950 A | 10/1989 | Halpern |
| 4,977,595 A | 12/1990 | Ohta et al. |
| 4,992,646 A | 2/1991 | Collin |
| 5,030,806 A | 7/1991 | Collin |
| 5,053,607 A | 10/1991 | Carlson et al. |
| 5,068,891 A | 11/1991 | Marshall |
| 5,144,649 A | 9/1992 | Zicker et al. |
| 5,220,501 A | 6/1993 | Lawlor et al. |
| 5,221,838 A | 6/1993 | Gutman et al. |
| 5,224,162 A | 6/1993 | Okamoto et al. |
| 5,255,182 A | 10/1993 | Adams |
| 5,265,033 A | 11/1993 | Vajk et al. |
| 5,359,642 A | 10/1994 | Castro |
| 5,438,184 A | 8/1995 | Roberts et al. |
| 5,440,621 A | 8/1995 | Castro |
| 5,450,477 A | 9/1995 | Amarant et al. |
| 5,453,601 A | 9/1995 | Rosen |
| 5,455,407 A | 10/1995 | Rosen |
| 5,473,143 A | 12/1995 | Vak et al. |
| 5,504,808 A | 4/1996 | Hamrick, Jr. |
| 5,511,114 A | 4/1996 | Stimson et al. |
| 5,511,121 A | 4/1996 | Yacobi |
| 5,521,362 A | 5/1996 | Powers |
| 5,534,683 A | 7/1996 | Rankl et al. |
| 5,546,446 A | 8/1996 | Tsunokawa et al. |
| 5,557,518 A | 9/1996 | Rosen |
| 5,559,871 A | 9/1996 | Smith |
| 5,563,934 A | 10/1996 | Eda |
| 5,606,361 A | 2/1997 | Davidsohn et al. |
| 5,621,201 A | 4/1997 | Langhans et al. |
| 5,621,787 A | 4/1997 | McKoy et al. |
| 5,621,797 A | 4/1997 | Rosen |
| 5,623,547 A | 4/1997 | Jones et al. |
| 5,638,430 A | 6/1997 | Hogan et al. |
| 5,640,447 A | 6/1997 | Fonseca |
| 5,642,419 A | 6/1997 | Rosen |
| 5,719,926 A | 2/1998 | Hill |
| 5,724,092 A | 3/1998 | Davidsohn et al. |
| 5,777,306 A | 7/1998 | Masuda |

UNITED STATES PATENT AND TRADEMARK OFFICE
CERTIFICATE OF CORRECTION

PATENT NO.   : 6,529,725 B1
DATED        : March 4, 2003
INVENTOR(S)  : Joao et al.

It is certified that error appears in the above-identified patent and that said Letters Patent is hereby corrected as shown below:

| | | | |
|---|---|---|---|
| 5,825,863 | A | 10/1998 | Walker |
| 5,839,063 | A | 11/1998 | Lee |
| 5,870,724 | A | 2/1999 | Lawlor et al. |
| 5,878,337 | A | 3/1999 | Joao et al. |
| 5,903,633 | A | 5/1999 | Lorsch |
| 5,903,830 | A | 5/1999 | Joao et al. |
| 5,988,497 | A | 11/1999 | Wallace |
| 6,047,270 | A | 4/2000 | Joao et al. |
| 6,192,113 | B1 | 2/2001 | Lorsch |
| 6,202,054 | B1 | 3/2001 | Lawlor et al. |

UNITED STATES PATENT AND TRADEMARK OFFICE
CERTIFICATE OF CORRECTION

PATENT NO. : 6,529,725 B1
DATED : March 4, 2003
INVENTOR(S) : Joao et al.

Page 4 of 5

It is certified that error appears in the above-identified patent and that said Letters Patent is hereby corrected as shown below:

| | |
|---|---|
| Kf | BRUCE SCHNEIER, APPLIED CRYPTOGRAPHY, 1996, Second Edition, WILEY, U.S.A. |
| Kf | RAYMOND B. PANKO, BUSINESS DATA COMMUNICATIONS, 1997, PRENTICE HALL, U.S.A. |
| Kf | SIMSON GARFINKEL, ET AL., WEB SECURITY & COMMERCE, 1997, O'REILLY & ASSOCIATES, INC.,U.S.A. |
| Kf | LESLIE L. LESNICK, ET AL., CREATING COOL INTELLIGENT AGENTS FOR THE NET, 1997, IDG BOOKS WORLDWIDE, INC., U.S.A. |
| Kf | NABIL R. ADAM, ET AL., ELECTRONIC COMMERCE TECHNICAL, BUSINESS, AND LEGAL ISSUES, 1999, PRENTICE HALL PTR, U.S.A. |
| Kf | ALPER CAGLAYAN, ET AL., AGENT SOURCEBOOK A COMPLETE GUIDE TO DESKTOP, INTERNET, AND INTRANET AGENTS, 1997, WILEY, U.S.A. |

Item [57], ABSTRACT, delete the ABSTRACT and substitute the following:

Apparatus and method including a memory device for storing a limitation or restriction on use of an account and a processing device for determining whether a transaction on the account or a use of a wireless communication device is authorized, allowed, or disallowed. Apparatus and method including a processing device for processing information regarding a banking transaction or use of a wireless communication device and generating a signal containing information regarding the transaction or the use of the device and a transmitter for transmitting the signal to a communication device. Apparatus and method

UNITED STATES PATENT AND TRADEMARK OFFICE
CERTIFICATE OF CORRECTION

PATENT NO. : 6,529,725 B1
DATED : March 4, 2003
INVENTOR(S) : Joao et al.

It is certified that error appears in the above-identified patent and that said Letters Patent is hereby corrected as shown below:

```
including a processing device, for processing transaction information and generating a signal containing transaction information, and a transmitter for transmitting the signal to a communication device independently of any transaction processing by a central transaction processing computer.

Apparatus and method for receiving a signal containing transaction information independently of any central transaction processing and providing transaction information.
```

Signed and Sealed this

Fifteenth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,529,725 B1
DATED : March 4, 2003
INVENTOR(S) : Raymond Anthony Joao and Robert Richard Bock It is certified that error appears in the above-identified patent and that said Letters Patent is hereby corrected as shown below:

Column 78,
Line 12, replace "electromagnetic" with -- electronic --.

Signed and Sealed this

Twenty-eighth Day of September, 2004

JON W. DUDAS
*Director of the United States Patent and Trademark Office*